US009918053B2

(12) United States Patent
Lo et al.

(10) Patent No.: US 9,918,053 B2
(45) Date of Patent: Mar. 13, 2018

(54) SYSTEM AND METHOD FOR PULSE-WIDTH MODULATING A PHASE-ONLY SPATIAL LIGHT MODULATOR

(71) Applicant: Jasper Display Corp., Hsinchu (TW)

(72) Inventors: Robert Lo, Santa Clara, CA (US); Edwin Lyle Hudson, Santa Clara, CA (US); Mike Stover, Santa Clara, CA (US); Shih-Ya Hong, Hsinchu (TW); David Charles Mcdonald, Santa Clara, CA (US)

(73) Assignee: JASPER DISPLAY CORP., Hsinchu (TW)

( * ) Notice: Subject to any disclaimer, the term of this patent is extended or adjusted under 35 U.S.C. 154(b) by 383 days.

(21) Appl. No.: 14/712,061

(22) Filed: May 14, 2015

(65) Prior Publication Data
US 2016/0077367 A1    Mar. 17, 2016

Related U.S. Application Data

(60) Provisional application No. 61/993,022, filed on May 14, 2014.

(51) Int. Cl.
G09G 3/36      (2006.01)
H04N 9/31      (2006.01)
G09G 3/20      (2006.01)

(52) U.S. Cl.
CPC ......... *H04N 9/3123* (2013.01); *G09G 3/3648* (2013.01); *G02F 2203/50* (2013.01);
(Continued)

(58) Field of Classification Search
CPC .. G02F 1/133; G02F 1/13306; G02F 2203/50; H04N 9/3123; G09G 3/34;
(Continued)

(56) References Cited

U.S. PATENT DOCUMENTS 5,018,838 A * 5/1991 Barnes ................... G02F 1/139
                                                  349/143
5,731,802 A * 3/1998 Aras .................... G09G 3/2022
                                                  345/692

(Continued)

OTHER PUBLICATIONS

"Characteristics of LCOS Phase-only spatial light modulator and its application," Dai et al., Optics Communications vol. 238, pp. 269-276, 2004, especially section 3.2.
(Continued)

*Primary Examiner* — Amare Mengistu
*Assistant Examiner* — Crystal A Mathews
(74) *Attorney, Agent, or Firm* — WPAT, PC

(57) ABSTRACT

A method of pulse width modulating a spatial light modulator comprises determining a modulation sequence and applying the modulation sequence to the spatial light modulator in a time order method. The modulation sequence comprises a plurality of minor modulation segments. Each minor modulation segment comprises an always-on modulation segment in an always-on state. The plurality of minor modulation segments are temporally spaced such that the always-on modulation segments are spaced at predetermined intervals. Each minor modulation segment comprises at least one thermometer bit.

16 Claims, 46 Drawing Sheets

(52) U.S. Cl.
CPC ....... *G02F 2203/585* (2013.01); *G09G 3/204* (2013.01); *G09G 3/2033* (2013.01)

(58) Field of Classification Search
CPC ...... G09G 3/36; G09G 3/2029; G09G 3/2033; G09G 3/3433; G09G 3/204; G02B 26/08
See application file for complete search history.

(56) References Cited

U.S. PATENT DOCUMENTS

| | | | |
|---|---|---|---|
| 5,986,640 A * | 11/1999 | Baldwin | G09G 3/2033 345/596 |
| 6,005,558 A | 12/1999 | Hudson et al. | |
| 6,046,716 A * | 4/2000 | McKnight | G09G 3/2011 345/208 |
| 6,067,065 A | 5/2000 | Worley, III et al. | |
| 6,127,991 A * | 10/2000 | Uehara | G09G 3/2022 345/60 |
| 6,151,011 A * | 11/2000 | Worley, III | G09G 3/2029 345/692 |
| 7,088,325 B2 * | 8/2006 | Ishii | G09G 3/3659 345/89 |
| 7,129,920 B2 | 10/2006 | Chow | |
| 7,379,043 B2 | 5/2008 | Worley, III et al. | |
| 7,397,980 B2 | 7/2008 | Frisken | |
| 7,443,374 B2 | 10/2008 | Hudson | |
| 7,468,717 B2 | 12/2008 | Hudson | |
| 7,852,307 B2 | 12/2010 | Hudson | |
| 7,990,353 B2 | 8/2011 | Chow | |
| 8,040,311 B2 | 10/2011 | Hudson et al. | |
| 8,421,828 B2 | 4/2013 | Hudson et al. | |
| 8,643,681 B2 * | 2/2014 | Endo | H04N 9/3111 345/204 |
| 2002/0043610 A1* | 4/2002 | Lee | H04N 3/155 250/208.1 |
| 2004/0032636 A1* | 2/2004 | Willis | H04N 9/3123 359/238 |
| 2005/0052437 A1 | 3/2005 | Hudson | |
| 2005/0062765 A1* | 3/2005 | Hudson | G09G 3/2022 345/692 |
| 2005/0264586 A1* | 12/2005 | Kim | G09G 3/3648 345/690 |
| 2006/0066645 A1* | 3/2006 | Ng | G09G 3/2029 345/691 |
| 2006/0147146 A1* | 7/2006 | Voigt | G01C 19/726 385/3 |
| 2006/0284903 A1* | 12/2006 | Ng | G09G 3/2092 345/691 |
| 2006/0284904 A1* | 12/2006 | Ng | G09G 3/2092 345/691 |
| 2007/0252855 A1* | 11/2007 | Hudson | G09G 3/2014 345/691 |
| 2007/0252856 A1* | 11/2007 | Hudson | G09G 3/2014 345/693 |
| 2008/0007576 A1* | 1/2008 | Ishii | G09G 3/2025 345/691 |
| 2008/0088613 A1* | 4/2008 | Hudson | G09G 3/2014 345/204 |
| 2008/0158437 A1* | 7/2008 | Arai | G09G 3/2029 348/742 |
| 2008/0259019 A1* | 10/2008 | Ng | G09G 3/2014 345/98 |
| 2009/0027360 A1* | 1/2009 | Kwan | G09G 3/20 345/204 |
| 2009/0027364 A1* | 1/2009 | Kwan | G09G 3/20 345/204 |
| 2009/0284671 A1* | 11/2009 | Leister | G03H 1/02 349/18 |
| 2009/0303248 A1* | 12/2009 | Ng | G09G 3/2055 345/596 |
| 2010/0214646 A1* | 8/2010 | Sugimoto | G02B 26/0841 359/292 |
| 2010/0253995 A1* | 10/2010 | Reichelt | G02B 26/06 359/290 |
| 2010/0295836 A1* | 11/2010 | Matsumoto | G09G 3/2092 345/211 |
| 2011/0205100 A1* | 8/2011 | Bogaerts | H04N 5/3575 341/169 |
| 2012/0086733 A1* | 4/2012 | Hudson | G09G 3/3648 345/690 |
| 2012/0113167 A1* | 5/2012 | Margerm | G09G 3/3426 345/690 |
| 2013/0308057 A1* | 11/2013 | Lu | G09G 3/20 348/656 |
| 2014/0085426 A1* | 3/2014 | Leone | G02B 26/0841 348/46 |
| 2015/0245038 A1* | 8/2015 | Clatanoff | H04N 9/3179 345/545 |

OTHER PUBLICATIONS

"Introduction to Microdisplays," Armitage et al., John Wiley & Sons, 2006, pp. 182-185.
Table 1 in "Studies of Liquid Crystal Response Time," Wang, University of Central Florida, Doctoral Dissertation, 2005.
"Modern MOS Technology: Processes, Devices, and Design", pp. 208-211, DeWitt G. Ong, McGraw-Hill, 1984.
"Multipoint phase calibration for improved compensation of inherent wavefront distortion in parallel aligned liquid crystal on silicon display," Oton et al., Applied Optics, vol. 46, No. 23, pp. 5667-5679, Optical Society of America, 2007.
"Broadband suppression of the zero diffraction order of an SLM using its extended phase modulation range," Jesacher et al., Optics Express, vol. 22, No. 14, pp. 17590-17599.
Section 2 of "Holographic Data Storage: Science Fiction or Science Fact", Ken Anderson et al., Akonia Holographics LLC, presented at Optical Data Storage 2014.

* cited by examiner

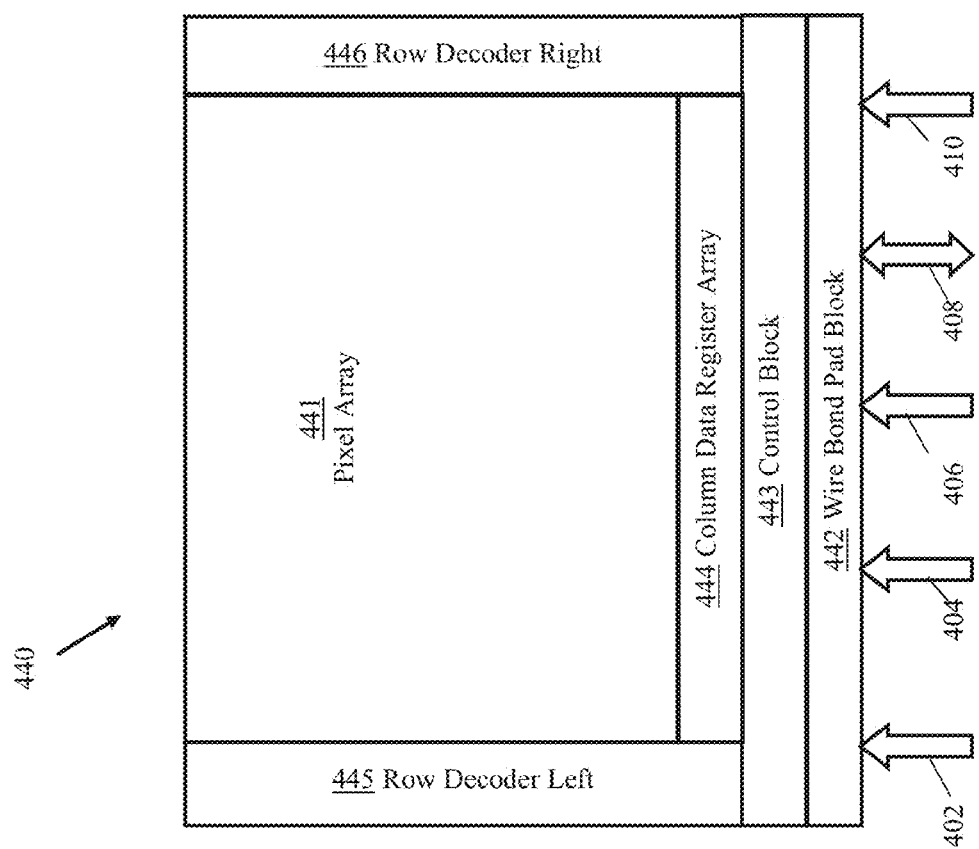

(a)

| Image code | Lsb0 (1) | Lsb1 (2) | Lsb2 (4) | Lsb3 (8) | Thm0 (16) | Thm1 (16) |
|---|---|---|---|---|---|---|
| 0 | | | | | | |
| 1 | x | | | | | |
| 2 | | x | | | | |
| 3 | x | x | | | | |
| 4 | | | x | | | |
| 5 | x | | x | | | |
| 6 | | x | x | | | |
| 7 | x | x | x | | | |
| 8 | | | | x | | |
| 9 | x | | | x | | |
| 10 | | x | | x | | |
| 11 | x | x | | x | | |
| 12 | | | x | x | | |
| 13 | x | | x | x | | |
| 14 | | x | x | x | | |
| 15 | x | x | x | x | | |
| 16 | | | | | x | |
| 17 | x | | | | x | |
| 18 | | x | | | x | |
| 19 | x | x | | | x | |
| 20 | | | x | | x | |
| 21 | x | | x | | x | |
| 22 | | x | x | | x | |
| 23 | x | x | x | | x | |
| 24 | | | | x | x | |
| 25 | x | | | x | x | |
| 26 | | x | | x | x | |
| 27 | x | x | | x | x | |
| 28 | | | x | x | x | |
| 29 | x | | x | x | x | |
| 30 | | x | x | x | x | |
| 31 | x | x | x | x | x | |
| 32 | | | | | x | x |
| 33 | x | | | | x | x |
| 34 | | x | | | x | x |
| 35 | x | x | | | x | x |
| 36 | | | x | | x | x |
| 37 | x | | x | | x | x |
| 38 | | x | x | | x | x |

FIG. 9D

| Image Code | Lsb0 | Lsb1 | Lsb2 | Lsb3 | Highest active thermometer bit |
|---|---|---|---|---|---|
| 0 | | | | | Thm0 off |
| 15 | x | x | x | x | Thm0 off |
| 16 | | | | | Thm0 |
| 31 | x | x | x | x | Thm0 |
| 32 | | | | | Thm1 |
| 47 | x | x | x | x | Thm1 |
| 48 | | | | | Thm2 |
| 63 | x | x | x | x | Thm2 |
| 64 | | | | | Thm3 |
| 79 | x | x | x | x | Thm3 |
| 80 | | | | | Thm4 |
| 95 | x | x | x | x | Thm4 |
| 96 | | | | | Thm5 |
| 111 | x | x | x | x | Thm5 |
| 112 | | | | | Thm6 |
| 127 | x | x | x | x | Thm6 |
| 128 | | | | | Thm7 |
| 143 | x | x | x | x | Thm7 |
| 144 | | | | | Thm8 |
| 159 | x | x | x | x | Thm8 |
| 160 | | | | | Thm9 |
| 175 | x | x | x | x | Thm9 |
| 176 | | | | | Thm10 |
| 191 | x | x | x | x | Thm10 |
| 192 | | | | | Thm11 |
| 207 | x | x | x | x | Thm11 |
| 208 | | | | | Thm12 |
| 223 | x | x | x | x | Thm12 |
| 224 | | | | | Thm13 |
| 239 | x | x | x | x | Thm13 |

FIG. 9E

| Image Code | Lsb0 | Lsb1 | Lsb2 | Lsb3 | Highest active thermometer bit |
|---|---|---|---|---|---|
| 240 | | | | | Thm14 |
| 255 | x | x | x | x | Thm14 |
| 256 | | | | | Thm15 |
| 271 | x | x | x | x | Thm15 |
| 272 | | | | | Thm16 |
| 287 | x | x | x | x | Thm16 |
| 288 | | | | | Thm17 |
| 303 | x | x | x | x | Thm17 |
| 304 | | | | | Thm18 |
| 319 | x | x | x | x | Thm18 |
| 320 | | | | | Thm19 |
| 335 | x | x | x | x | Thm19 |
| 336 | x | | | | Thm20 |
| 351 | x | x | x | x | Thm20 |
| 352 | | | | | Thm21 |
| 367 | x | x | x | x | Thm21 |
| 368 | | | | | Thm22 |
| 383 | x | x | x | x | Thm22 |
| 384 | | | | | Thm23 |
| 399 | x | x | x | x | Thm23 |
| 400 | | | | | Thm24 |
| 415 | x | x | x | x | Thm24 |
| 416 | | | | | Thm25 |
| 431 | x | x | x | x | Thm25 |
| 432 | | | | | Thm26 |
| 447 | x | x | x | x | Thm26 |

FIG. 9F

| value→ subtherm↓ | 0 | 1 | 2 | 3 |
|---|---|---|---|---|
| sth0 |  | x | x | x |
| sht1 |  |  | x | x |
| sth2 |  |  |  | x |

| Image Code | Lsb0 | Lsb1 | Lsb2 | Lsb3 | Sth0 | Sth1 | Sth2 | Thm0 | Thm1 |
|---|---|---|---|---|---|---|---|---|---|
| 0 | | | | | | | | | |
| 1 | x | | | | | | | | |
| 2 | | x | | | | | | | |
| 3 | x | x | | | | | | | |
| 4 | | | x | | | | | | |
| 5 | x | | x | | | | | | |
| 6 | | x | x | | | | | | |
| 7 | x | x | x | | | | | | |
| 8 | | | | x | | | | | |
| 9 | x | | | x | | | | | |
| 10 | | x | | x | | | | | |
| 11 | x | x | | x | | | | | |
| 12 | | | x | x | | | | | |
| 13 | x | | x | x | | | | | |
| 14 | | x | x | x | | | | | |
| 15 | x | x | x | x | | | | | |
| 16 | | | | | x | | | | |
| 17 | x | | | | x | | | | |
| 18 | | x | | | x | | | | |
| 19 | x | x | | | x | | | | |
| 20 | | | x | | x | | | | |
| 21 | x | | x | | x | | | | |
| 22 | | x | x | | x | | | | |
| 23 | x | x | x | | x | | | | |
| 24 | | | | x | x | | | | |
| 25 | x | | | x | x | | | | |
| 26 | | x | | x | x | | | | |
| 27 | x | x | | x | x | | | | |
| 28 | | | x | x | x | | | | |
| 29 | x | | x | x | x | | | | |
| 30 | | x | x | x | x | | | | |
| 31 | x | x | x | x | x | | | | |
| 32 | | | | | x | x | | | |
| 33 | x | | | | x | x | | | |
| 34 | | x | | | x | x | | | |
| 35 | x | x | | | x | x | | | |
| 36 | | | x | | x | x | | | |
| 37 | x | | x | | x | x | | | |
| 38 | | x | x | | x | x | | | |

FIG. 10D

| Image Code | Lsb0 | Lsb1 | Lsb2 | Lsb3 | Sth0 | Sth1 | Sth2 | Thm0 | Thm1 |
|---|---|---|---|---|---|---|---|---|---|
| 39 | x | x | x |   | x | x |   |   |   |
| 40 |   |   |   | x | x | x |   |   |   |
| 41 | x |   |   | x | x | x |   |   |   |
| 42 |   | x |   | x | x | x |   |   |   |
| 43 | x | x |   | x | x | x |   |   |   |
| 44 |   |   | x | x | x | x |   |   |   |
| 45 | x |   | x | x | x | x |   |   |   |
| 46 |   | x | x | x | x | x |   |   |   |
| 47 | x | x | x | x | x | x |   |   |   |
| 48 |   |   |   |   | x | x | x |   |   |
| 49 | x |   |   |   | x | x | x |   |   |
| 50 |   | x |   |   | x | x | x |   |   |
| 51 | x | x |   |   | x | x | x |   |   |
| 52 |   |   | x |   | x | x | x |   |   |
| 53 | x |   | x |   | x | x | x |   |   |
| 54 |   | x | x |   | x | x | x |   |   |
| 55 | x | x | x |   | x | x | x |   |   |
| 56 |   |   |   | x | x | x | x |   |   |
| 57 | x |   |   | x | x | x | x |   |   |
| 58 |   | x |   | x | x | x | x |   |   |
| 59 | x | x |   | x | x | x | x |   |   |
| 60 |   |   | x | x | x | x | x |   |   |
| 61 | x |   | x | x | x | x | x |   |   |
| 62 |   | x | x | x | x | x | x |   |   |
| 63 | x | x | x | x | x | x | x |   |   |
| 64 |   |   |   |   |   |   |   | x |   |
| 65 | x |   |   |   |   |   |   | x |   |
| 66 |   | x |   |   |   |   |   | x |   |
| 67 | x | x |   |   |   |   |   | x |   |
| 68 |   |   | x |   |   |   |   | x |   |
| 69 | x |   | x |   |   |   |   | x |   |
| 70 |   | x | x |   |   |   |   | x |   |
| 71 | x | x | x |   |   |   |   | x |   |
| 72 |   |   |   | x |   |   |   | x |   |
| 73 | x |   |   | x |   |   |   | x |   |
| 74 |   | x |   | x |   |   |   | x |   |
| 75 | x | x |   | x |   |   |   | x |   |
| 76 |   |   | x | x |   |   |   | x |   |
| 77 | x |   | x | x |   |   |   | x |   |

FIG. 10E

| Image Code | Lsb0 | Lsb1 | Lsb2 | Lsb3 | Sth0 | Sth1 | Sth2 | Thm0 | Thm1 |
|---|---|---|---|---|---|---|---|---|---|
| 78 |  | x | x | x |  |  |  | x |  |
| 79 | x | x | x | x |  |  |  | x |  |
| 80 |  |  |  |  | x |  |  | x |  |
| 81 | x |  |  |  | x |  |  | x |  |
| 82 |  | x |  |  | x |  |  | x |  |
| 83 | x | x |  |  | x |  |  | x |  |
| 84 |  |  | x |  | x |  |  | x |  |
| 85 | x |  | x |  | x |  |  | x |  |
| 86 |  | x | x |  | x |  |  | x |  |
| 87 | x | x | x |  | x |  |  | x |  |
| 88 |  |  |  | x | x |  |  | x |  |
| 89 | x |  |  | x | x |  |  | x |  |
| 90 |  | x |  | x | x |  |  | x |  |
| 91 | x | x |  | x | x |  |  | x |  |
| 92 |  |  | x | x | x |  |  | x |  |
| 93 | x |  | x | x | x |  |  | x |  |
| 94 |  | x | x | x | x |  |  | x |  |
| 95 | x | x | x | x | x |  |  | x |  |
| 96 |  |  |  |  | x | x |  | x |  |
| 97 | x |  |  |  | x | x |  | x |  |
| 98 |  | x |  |  | x | x |  | x |  |
| 99 | x | x |  |  | x | x |  | x |  |
| 100 |  |  | x |  | x | x |  | x |  |
| 101 | x |  | x |  | x | x |  | x |  |
| 102 |  | x | x |  | x | x |  | x |  |
| 103 | x | x | x |  | x | x |  | x |  |
| 104 |  |  |  | x | x | x |  | x |  |
| 105 | x |  |  | x | x | x |  | x |  |
| 105 |  | x |  | x | x | x |  | x |  |
| 107 | x | x |  | x | x | x |  | x |  |
| 108 |  |  | x | x | x | x |  | x |  |
| 109 | x |  | x | x | x | x |  | x |  |
| 110 |  | x | x | x | x | x |  | x |  |
| 111 | x | x | x | x | x | x |  | x |  |
| 112 |  |  |  |  | x | x | x | x |  |
| 113 | x |  |  |  | x | x | x | x |  |
| 114 |  | x |  |  | x | x | x | x |  |
| 115 | x | x |  |  | x | x | x | x |  |
| 116 |  |  | x |  | x | x | x | x |  |

FIG. 10F

| Image Code | Lsb0 | Lsb1 | Lsb2 | Lsb3 | Sth0 | Sth1 | Sth2 | Thm0 | Thm1 |
|---|---|---|---|---|---|---|---|---|---|
| 117 | x |   | x |   | x | x | x | x |   |
| 118 |   | x | x |   | x | x | x | x |   |
| 119 | x | x | x |   | x | x | x | x |   |
| 120 |   |   |   | x | x | x | x | x |   |
| 121 | x |   |   | x | x | x | x | x |   |
| 122 |   | x |   | x | x | x | x | x |   |
| 123 | x | x |   | x | x | x | x | x |   |
| 124 |   |   | x | x | x | x | x | x |   |
| 125 | x |   | x | x | x | x | x | x |   |
| 126 |   | x | x | x | x | x | x | x |   |
| 127 | x | x | x | x | x | x | x | x |   |
| 128 |   |   |   |   |   |   |   | x | x |
| 129 | x |   |   |   |   |   |   | x | x |
| 130 |   | x |   |   |   |   |   | x | x |
| 131 | x | x |   |   |   |   |   | x | x |
| 132 |   |   | x |   |   |   |   | x | x |
| 133 | x |   | x |   |   |   |   | x | x |
| 134 |   | x | x |   |   |   |   | x | x |
| 135 | x | x | x |   |   |   |   | x | x |
| 136 |   |   |   | x |   |   |   | x | x |
| 137 | x |   |   | x |   |   |   | x | x |
| 138 |   | x |   | x |   |   |   | x | x |
| 139 | x | x |   | x |   |   |   | x | x |
| 140 |   |   | x | x |   |   |   | x | x |
| 141 | x |   | x | x |   |   |   | x | x |
| 142 |   | x | x | x |   |   |   | x | x |
| 143 | x | x | x | x |   |   |   | x | x |
| 144 |   |   |   |   | x |   |   | x | x |
| 145 | x |   |   |   | x |   |   | x | x |
| 146 |   | x |   |   | x |   |   | x | x |
| 147 | x | x |   |   | x |   |   | x | x |
| 148 |   |   | x |   | x |   |   | x | x |
| 149 | x |   | x |   | x |   |   | x | x |
| 150 |   | x | x |   | x |   |   | x | x |
| 151 | x | x | x |   | x |   |   | x | x |
| 152 |   |   |   | x |   |   |   | x | x |
| 153 | x |   |   | x |   |   |   | x | x |
| 154 |   | x |   | x |   |   |   | x | x |
| 155 | x | x |   | x |   |   |   | x | x |

FIG. 10G

| value→ subtherm↓ | 0 | 1 | 2 | 3 |
|---|---|---|---|---|
| sth0 |   | x | x | x |
| sht1 |   |   | x | x |
| sth2 |   |   |   | x |

|  | 1st modulation segment | | 2nd modulation segment | | 3rd modulation segment | | Interval to next minor modulation segment | Modulation Intervals | Cumulative Modulation Intervals |
|---|---|---|---|---|---|---|---|---|---|
| 640 | Thm4 | 10 | Aon0 | 6 | Lsb0 | 0.125 | 660 | 80.875 | 97 | 97 |
| 641 | Thm8 | 10 | Aon1 | 5 | Sth0 | 2 | 661 | 80 | 97 | 194 |
| 642 | Thm12 | 10 | Aon2 | 4 | Thm0 | 10 | 662 | 74 | 98 | 292 |
| 643 | Thm6 | 10 | Aon3 | 6 | Lsb2 | 0.50 | 663 | 80.5 | 97 | 389 |
| 644 | Thm10 | 10 | Aon4 | 5 | Sth1 | 2 | 664 | 80 | 97 | 486 |
| 645 | Thm14 | 10 | Aon5 | 4 | Thm2 | 10 | 665 | 74 | 98 | 584 |
| 646 | Thm5 | 10 | Aon6 | 6 | Lsb1 | 0.25 | 666 | 80.75 | 97 | 681 |
| 647 | Thm9 | 10 | Aon7 | 5 | Sth1 | 2 | 667 | 80 | 97 | 778 |
| 648 | Thm13 | 10 | Aon7 | 4 | Thm1 | 10 | 668 | 74 | 98 | 876 |
| 649 | Thm7 | 10 | Aon9 | 6 | Lsb3 | 1.0 | 669 | 81 | 98 | 974 |
| 650 | Thm11 | 10 | Aon10 | 5 | Sth3 | 2 | 670 | 80 | 98 | 1072 |
| 651 | Thm15 | 10 | Aon11 | 4 | Thm3 | 10 | -- | 74 | 98 | 1170 |

FIG. 12B

| Row↓ | 0 | 1 | 2 | 3 | 4 | 5 | 6 | 7 | 8 | 9 | 10 |
|---|---|---|---|---|---|---|---|---|---|---|---|
| 0 | 23 | | | | | | | | | | |
|  | 22 | 23 | | | | | | | | | |
|  |  | 22 | 23 | | | | | | | | |
|  |  |  | 22 | 23 | | | | | | | |
|  |  |  |  | 22 | 23 | | | | | | |
|  |  |  |  |  | 22 | 23 | | | | | |
|  |  |  |  |  |  | 22 | 23 | | | | |
|  |  |  |  |  |  |  | 22 | 23 | | | |
|  |  |  |  |  |  |  |  | 22 | 23 | | |
|  |  |  |  |  |  |  |  |  | 22 | 23 | |
|  |  |  |  |  |  |  |  |  |  | 22 | 23 |
| 97 | 21 | | | | | | | | | | 22 |
|  | 20 | 21 | | | | | | | | | |
|  |  | 20 | 21 | | | | | | | | |
|  |  |  | 20 | 21 | | | | | | | |
|  |  |  |  | 20 | 21 | | | | | | |
|  |  |  |  |  | 20 | 21 | | | | | |
|  |  |  |  |  |  | 20 | 21 | | | | |
|  |  |  |  |  |  |  | 20 | 21 | | | |
|  |  |  |  |  |  |  |  | 20 | 21 | | |
|  |  |  |  |  |  |  |  |  | 20 | 21 | |
| 194 | 19 | | | | | | | | | | 20 |
|  | 18 | 19 | | | | | | | | | |
|  |  | 18 | 19 | | | | | | | | |
|  |  |  | 18 | 19 | | | | | | | |
|  |  |  |  | 18 | 19 | | | | | | |
|  |  |  |  |  | 18 | 19 | | | | | |
|  |  |  |  |  |  | 18 | 19 | | | | |
|  |  |  |  |  |  |  | 18 | 19 | | | |
|  |  |  |  |  |  |  |  | 18 | 19 | | |
|  |  |  |  |  |  |  |  |  | 18 | 19 | |
|  |  |  |  |  |  |  |  |  |  | 18 | 19 |
|  |  |  |  |  |  |  |  |  |  |  | 18 |

FIG. 12E

| Row↓ | 0 | 1 | 2 | 3 | 4 | 5 | 6 | 7 | 8 | 9 | 10 |
|---|---|---|---|---|---|---|---|---|---|---|---|
| 292 | 17 |  |  |  |  |  |  |  |  |  |  |
|  | 16 | 17 |  |  |  |  |  |  |  |  |  |
|  |  | 16 | 17 |  |  |  |  |  |  |  |  |
|  |  |  | 16 | 17 |  |  |  |  |  |  |  |
|  |  |  |  | 16 | 17 |  |  |  |  |  |  |
|  |  |  |  |  | 16 | 17 |  |  |  |  |  |
|  |  |  |  |  |  | 16 | 17 |  |  |  |  |
|  |  |  |  |  |  |  | 16 | 17 |  |  |  |
|  |  |  |  |  |  |  |  | 16 | 17 |  |  |
|  |  |  |  |  |  |  |  |  | 16 | 17 |  |
|  |  |  |  |  |  |  |  |  |  | 16 | 17 |
| 389 | 15 |  |  |  |  |  |  |  |  |  | 16 |
|  | 14 | 15 |  |  |  |  |  |  |  |  |  |
|  |  | 14 | 15 |  |  |  |  |  |  |  |  |
|  |  |  | 14 | 15 |  |  |  |  |  |  |  |
|  |  |  |  | 14 | 15 |  |  |  |  |  |  |
|  |  |  |  |  | 14 | 15 |  |  |  |  |  |
|  |  |  |  |  |  | 14 | 15 |  |  |  |  |
|  |  |  |  |  |  |  | 14 | 15 |  |  |  |
|  |  |  |  |  |  |  |  | 14 | 15 |  |  |
|  |  |  |  |  |  |  |  |  | 14 | 15 |  |
|  |  |  |  |  |  |  |  |  |  | 14 | 15 |
| 486 | 13 |  |  |  |  |  |  |  |  |  | 14 |
|  | 12 | 13 |  |  |  |  |  |  |  |  |  |
|  |  | 12 | 13 |  |  |  |  |  |  |  |  |
|  |  |  | 12 | 13 |  |  |  |  |  |  |  |
|  |  |  |  | 12 | 13 |  |  |  |  |  |  |
|  |  |  |  |  | 12 | 13 |  |  |  |  |  |
|  |  |  |  |  |  | 12 | 13 |  |  |  |  |
|  |  |  |  |  |  |  | 12 | 13 |  |  |  |
|  |  |  |  |  |  |  |  | 12 | 13 |  |  |
|  |  |  |  |  |  |  |  |  | 12 | 13 |  |
|  |  |  |  |  |  |  |  |  |  | 12 | 13 |
|  |  |  |  |  |  |  |  |  |  |  | 12 |

| Row↓ | 0 | 1 | 2 | 3 | 4 | 5 | 6 | 7 | 8 | 9 | 10 |
|---|---|---|---|---|---|---|---|---|---|---|---|
| 584 | 11<br>10 | 11<br>10 | 11<br>10 | 11<br>10 | 11<br>10 | 11<br>10 | 11<br>10 | 11<br>10 | 11<br>10 | 11<br>10 | 11<br>10 |
| 681 | 9<br>8 | 9<br>8 | 9<br>8 | 9<br>8 | 9<br>8 | 9<br>8 | 9<br>8 | 9<br>8 | 9<br>8 | 9<br>8 | 9<br>8 |
| 778 | 7<br>6 | 7<br>6 | 7<br>6 | 7<br>6 | 7<br>6 | 7<br>6 | 7<br>6 | 7<br>6 | 7<br>6 | 7<br>6 | 7<br>6 |

| Row↓ | 0 | 1 | 2 | 3 | 4 | 5 | 6 | 7 | 8 | 9 | 10 |
|---|---|---|---|---|---|---|---|---|---|---|---|
| 876 | 5 4 | 5 4 | 5 4 | 5 4 | 5 4 | 5 4 | 5 4 | 5 4 | 5 4 | 5 4 | 5 4 |
| 974 | 3 2 | 3 2 | 3 2 | 3 2 | 3 2 | 3 2 | 3 2 | 3 2 | 3 2 | 3 2 | 3 2 |
| 1072 | 1 | 1 | | | | | | | | | |
| 1080 | 0 | 0 | 1 0 | 1 0 | 1 0 | 1 0 | 1 0 | 1 0 | 1 0 | 1 0 | 1 0 |

FIG. 12H

|  | 1st modulation segment | | 2nd modulation segment | | 3rd modulation segment | | Interval to next minor modulation segment | | Modulation Intervals | Cumulative Modulation Intervals |
|---|---|---|---|---|---|---|---|---|---|---|
| 740 | Thm6 | 32 | Aon0 | 2 | Lsb0 | 0.5 | 760 | 62.5 | 97 | 97 |
| 741 | Thm12 | 32 | Aon1 | 2 | Thm1 | 32 | 761 | 31 | 97 | 194 |
| 742 | Thm8 | 32 | Aon2 | 2 | Lsb2 | 2 | 762 | 61 | 97 | 291 |
| 743 | Thm14 | 32 | Aon3 | 2 | Thm3 | 32 | 763 | 31 | 97 | 388 |
| 744 | Thm10 | 32 | Aon4 | 2 | Lsb4 | 8 | 764 | 55 | 97 | 485 |
| 745 | Thm16 | 32 | Aon5 | 2 | Thm5 | 32 | 765 | 31 | 97 | 582 |
| 746 | Thm7 | 31.5 | Aon6 | 2.5 | Lsb1 | 0.96 | 766 | 62.04 | 97 | 679 |
| 747 | Thm13 | 32 | Aon7 | 2 | Thm0 | 32 | 767 | 31 | 97 | 776 |
| 748 | Thm9 | 32 | Aon7 | 2 | Lsb3 | 4 | 768 | 59 | 97 | 873 |
| 749 | Thm15 | 32 | Aon9 | 2 | Thm2 | 32 | 769 | 31 | 97 | 970 |
| 750 | Thm11 | 32 | Aon10 | 2 | Lsb5 | 16 | 770 | 47 | 97 | 1067 |
| 751 | Thm17 | 32 | Aon11 | 42 | Thm4 | 32 | -- | 31 | 97 | 1164 |

FIG. 13B

| Row | 0 | 1 | 2 | 3 | 4 | 5 | 6 | 7 | 8 | 9 | 10 |
|---|---|---|---|---|---|---|---|---|---|---|---|
| 0 | 23 | | | | | | | | | | |
| | | 23 | | | | | | | | | |
| | 22 | | 23 | | | | | | | | |
| | | 22 | | 23 | | | | | | | |
| | | | 22 | | 23 | | | | | | |
| | | | | 22 | | 23 | | | | | |
| | | | | | 22 | | 23 | | | | |
| | | | | | | 22 | | 23 | | | |
| 97 | 21 | | | | | | 22 | | 23 | | |
| | | 21 | | | | | | 22 | | 23 | |
| | 20 | | 21 | | | | | | 22 | | 23 |
| | | 20 | | 21 | | | | | | 22 | |
| | | | 20 | | 21 | | | | | | 22 |
| | | | | 20 | | 21 | | | | | |
| | | | | | 20 | | 21 | | | | |
| | | | | | | 20 | | 21 | | | |
| 194 | 19 | | | | | | | 20 | | 21 | |
| | | 19 | | | | | | | 20 | | 21 |
| | 18 | | 19 | | | | | | | 20 | |
| | | 18 | | 19 | | | | | | | 20 |
| | | | 18 | | 19 | | | | | | |
| | | | | 18 | | 19 | | | | | |
| | | | | | 18 | | 19 | | | | |
| | | | | | | 18 | | 19 | | | |
| 291 | 17 | | | | | | | 18 | | 19 | |
| | | 17 | | | | | | | 18 | | 19 |
| | 16 | | 17 | | | | | | | 18 | |
| | | 16 | | 17 | | | | | | | 18 |
| | | | 16 | | 17 | | | | | | |
| | | | | 16 | | 17 | | | | | |
| | | | | | 16 | | 17 | | | | |
| | | | | | | 16 | | 17 | | | |
| | | | | | | | 16 | | 17 | | |
| | | | | | | | | 16 | | 17 | |
| | | | | | | | | | 16 | | 17 |
| | | | | | | | | | | 16 | |
| | | | | | | | | | | | 16 |

FIG. 13C

| Row↓ | 0 | 1 | 2 | 3 | 4 | 5 | 6 | 7 | 8 | 9 | 10 |
|---|---|---|---|---|---|---|---|---|---|---|---|
| 388 | 15 | | | | | | | | | | |
| | | 15 | | | | | | | | | |
| | | | 15 | | | | | | | | |
| | | 14 | | 15 | | | | | | | |
| | | | 14 | | 15 | | | | | | |
| | | | | 14 | | 15 | | | | | |
| | | | | | 14 | | 15 | | | | |
| | | | | | | 14 | | 15 | | | |
| 485 | 13 | | | | | | 14 | | 15 | | |
| | | 13 | | | | | | 14 | | 15 | |
| | | | 13 | | | | | | 14 | | 15 |
| | | 12 | | 13 | | | | | | 14 | |
| | | | 12 | | 13 | | | | | | 14 |
| | | | | 12 | | 13 | | | | | |
| | | | | | 12 | | 13 | | | | |
| | | | | | | 12 | | 13 | | | |
| 582 | 11 | | | | | | 12 | | 13 | | |
| | | 11 | | | | | | 12 | | 13 | |
| | | | 11 | | | | | | 12 | | 13 |
| | | 10 | | 11 | | | | | | 12 | |
| | | | 10 | | 11 | | | | | | 12 |
| | | | | 10 | | 11 | | | | | |
| | | | | | 10 | | 11 | | | | |
| | | | | | | 10 | | 11 | | | |
| 679 | 9 | | | | | | 10 | | 11 | | |
| | | 9 | | | | | | 10 | | 11 | |
| | | | 9 | | | | | | 10 | | 11 |
| | | 8 | | 9 | | | | | | 10 | |
| | | | 8 | | 9 | | | | | | 10 |
| | | | | 8 | | 9 | | | | | |
| | | | | | 8 | | 9 | | | | |
| | | | | | | 8 | | 9 | | | |
| | | | | | | | 8 | | 9 | | |
| | | | | | | | | 8 | | 19 | |
| | | | | | | | | | 8 | | |
| | | | | | | | | | | 8 | |
| | | | | | | | | | | | 8 |

FIG. 13D

| Row↓ | 0 | 1 | 2 | 3 | 4 | 5 | 6 | 7 | 8 | 9 | 10 |
|---|---|---|---|---|---|---|---|---|---|---|---|
| 776 | 7 | | | | | | | | | | |
| | | 7 | | | | | | | | | |
| | | | 15 | | | | | | | | |
| | | 6 | 6 | 7 | | | | | | | |
| | | | 6 | 6 | 7 | 7 | | | | | |
| | | | | 6 | 6 | 7 | 7 | 7 | | | |
| | | | | | 6 | 6 | 7 | 7 | 7 | | |
| 873 | 5 | | | | | | 6 | 6 | 7 | 7 | 7 |
| | | 5 | 5 | | | | | 6 | 6 | 6 | 7 |
| | | 4 | 4 | 5 | 5 | | | | 6 | 6 | 6 |
| | | | 4 | 4 | 5 | 5 | 4 | 5 | 5 | 6 | 6 |
| | | | | | 4 | 4 | 5 | 5 | 5 | 5 | |
| 970 | 3 | 3 | | | | | 4 | 4 | 4 | 5 | 5 |
| | | 2 | 3 | 3 | | | | | | 4 | 5 |
| | | | 2 | 3 | 3 | 3 | | 13 | | | 4 |
| | | | | 2 | 2 | 3 | 3 | 3 | | 3 | |
| 1067 | 1 | 1 | | | | 2 | 2 | 2 | | 3 | 3 |
| 1080 | | 0 | 1 | 1 | 1 | 1 | 1 | 1 | 2 | 12 | 2 |
| | | | 0 | 0 | 0 | 0 | 0 | 0 | 1 | 1 | 1 |
| | | | | | | | | | 0 | 0 | 0 |

FIG. 13E

| | 1st modulation segment | | 2nd modulation segment | | 3rd modulation segment | | 4th modulation segment | | Interval to next minor modulation segment | | Modulation Intervals | Cumulative Modulation Intervals |
|---|---|---|---|---|---|---|---|---|---|---|---|---|
| 840 | Thm8 | 10 | Thm0 | 10 | Aon0 | 6 | Lsb0 | 0.166 | 833 | 115.833 | 142 | 142 |
| 841 | Thm12 | 10 | Aon1 | 10 | Aon1 | 5 | Sth0 | 2 | 834 | 114 | 141 | 283 |
| 842 | Thm8 | 10 | Aon2 | 10 | Aon2 | 6 | Lsb2 | 0.500 | 835 | 115.5 | 142 | 425 |
| 843 | Thm14 | 10 | Thm6 | 10 | Aon3 | 5 | Sth2 | 2 | 836 | 114 | 141 | 566 |
| 844 | Thm9 | 10 | Thm1 | 10 | Aon4 | 6 | Lsb1 | 0.2917 | 837 | 115.708 | 142 | 708 |
| 845 | Thm13 | 10 | Thm5 | 10 | Aon5 | 5 | Sth1 | 2 | 838 | 114 | 141 | 849 |
| 846 | Thm11 | 10 | Thm3 | 10 | Aon6 | 6 | Lsb3 | 0.9583 | 839 | 115.042 | 142 | 991 |
| 847 | Thm15 | 10 | Thm7 | 10 | Aon7 | 5 | Sth3 | 2 | --- | 114 | 141 | 1132 |

FIG. 14B

| Row↓ | 0 | 1 | 2 | 3 | 4 | 5 | 6 | 7 | 8 | 9 | 10 |
|---|---|---|---|---|---|---|---|---|---|---|---|
| 0 | 23 |  |  |  |  |  |  |  |  |  |  |
|  | 22 | 23 |  |  |  |  |  |  |  |  |  |
|  | 21 | 22 | 23 |  |  |  |  |  |  |  |  |
|  |  | 21 | 22 | 23 |  |  |  |  |  |  |  |
|  |  |  | 21 | 22 | 23 |  |  |  |  |  |  |
|  |  |  |  | 21 | 22 | 23 |  |  |  |  |  |
|  |  |  |  |  | 21 | 22 | 23 |  |  |  |  |
|  |  |  |  |  |  | 21 | 22 | 23 |  |  |  |
|  |  |  |  |  |  |  | 21 | 22 | 23 |  |  |
|  |  |  |  |  |  |  |  | 21 | 22 | 23 |  |
|  |  |  |  |  |  |  |  |  | 21 | 22 | 23 |
| 142 | 20 |  |  |  |  |  |  |  |  |  | 21 |
|  | 19 | 20 |  |  |  |  |  |  |  |  |  |
|  | 18 | 19 | 20 |  |  |  |  |  |  |  |  |
|  |  | 18 | 19 | 20 |  |  |  |  |  |  |  |
|  |  |  | 18 | 19 | 20 |  |  |  |  |  |  |
|  |  |  |  | 18 | 19 | 20 |  |  |  |  |  |
|  |  |  |  |  | 18 | 19 | 20 |  |  |  |  |
|  |  |  |  |  |  | 18 | 19 | 20 |  |  |  |
|  |  |  |  |  |  |  | 18 | 19 | 20 |  |  |
|  |  |  |  |  |  |  |  | 18 | 19 | 20 |  |
|  |  |  |  |  |  |  |  |  | 18 | 19 | 20 |
| 283 | 17 |  |  |  |  |  |  |  |  |  | 18 |
|  | 16 | 17 |  |  |  |  |  |  |  |  |  |
|  | 15 | 16 | 17 |  |  |  |  |  |  |  |  |
|  |  | 15 | 16 | 17 |  |  |  |  |  |  |  |
|  |  |  | 15 | 16 | 17 |  |  |  |  |  |  |
|  |  |  |  | 15 | 16 | 17 |  |  |  |  |  |
|  |  |  |  |  | 15 | 16 | 17 |  |  |  |  |
|  |  |  |  |  |  | 15 | 16 | 17 |  |  |  |
|  |  |  |  |  |  |  | 15 | 16 | 17 |  |  |
|  |  |  |  |  |  |  |  | 15 | 16 | 17 |  |
|  |  |  |  |  |  |  |  |  | 15 | 16 | 17 |
|  |  |  |  |  |  |  |  |  |  | 15 | 16 |
|  |  |  |  |  |  |  |  |  |  |  | 15 |

FIG. 14C

| Row↓ | 0 | 1 | 2 | 3 | 4 | 5 | 6 | 7 | 8 | 9 | 10 |
|---|---|---|---|---|---|---|---|---|---|---|---|
| 425 | 14<br>13<br>12 | 14<br>13<br>12 | 14<br>13<br>12 | 14<br>13<br>12 | 14<br>13<br>12 | 14<br>13<br>12 | 14<br>13<br>12 | 14<br>13<br>12 | 14<br>13<br>12 | 14<br>13<br>12 | 14<br>13<br>12 |
| 566 | 11<br>10<br>9 | 11<br>10<br>9 | 11<br>10<br>9 | 11<br>10<br>9 | 11<br>19<br>9 | 11<br>10<br>9 | 11<br>10<br>9 | 11<br>10<br>9 | 11<br>10<br>9 | 11<br>10<br>9 | 11<br>10<br>9 |
| 708 | 8<br>7<br>6 | 8<br>7<br>6 | 8<br>7<br>6 | 8<br>7<br>6 | 8<br>7<br>6 | 8<br>7<br>6 | 8<br>7<br>6 | 8<br>7<br>6 | 8<br>7<br>6 | 8<br>7<br>6 |

FIG. 14D

| Row | 0 | 1 | 2 | 3 | 4 | 5 | 6 | 7 | 8 | 9 | 10 |
|---|---|---|---|---|---|---|---|---|---|---|---|
| 849 | 5 4 3 | 5 4 3 | 5 4 3 | 5 4 3 | 5 4 3 | 5 4 3 | 5 4 3 | 5 4 3 | 5 4 3 | 5 4 3 | 5 4 3 |
| 991 | 2 1 0 | 2 1 0 | 2 1 0 | 2 1 0 | 2 1 0 | 2 1 0 | 2 1 0 | 2 1 0 | 2 1 0 | 2 1 0 | 2 1 0 |
| 1080 | | | | | | | | | | | |

FIG. 14E

SYSTEM AND METHOD FOR PULSE-WIDTH MODULATING A PHASE-ONLY SPATIAL LIGHT MODULATOR

CROSS REFERENCE TO RELATED APPLICATION

This present application claims the benefit of U.S. Provisional Patent Application No. 61/993,022, filed on May 14, 2014.

FIELD OF THE INVENTION

The present invention relates to spatial light modulator systems useful to phase modulate an incoming coherent beam of light. More particularly, the present invention relates to a phase modulation system wherein the system utilizes a binary pulse width modulation (PWM) method to modulate a coherent beam of light.

BACKGROUND OF THE INVENTION

Phase modulators have proved useful for a number of technical applications. Finisar Corporation, for example, has released a line of telecommunications products based in part on the use of a liquid crystal on silicon microdisplay configured as a phase modulator. Other companies have proposed similar devices configured to operate as optical tweezers and spatial beam shapers.

The application of phase modulators to optical communications systems has long been studied. Numerous conferences sponsored by SPIE (The International Society for Optical Engineering), OSA (The Optical Society) and other optics industry trade groups and technical societies have explored the concepts of using phase modulators to accomplish free space interconnect between fiber optic lines. The addition of a reconfigurable phase modulator based on liquid crystal on silicon (LCOS) technology has been explored at some length. The use of a phase configured LCOS device as a wavelength selective switch (WSS) has been the topic of a number of papers. Of particular interest is the deployment of LCOS WSS devices in Reconfigurable Optical Add Drop Multiplexor (ROADM) switch units in metro and long haul Optical Transport System (OTS) fiber optic networks. ROADM units are important to these OTS because they enable a first fiber optic line to be routed to a second fiber optic line without the need to convert the incoming optical signal on the first fiber optic to an electrical signal and then back to an optical signal inserted into the second fiber optic line.

The range of wavelengths over which phase modulation is useful ranges from 400 nanometers to the upper end of the short infrared telecommunications wavelengths on the order of 1600 nanometers. Wavelengths outside the range are foreseeable. A given phase modulator may not need to cover the entire range described above and different liquid crystal cell configurations may prove an optimal approach. It should be noted that a single backplane and drive hardware configuration may be used with a variety of different liquid crystal cell configurations.

All potential uses are included within the scope of the present invention.

In this application the terms microdisplay, spatial light modulator, imager and panel are all understood to refer to a device capable of modulating light by altering the phase state of said light. The microdisplay may be a reflective or transmissive liquid crystal device, a MEMS (Micro-Electro Mechanical System) device, or another type device based on other modulation principles. In this application the term frame is used to denote an output frame containing all of the data required to phase modulate a beam of light. The output frame may be repeated a plurality of times before new input data is received.

FIG. 1 depicts one potential application of the present invention, a simplified diagram of a ROADM (Reconfigurable Optical Add Drop Multiplexer) 100. A ROADM is principally used as an optical inter-connect in long and medium haul fiber optic networking. A ROADM is an attractive to network developers for several reasons. A first advantage is that it allows the data being transmitted to remain in the optical domain by eliminating the need to down convert the incoming optical signal to an electrical signal so that it can then be up converted to an optical signal on an outgoing fiber optical line. A second advantage is that the ROADM can be reconfigured optical as network requirements evolve, whether the evolution is related to differences during the day or to fundamental changes in the network requirements.

As shown in FIG. 1, a ROADM 100 comprises fiber optic front end 130, cylindrical mirror 115, diffraction grating 120 and phase aligned spatial light modulator 125. Those of skill in the art of ROADMS will recognize that other components (not shown) may improve a ROADM over the example shown. See, for example, U.S. Pat. No. 7,397,980, Frisken, for further information. Telecommunications beam of light 110 exits a fiber optic line in front end 130 and is reflected by cylindrical mirror 115 to diffraction grating 120. Diffraction grating 120 reflects telecommunications beam of light 110 with every wavelength reflected at a different angle with close wavelengths at only slightly different angles. Diffracted beam of light 110 then is reflected again by cylindrical mirror 115 to phase-aligned spatial light modulator 125. Phase-aligned spatial light modulator 125 is configured with a set of data that configures the pixel array such that beams of light incident on a display of the spatial light modulator 125 are steered to a desired exit angle. The steered beam of light then reverses the original path and enters an outgoing fiber optic line in front end 130.

The range of wavelengths associated with fiber optic telecommunications has increased over time. Different channels are differentiated by wavelength, by polarization orientation, by pulse rate, and by other features, depending on the particular network design.

A common configuration for a liquid crystal on silicon microdisplay used as a phase modulator comprises a parallel aligned homogeneous non-twist nematic liquid crystal cell with the alignment angle set parallel to the polarization vector of the coherent illumination. In this configuration the LCOS microdisplay performs phase only modulation with only minimal amplitude modulation attributable to the effect manufacturing tolerances have throughout the system on the polarization state of light. Further information on the parallel aligned homogeneous non-twist liquid crystal may be found in "Characteristics of LCOS Phase-only spatial light modulator and its application," Dai et al, Optics Communications Vol. 238, pp. 269-276, 2004, especially section 3.2. A second reference is "Introduction to Microdisplays," Armitage et al, John Wiley & Sons, 2006, pp. 182-185.

When a microdisplay utilizing a nematic liquid crystal cell is pulse width modulated, there is a problem of phase stability. Because the drive is between a first drive voltage corresponding to a higher level of retardance and a second drive voltage corresponding to a lower level of retardance, it is necessary to have a scheme to achieve intermediate levels of retardance.

In the present case intermediate levels of retardance are achieved by insuring that the pulse width modulation scheme is configured to operate at a speed significantly higher than the time required for the liquid crystal material to respond directly to the modulation scheme. In this instance the liquid crystal material responds at a relatively slow rate to changes in modulation, thus acting as a low pass filter on the modulating waveform.

Some attention must be paid to the nature of the nematic liquid crystal material used in the liquid crystal device. There are many different liquid crystal materials available through various sources.

A first consideration is that the extent of lateral fields between adjacent pixels needs to be minimized to avoid misalignments in the liquid crystal cell there that will result in reflections in a spurious phase state. Means for minimizing lateral fields in liquid crystal displays are well known in the art. A first method is to insure that the cell gap between the pixels and the counter electrode is as small as possible. It is highly desirable to reduce this gap to a quarter of the pitch between adjacent pixels if possible, although the cell gap must be thick enough to enable the liquid crystal cell to provide the required range of retardance at the wavelengths of interest.

An additional means for minimizing cell gap is to use a liquid crystal with a high birefringence ($\Delta n$). Liquid crystal materials with a high birefringence suitable for use in phase aligned liquid crystal cells are well documented in the relevant literature. It is also certain that no single material simultaneously satisfies all possible requirements because some requirements conflict with other requirements. For example, it is desirable that the liquid crystal cell respond quickly to changes in the data pattern presented to it. It is also desirable that the liquid crystal cell smooth the pulse width modulation pattern applied to it. These two features conflict with one another. In the examples of the present application the assumption will be that the smoothing feature dominates over the response time for new all pulse width modulation patterns unless otherwise indicated.

The following table from Table 1 in "Studies of Liquid Crystal Response Time," Wang, University of Central Florida, Doctoral Dissertation, 2005, shows a number of factors pertaining to a liquid crystal cell and their impact on the response time of a liquid crystal cell.

| Factors | $T_{rise}$ | $T_{decay}$ |
|---|---|---|
| Viscosity ($\gamma_1$) ↓ | ↓ | ↓ |
| Elastic constants ($K_{ii}$) ↑ | ↑ | ↓ |
| Dielectric anisotropy ($\Delta\epsilon$) ↑ | ↓ | ↓ |
| Thickness (d) ↓ | ↓ | ↓ |
| Pretilt angle ($\theta_0$) ↓ | ↑ | ↓ |
| Anchoring energy (W) ↑ | ↑ | ↓ |
| Temperature (T) ↑ | ↓ | ↓ |
| Voltage (v) ↑ | ↓ | ↓ |

The terms Trise and Tdecay are related to the drive state of the liquid crystal cell with specific regard to the magnitude of the potential between a pixel mirror and the common electrode.

| | LC Mode → | |
|---|---|---|
| Retardance State ↓ | Normally Black (VAN, etc.) | Normally White (parallel aligned homogeneous, etc.) |
| High Retardance | Rise (Driven) | Decay (Relaxed) |
| Low Retardance | Decay (Relaxed) | Rise (Driven) |

$T_{rise}$ is associated with the state in which the pixel mirror cell is driven to a higher absolute voltage relative to the common plane (ITO) voltage while $T_{decay}$ is associated with the state in which the pixel mirror cell is driven to a lower absolute voltage difference relative to the common plane voltage. A normally black liquid crystal cell rises to its high retardance state in response to a higher absolute voltage difference between the pixel mirror and the counter electrode and decays or falls or relaxes to its low retardance state in response to a lower absolute voltage difference between the pixel mirror and the common plane. A normally white liquid crystal cell decays or falls to its high retardance state in response to a lower absolute voltage between the pixel mirror and the common plane and rises to its low retardance state in response to a higher absolute voltage between the pixel mirror and the common plane.

A higher rotational viscosity $\gamma_1$ is associated with a higher rise and fall time, which is a desirable characteristic for a smooth response to a pulse width modulation sequence. Higher rotational viscosity is routinely associated with high birefringence ($\Delta n$) due to the molecular structure of the liquid crystal materials required to reach high birefringence.

The elastic constants $K_{11}$, $K_{22}$, and $K_{33}$ quantify the tendency of a liquid crystal cell to return to its relaxed state when the driving field is reduced or removed as well as its resistance to deformation when the driving field is increased. The listed elastic constants correspond to splay, twist and bend respectively. In a parallel aligned homogeneous liquid crystal cell the splay elastic constant $K_{11}$ is dominant. As $K_{11}$ increases the time required to move to its driven state increases and the time required to move to its relaxed state decreases.

Thus the performance of a liquid crystal cell under driving conditions is a complex matter as is well known in the art. Ultimately a particular liquid crystal cell configuration must be tested to determine precisely how it performs in response to a particular driving condition.

FIGS. 2A and 2B show the general construction of a liquid crystal on silicon (LCOS) micro-display panel 200. A single pixel cell 205 includes a liquid crystal layer 230 between a transparent common electrode 242 formed on glass substrate 240, and a pixel electrode 250. Alignment layers (not shown) of a suitable material such as polyimide or silicon dioxide (SiO2) as is well known in the art, are interposed between transparent electrode 242 and liquid crystal layer 230 and between liquid crystal layer 230 and pixel electrode 250. A storage element 210 is coupled to the pixel electrode 250, and includes complementary data input terminals 212 and 214, a data output terminal 216, and a control terminal 218. The storage element 210 is responsive to a write signal placed on control terminal 218, reads complementary data signals asserted on a pair of bit lines ($B_{POS}$ and $B_{NEG}$) 220 and 222, and latches the data signal through the output terminal 216. Since the output terminal 216 is coupled to the pixel electrode 250, the data (i.e. high or low voltage) passed by the storage element 210 is imparted on pixel electrode 250. Pixel electrode 250 is preferably formed from a highly reflective polished aluminum. In the liquid crystal display panel 200, a pixel electrode 250 is provided for each pixel in the display. For example, in a Full High Definition display system conforming to the SMPTE 274M-2005 standard that requires an array of 1920×1080 pixels, there would be an individual pixel electrode 250 for each of the 2,073,600 pixels in the array. The transparent common electrode 242 is preferably formed from Indium Tin-Oxide (ITO) on glass substrate 240 by some suitable process such as sputtering. A voltage ($V_{ITO}$) is applied to transparent common electrode 242 through a common electrode terminal (not shown) and in conjunction with the voltage applied to each individual pixel electrode, determines the magnitude and polarity of the voltage across liquid crystal layer 230 within each pixel cell 205 in the display panel 200.

When incident polarized beam of light 260 is directed at pixel cell 205, passes through transparent common electrode 242 the polarization state of incident beam of light 260 is modified by the liquid crystal material 230. The manner in which the liquid crystal material 230 modifies the state of polarization of incident beam of light 260 is dependent on the orientation of the liquid crystal molecules within the path of the beam of light 260 which is in turn dependent on the RMS voltage applied across the liquid crystal between common electrode 242 and pixel electrode 250. For example, applying a certain voltage across the liquid crystal material 230 will reflect beam of light 262 but in a form wherein the polarization state of beam of light 262 is only identical to that of beam of light 260 when the molecules of liquid crystal layer 230 are oriented such that no change to the polarization state of beam of light 260 occurs. This is well known in the art. When reflected beam of light 262 possesses a polarization state differing from that of incident beam of light 260, thus encoding information onto the beam of light 262. a fraction of the incident polarized_light to be reflected back through the liquid crystal material and the transparent common electrode 240 in a modified polarization state that will pass through subsequent polarizing elements. After passing through the liquid crystal material 230, the incident light beam 260 is reflected by the pixel electrode 250 and back through the liquid crystal material 230. After reflected beam of light 262 passes through subsequent polarizing elements and is thereby analyzed, according to the term of art, the analyzed beam of light (not shown) is attenuated according to the specifics of the exact polarization state of reflected beam of light 262. The luminance of an exiting light beam 262 is thus dependent on the degree of polarization rotation imparted by the liquid crystal material 230, which is in turn dependent on the voltage applied across the liquid crystal material 230.

Storage element 210 is preferably formed from a CMOS transistor array in the form of a static random access memory (SRAM) cell, i.e., a latch, but may be formed from other known memory logic circuits. SRAM latches are well known in semiconductor design and manufacturing and provide the ability to store a data value, as long as power is applied to the circuit. Other control transistors may be incorporated into the memory chip as well. The physical size of a liquid crystal display panel utilizing pixel cells 205 is determined by a number of factors, including the pixel size, the array dimensions and the amount of border space required for row and column addressing circuits as well as bond pads and buffering circuitry. Pixel sizes in use today were deemed optically impossible late in the 1990s decade.

Since the transparent common electrode 242 and glass substrate 240 form a single common electrode, their physical size will substantially match the total physical size of the pixel cell array with some margins to permit external electrical contact with the ITO and space for gaskets and a fill hole to permit the device to be sealed after it is filled with liquid crystal (not shown).

In U.S. Pat. No. 8,421,828, hereinafter '828, applicant discloses a method for applying pulse width modulation to a digital display backplane. The modulation method uses different row spacings within a group of row write actions to form a template that can then be repeated by adjusting the start point of a subsequent application of the template while maintaining the same row spacing between members of the group. Because the row write actions are not always physically adjacent it is necessary to insure that the rows of the display are addressed using row address decoder means and not using a shift register write mechanism. A suitable row addressing scheme has long been known in the art of digital memory devices, including SRAM memories. A suitable implementation of a row address decoder circuit is disclosed in "Modern MOS Technology: Processes, Devices, and Design", pp. 208-211, DeWitt G. Ong, McGraw-Hill, 1984.

FIG. 3A shows an electro-optical curve (EO-curve or liquid crystal response curve) for a typical phase only liquid crystal mode known as the parallel aligned ECB (electrically controlled birefringence) mode with optical compensation operated in the normally white (NW) mode from "Introduction to Microdisplays", Armitage et al, FIG. 6.11, page 183. Three curves are presented for three different wavelengths of light. The parallel aligned ECB mode is ideal for a phase only spatial light modulator. Care should be taken to insure that the light to be phase modulated is substantially polarized and that the polarization vector is aligned with the front director of the liquid crystal cell. As illustrated in FIG. 3A, as the voltage applied to the liquid crystal increases, the degree of modification to the phase state of the reflected light is decreased. As a practical consideration the prime consideration for a phase modulator is not the degree of phase shift induced on the illumination beam but rather the relative phase induced on light reflected by each pixel mirrors. This is purely a function of the modulation induced by each pixel. At an RMS voltage that corresponds to the point of least retardance, the crystal components are aligned in an approximately vertical stack of liquid crystal molecules such that the phase of the reflected light is modified least compared to that of the incoming light source. As a result the concepts of high contrast and dark state so commonly used in display systems are less meaningful.

FIG. 3B depicts a response waveform 186 of a parallel aligned phase only liquid crystal mode device to square wave voltage waveform 185. Square wave voltage waveform 185 represents a typical waveform seen in a pulse width modulated display. Response waveform 186 is typical of parallel aligned liquid crystal mode devices in that the rise time to full retardance is slow (relaxation mode) and the fall time to lower retardance is fast (driven mode).

FIG. 4 shows a block diagram of a single pixel cell 305 of a display with the pixel circuit disclosed in U.S. Pat. No. 7,443,374. Pixel cell 305 comprises storage element 300, DC (direct current) balance control element 320, and inverter 340. DC balance control element 320 is preferably a CMOS based logic device that can selectively pass to another device one of several input voltages. Storage element 300 comprises complementary input terminals 302 and 304, respectively coupled to data lines ($B_{POS}$) 350 and ($B_{NEG}$) 352. Storage element 300 also comprises complementary enable terminals 306 and 307 coupled to word line ($W_{LINE}$) 356, and a pair of complementary data output terminals ($S_{POS}$) 308, and ($S_{NEG}$) 310. In the present embodiment, storage element 300 is an SRAM latch, but those skilled in the art will understand that any storage element capable of receiving a data bit, storing the bit, and asserting the complementary states of the stored bit on complementary output terminals may be substituted for the SRAM latch storage element 300 described herein.

DC balance control element 320 comprises complementary data input terminals 324 and 326 which are coupled respectively to data output terminals ($S_{POS}$) 308 and ($S_{NEG}$) 310 of storage element 300. DC balance control element 320 also comprises a first voltage supply terminal 328, and a second voltage supply terminal 330, which are coupled respectively to the third voltage supply terminal ($V_{SWA\_P}$) 376, and the fourth voltage supply terminal ($V_{SWA\_N}$) 378 of voltage controller 384 (See FIG. 7). DC balance control element 320 further includes a third voltage supply terminal 332, and a fourth voltage supply terminal 334, which are coupled respectively to the fifth voltage supply terminal ($V_{SWB\_P}$) 380, and the sixth voltage supply terminal ($V_{SWA\_N}$) 382 of voltage controller 384. (See FIG. 7) DC balance control element 320 further comprises data output terminal 322 that is coupled to data input terminal 348 of inverter 340.

A full explanation of the operation of DC balance control element 320 is found in U.S. Pat. No. 7,443,374, in FIG. 6, and the corresponding text at Col. 11, lines 32-51, as corrected. And in FIGS. 12A through 12F and the corresponding text at Col. 17, line 18, through Col. 18, line 9.

Inverter 340 includes first voltage supply terminal 342, and second voltage supply terminal 344, which are coupled respectively to first voltage supply terminal ($V_1$) 372, and second voltage supply terminal ($V_0$) 374 of voltage controller 384. Inverter 340 also comprises data input terminal 348 coupled to data output terminal 322 of DC balance control element 320, and pixel voltage output terminal ($V_{PIX}$) 346 coupled to pixel mirror 354. Responsive to the voltage asserted on input terminal 348, inverter 340 asserts the correct voltage among $V_0$ 374 and $V_1$ 372 onto pixel mirror 354 through output terminal 346.

U.S. Pat. Nos. 6,005,558, 6,067,065, 7,379,043, 7,443,374, 7,468,717 and 8,040,311 disclose backplanes compatible with the modulation method of the present application. These patents are incorporated into the present application in their entireties by reference.

FIG. 5 depicts voltage and control logic for a display system 394 comprises an array of pixel cells 305 comprising a plurality of rows and columns, voltage controller 384, a processing unit 388, memory unit 386, and transparent common electrode 392. Transparent common electrode 392 overlays the entire array of pixel cells 305. In a preferred example, pixel cells 305 are formed on a silicon substrate or base material, and are overlaid with an array of pixel mirrors 354 (from FIG. 4), each single pixel mirror 354 forming a part of one of the pixel cells 305. Each pixel cell 305 comprises the circuit elements disclosed in FIG. 4. A substantially uniform layer of liquid crystal material is located in between the array of pixel mirrors 354 and the transparent common electrode 392. Transparent common electrode 392 is preferably formed by a transparent conductive material such as Indium Tin-Oxide (ITO) coated onto a glass substrate as previously disclosed in FIGS. 2A and 2B, items 242 and 240, respectively. Memory unit 386 is a computer readable medium including programmed data and commands. The memory unit 386 is capable of directing processing unit 388 to implement various voltage modulation and other control schemes. Processing unit 388 receives data and commands from memory unit 386, via memory bus 387, provides internal voltage control signals, via voltage control bus 390, to voltage controller 384, and provides data signals (i.e. image data into the pixel array) via data control bus 385 (connection not shown). Voltage controller 384, memory unit 386, and processing unit 388 may be separate units or alternative may form part of a larger circuit assembly in a larger integrated circuit or circuit board assembly. Memory unit 386 may comprise both operating RAM and nonvolatile memory such as an SPI (Serial Peripheral Interface) memory. (Not shown)

Responsive to control signals received from processing unit 388, via voltage control bus 390, voltage controller 384 provides predetermined voltages to each pixel cells 305 via a first voltage supply terminal ($V_1$) 372, a second voltage supply terminal ($V_0$) 374, a third (logic) voltage supply terminal ($V_{SWA\_P}$) 376, and a fourth (logic) voltage supply terminal ($V_{SWA\_N}$) 378, a fifth (logic) voltage supply terminal ($V_{SWB\_P}$) 380, and a sixth (logic) voltage supply terminal ($V_{SWB\_N}$) 382. Voltage controller 384 also supplies predetermined voltages $V_{ITO\_L}$ by voltage supply terminal 396 and $V_{ITO\_H}$ by voltage supply terminal 397 to ITO voltage multiplexer 399. Voltage multiplexer 399 selects between $V_{ITO\_L}$ and $V_{ITO\_H}$ based on control signals received from processing unit 388. Processing unit 388 controls the logic state of (logic) voltage supply terminals $V_{SWA\_P}$ 376, $V_{SWA\_N}$ 378, $V_{SWB\_P}$ 380, and $V_{SWB\_N}$ 382 in synchronization with switching of $V_{ITO}$ 398 between $V_{ITO\_L}$ 397 and $V_{ITO\_H}$ 396. ITO voltage multiplex unit 399 delivers VITO to the transparent common electrode 392, by voltage supply terminal ($V_{ITO}$) 398. Each of the voltage supply terminals $V_1$ 372, $V_0$ 374, $V_{SWA\_P}$ 376, $V_{SWA\_N}$ 378, $V_{SWB\_P}$ 380, and $V_{SWB\_N}$ 382 in FIG. 5 are global signals, wherein each global terminal supplies the same voltage to each pixel cell 305 throughout the entire pixel array at any given instant in the operation of display system 394. $V_{ITO}$ 398 asserts a single voltage selected by multiplexer 399 from $V_{ITO\_L}$ 397 and $V_{ITO\_H}$ 396 on transparent common electrode 392.

Voltages generated within voltage controller 384 may be generated by the use of digital to analog converters (DAC) and calibrated op-amps, as is well known in the art. Such arrangements create very precise voltages suitable for use in the present application. Such devices are subject to external control by devices such as processing unit 388 by use of voltage set commands which establish a new voltage to be generated by the DAC. A common form of DAC is an rDAC based on the use of a resistor lattice.

FIG. 6A depicts the movement of digital data and digital control signals in a display system. Display system 400 comprises microdisplay controller 420, digital image data input terminal 433, DDR SDRAM (double data rate synchronous dynamic random access memory) 430, memory control interface 431, memory data interface 432, microdisplay 440 and various digital control and data lines (402, 404, 406, 408, 410) that connect microdisplay controller 420 to microdisplay 440. Although DDR SDRAM 430 is preferably a DDR memory with a double data rate interface, other memory devices known in the art may be used. Digital image data input terminal 433 may receive data from a digital input such as HDMI (high definition multimedia interface) or DVI (digital video interface), or may receive input image data from a format converter device operative to receive digital or analog image signal and convert and reformat those signals as is well known in the art.

Image modulation data, whether reformatted or not, is delivered to the microdisplay in a compatible manner for the microdisplay. Those of experience in the art will recognize that the full resolution of the display need not be used for a properly designed microdisplay system. The input image data for each pixel comprises a desired luminance level for that pixel for that image data frame, typically in numerical format. Luminance levels are not absolute but are rather relative to other luminance levels and should be displayed according to the performance characteristics of the display system. A typical luminance level may be defined as representing 8 bit color (256 gray levels) or 10 bit color (1024 gray levels). The number is arbitrary and normally defined by industry standards and display performance characteristics.

Line 402 may comprise a plurality of complementary clock lines. The clock lines allow microdisplay 440 and microdisplay controller 420 to conduct a synchronized transfer of data over a plurality of parallel data transfer lines 410. In one embodiment data transfer lines 410 comprise 64 parallel data lines. In another embodiment data transfer lines 410 comprises 128 parallel data lines. Those of ordinary skill in the art will recognize that the number of parallel data lines may be an arbitrary number and that the maximum number may be dictated by external factors such as the minimum spacing and minimum size of wire bond pads and the space available in which to fabricate said wire bond pads. Line 404 may comprise a set of operation code lines that control the microdisplay 440 and instruct it to handle the data coming over parallel data transfer lines as address information or data information or as some other form of information that may be useful in a practical system. Line 406 may comprise a serial input-output interface. A serial input-output interface may be utilized to transfer control instructions from microdisplay controller 420 to microdisplay 440. Other control functions comprise functions to control other features of microdisplay 440 such as setup configuration. Line 408 may comprise additional features such as control of a temperature measurement sensor (not shown) with bidirectional data flow. A temperature sensor of the type required is disclosed in published patent application US2005/0,052,437, the contents whereof are incorporated into the present application by reference. Other data lines may include such items as a field-invert (FI) signal (not shown) wherein the field-invert signal controls circuitry that triggers a change to the DC balance state of a pixel such as that shown in FIG. 4 by controlling DC balance control element 320 as previously described. Those of ordinary skill in the art will recognize other useful features that may be implemented in an interface between a microdisplay 440 and a microdisplay controller 420. Therefore, the present list is not considered limiting.

FIG. 6B depicts a functional schematic of microdisplay controller 420. Digital data of an image to be displayed is received by terminal 433 on HDMI (High Definition Multimedia Interface) interface 421. Alternatively, the digital data may be received from any industry standard or proprietary digital image interface. The digital data may be received from another device capable of rescaling images or enacting frame rate change or other changes or combination of changes. HDMI interface 422 receives the incoming digital data from a digital video source comprising a pixel clock, horizontal and vertical sync signals, and pixel data for one or more colors. Bit depth may be an industry standard such as 8 bits per color or another arbitrary or emerging standard.

Data received is transferred by logical/serial interface 429 to color shading correction unit 422. Color shading correction unit 422 receives digital input image data and acts upon that data to apply correction factors to the image data such that the hue of the final displayed image is close to the desired color. The origins of color shading errors may originate in a number of causes, including non-uniformities in the display device. A more detailed explanation of color shading correction is found in U.S. Pat. No. 7,129,920 and U.S. Pat. No. 7,990,353, the contents whereof are incorporated into the present patent application by reference. In one embodiment the output data upon which color shading correction unit 422 acts has different bit depth to that of the input data.

Color shading correction unit 422 delivers its output data to look-up table (LUT) unit 423 through logical/serial interface 434. LUT unit 423 acts upon the input data to apply a set of corrections for liquid crystal non-linearity and for other desirable corrections such as for gamma correction, thereby assuring that changes in the image data result in the expected change in the luminance of the image when displayed.

LUT unit 423 delivers its output data to byte-explode unit 424 via logical/serial interface 435. Byte-explode unit 424 acts upon data received from LUT unit 423 to convert the data into a form suitable for display. Byte-explode unit 424 takes the data and expands the number of bits comprising the data. In one instance, byte-explode unit 424 maps the binary data to a larger number of binary weighted and non-binary weighted bits. In one embodiment the non-binary weighted bits comprise a set of "thermometer" or unary (Base 1) bits of higher order than the set of binary weighted bits. In one instance, at least one of the unary bits is of different temporal weighting than the other unary bits. In one embodiment the temporal ordering of the unary bits differs from the order in which the unary bits are activated with increasing gray scale.

The expanded byte count data output of Byte-Explode unit 424 is transferred over logical interface 436 to DDR SDRAM Controller/Interface 425 for transfer to DDR SDRAM 430 (not shown) over memory data interface 432 for buffering. Placement and retrieval of the transferred data is responsive to instructions sent over memory control interface 431. In one example, the expanded byte count data for a row is stored according the temporal order in which the data is to be displayed. In one example, Byte-Explode unit 424 receives data from HDMI Interface 421 and delivers its output to Color Shading Correction unit 422.

The expanded byte count data remains in DDR SDRAM 430 until retrieved by DDR SDRAM controller/Interface 425 over logical interface 432. DDR SDRAM Memory Controller/Interface 425 delivers the retrieved data over logical interface 437 to Bit Plane Scheduler and Sequencer 426.

Bit Plane Scheduler and Sequencer 426 receives expanded byte count data and converts the data into a time ordered sequence of row write events A row write event is the writing of an entire row of the display with binary data corresponding to a modulation state for each pixel on the row. In one instance, the binary data is preceded by data defining the row to which the subsequent data is to be written. The time ordered sequence of row write events is delivered to microdisplay buffer and interface 427 by logical interface 438.

Microdisplay buffer and interface 427 performs actions such as voltage scaling to the signals representing the data for the row write actions to enable it to be electrically transferred to microdisplay 440 over output interface 439. Output interface 439 may be preferably a flexible printed circuit assembly (FPCA) or alternatively may form part of the same printed circuit board as the other components of microdisplay controller 420 or some other form as is known in the art. Output interface 439 comprises a set of parallel lines configured so as to enable the transfer of the row write information to microdisplay 440.

FIG. 6C depicts a functional diagram of the data transfer sections of microdisplay 440. Microdisplay comprises pixel array 441, row decoder left 445, row decoder right 446, column data register array 444, control block 443, and wire bond pad block 442. Wire bond pad block 442 is configured so as to enable contact with an FPCA or other suitable connecting means so as to receive data and control signals over lines from microdisplay controller 420. The data and control signal lines comprise clock signal lines 402, op code signal lines 404, serial input-output signal lines 406, bidirectional temperature signal lines 408, and parallel data signal lines 410.

Wire bond pad block 442 receives image modulation data and control signals and moves these signals to control block 443. Control block 443 receives the image modulation data and routes the image modulation data to column data register array 444. Row address information is routed to row decoder left 445 and to row decoder right 446. In one instance, the value of the Op Code lines 404 determines whether data received on the parallel data signal lines 410 is address information or image data. In one instance, the row address information acts as header, appearing first in time, to be followed by image data for that row.

Row decoder left 445 and row decoder right 446 are configured so as to pull the word line for the decoded row high so that image modulation data for that row may be transferred from column data register array 444 to the storage elements resident in the pixel cells of that row of pixel array 441, as previously described in FIG. 4 and associated text.

One important requirement for any beam steering device is the need to calibrate the performance of the phase-aligned spatial light modulator. FIG. 7A presents Ronchi interferometer 140 comprising coherent light source 142, collimating lens 146, polarizer 148, half wave retarder 150, non-polarizing beam splitter 152, microdisplay 158, polarizer/analyzer 164, focus lens 166, and photometer 170. Coherent light source 142 emits coherent beam of light 144. Collimating lens 146 acts upon coherent beam of light 144 to collimated coherent beam of light 144. Polarizer 148 acts upon coherent beam of light 144 to polarize said beam of light 144. Half wave retarder 150 acts upon coherent beam of light to modify the orientation of the polarization vector of said coherent beam of light 144. Non-polarizing beam splitter 152 acts upon coherent beam of light 144 to pass half of said coherent beam of light 144 to microdisplay 158 and to reflect half of said coherent beam of light 144 to an optical dump (not shown). Microdisplay 158 acts upon coherent beam of light 144 to phase modulate said coherent beam of light with Ronchi phase grating 154. Modulated coherent beam of light 168 is reflected by microdisplay 158 to non-polarizing beam splitter 152. Non polarizing beam splitter 152 acts upon modulated coherent beam of light 168 by reflecting half of said modulated coherent beam of light 168 to analyzer 164 and passing half of said modulated coherent beam of light 168 in a reverse path through half wave retarder 150. Said modulated coherent beam of light 168 is analyzed by polarizer/analyzer 164 and then is focused onto photometer 170 by focus lens 166. Photometer 170 yields first order peak intensity graph 162 when Ronchi phase grating 154 is stepped through a range of phase states.

Ronchi phase grating 154 is further explained in FIG. 7B. Ronchi phase grating 154 comprises a set of stripes in alternating phase states. Stripe 194 represents a first phase state Nref. Phase state Nref corresponds to a reference phase state that remains constant throughout the evaluation of the phase states of microdisplay 158. Stripe 196 represents a second phase state Nv. Phase state Nv is stepped through a range of data states while phase state Nref is held constant. Photometer 170 collects amplitude data regarding the first order diffraction which is then used to estimate the phase state.

Once phase state data is collected for the desired range of values for a phase modulator, this data can be put to use to simplify the construction of specific phase mask configurations on the face of the microdisplay. FIGS. 8A through 8C illustrate a method for using phase data collected to construct a lookup table such that the individual pixels of a phase modulator may be driven to known phase states in order to facilitate creating a desired modulation upon an incident coherent beam of light (not shown.) The details are presented in detail in "Multipoint phase calibration for improved compensation of inherent wavefront distortion in parallel aligned liquid crystal on silicon display," Oton et al, Applied Optics, Vol. 46, No. 23, pages 5667-5679, Optical Society of America, 2007.

FIG. 8A presents a curve of relative phase (y-axis) as a function of index level. Note that the y-axis of FIG. 8A depicts a total phase modulation range of $3\pi$ radians. In most phase modulation applications, the modulation range may be limited to $2\pi$ radians since x radians and x+$2\pi$ radians are considered to be the same in phase space considerations. An alternative name for index level is modulation code. Modulation codes are often developed for use in conjunction with specific hardware implementations, and may represent a variety of differing conditions. No industry standard exists and each manufacturer typically develops a proprietary version based on its own hardware.

FIG. 8B depicts a mapping between an 8 bit gray level range (0 to 255) and a subset of the index levels of FIG. 8A. In this example the range of index levels from 200 to 680 was selected because it covers the required $2\pi$ radians of phase modulation and because it is the most linear portion of the mapping of FIG. 8A.

The number of points in the selected range of the index level is 480, which offers the choice of those 480 points to make the final range of phase modulation steps generated by the mapped gray level range of 0 to 255 linear. FIG. 8C depicts the final range of phase modulation steps relative to gray levels, and by inspection the result is substantially linear.

Digital pulse width modulated displays offer several advantages over analog driven displays. First, it is possible to control time more precisely than voltage which offers better control over phase steps. Second, the pixel voltage can be constantly supplied and does not rely upon a capacitive element in the pixel to hold the charge. Third, it is less prone to be affected by high light loads. Applicant has developed hardware and software to enable application of its pulse width modulation methods to the task of pulse width modulating a phase aligned spatial light modulator.

SUMMARY OF THE PRESENT INVENTION

It is therefore an objective of the present invention to further improve a phase modulation display system by providing a system and method to pulse width modulate the display with a full range of phase steps within a limited bandwidth interface.

In summary, this invention discloses a method of organizing and ordering pulse width modulation image data so that it may be displayed on the pixels of a phase modulation display system. The method comprises a means of populating otherwise unused time slots within a subframe with additional steps to provide expanded gray scale performance at the lower end of the gray scale range. The method includes a method of formatting received image data into a different form suitable for driving a pulse width modulated display and a method of distributing image modulation data across a series of different major modulation segment to minimize flicker and phase step errors.

One objective of the present application is to provide a method of pulse width modulating a spatial light modulator. The method comprises determining a modulation sequence and applying said modulation sequence to said spatial light modulator in a time order method. Said modulation sequence comprises a plurality of minor modulation segments. Each minor modulation segment comprises an "always on" modulation segment in an "always on" state. Said plurality of minor modulation segments are temporally spaced such that said "always on" modulation segments are spaced at predetermined intervals. Each minor modulation segment comprises at least one thermometer bit.

Another objective of the present application is to provide a method of pulse width modulating a spatial light modulator. The method comprises determining a modulation sequence and applying said modulation sequence to said spatial light modulator. Said modulation sequence comprises at least one major or minor modulation segment. Said modulation sequence is comprised of time slots of thermometer bit segments or lesser significant bit segment to which thermometer bits or lesser significant bits are assigned respectively according to a predetermined temporal order. Time slots assigned to be occupied by thermometer bits in an off state are occupied by segments of subthermometer bits according to a predetermined set of rules.

These and other objects and advantages of the present invention will no doubt become obvious to those of ordinary skill in the art after having read the following detailed description of the preferred embodiments, which is illustrated in the various drawing figures.

BRIEF DESCRIPTION OF THE DRAWINGS

FIG. 6C is a block diagram of a liquid crystal display in accordance with the present invention;

FIG. 9D presents an abbreviated mapping from image code to activation of lesser bit segments and the first two thermometer bits.

FIGS. 9E and 9F present a summary of mapping from image code to "on" state for thermometer bits and lsb bits limited to the first and last values for each thermometer bit.

FIG. 10A presents a subtherm template to be applied to the major modulation segment of FIG. 9A.

FIG. 10B presents the order in which the subtherms of the template of FIG. 10A are turned on.

FIGS. 10D-10G depict subsets of the major modulation segment of FIG. 9A wherein the subtherm template of FIG. 10A is applied at different time slots.

FIG. 11A presents a subtherm template to be applied to the major modulation segment of FIG. 9A.

FIG. 11B presents the order in which the subtherms of the template of FIG. 10A are turned on.

FIG. 12B describes time intervals required to implement the phase modulation sequence of FIG. 12A.

FIGS. 12E-12H depict a first 10 time units of the operation of a modulation sequence after FIG. 12A on the rows of a display;

FIG. 13B describes time intervals required to implement the phase modulation sequence of FIG. 13A.

FIGS. 13C-13E depict a first 10 time units of the operation of a phase modulation sequence after FIG. 13A on the rows of a display;

FIG. 14B describes time intervals required to implement the phase modulation sequence of FIG. 14A.

FIGS. 14C-14E depict a first 10 time units of the operation of a modulation sequence after FIG. 14A on the rows of a display;

DETAILED DESCRIPTION OF THE INVENTION

Figure 1:
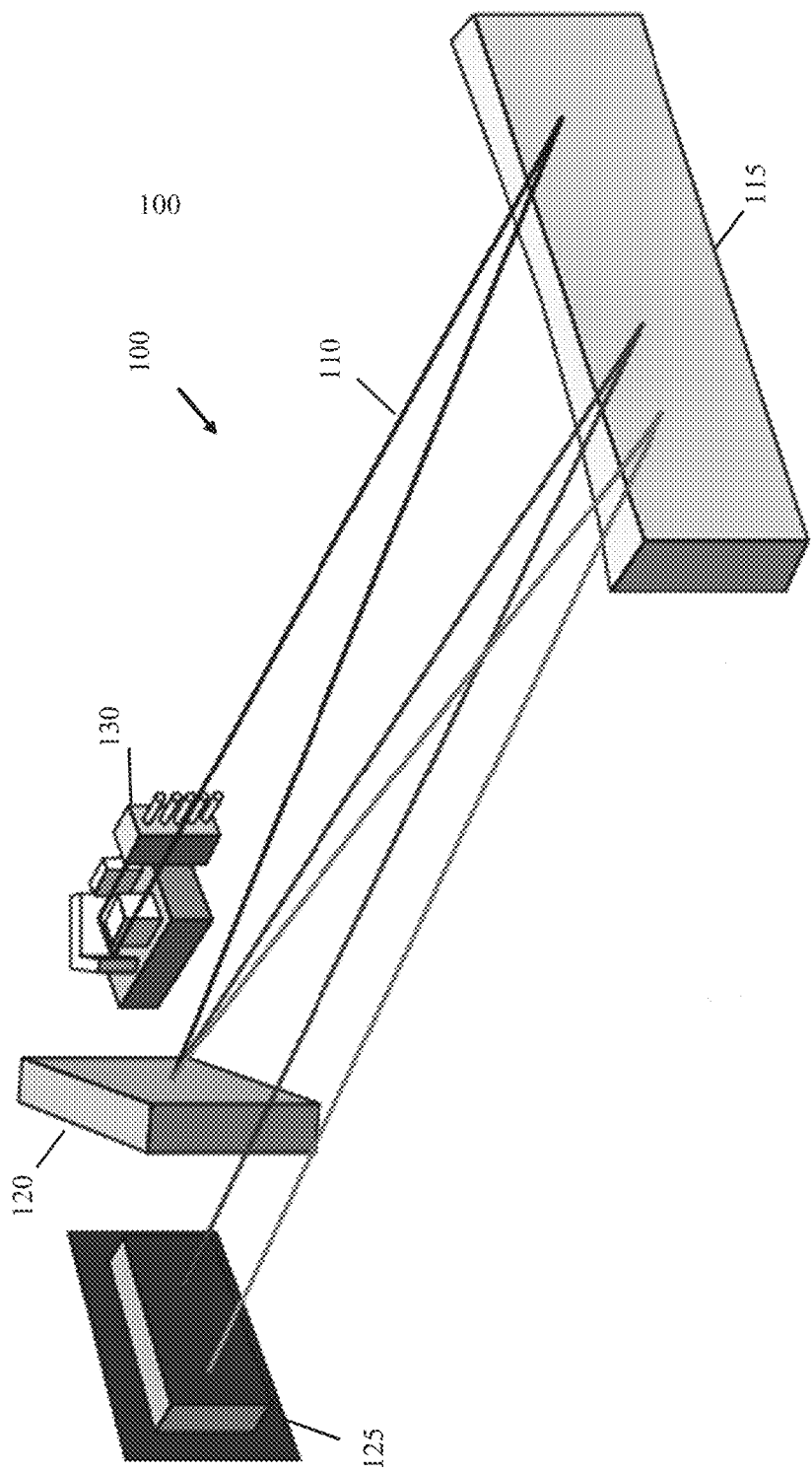
FIG. 1 is a schematic diagram of a Reconfigurable Optical Add Drop Multiplexer.
Figure 2A:
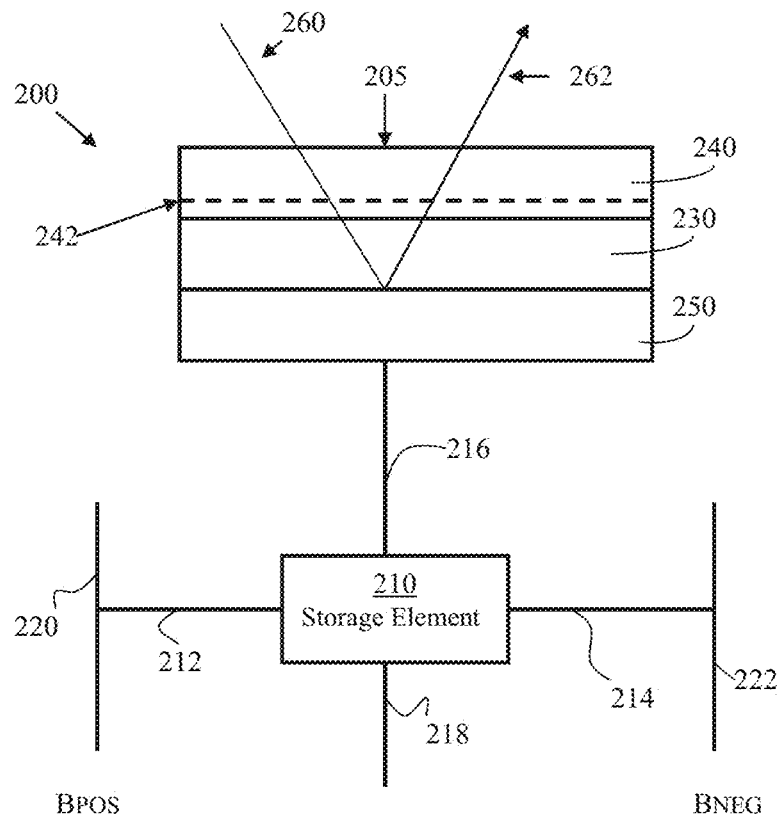
FIG. 2A is a diagram of a single pixel of a liquid crystal on silicon display.
Figure 2B:
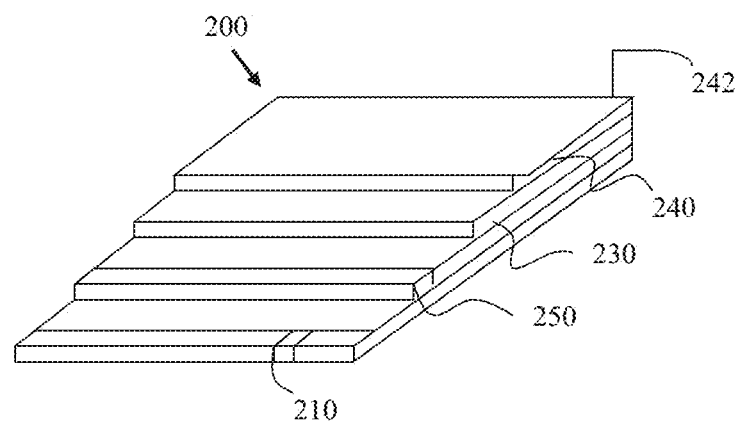
FIG. 2B is a perspective view of the layers of a liquid crystal on silicon display.

It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. Thus, for example, reference to "a material" may include mixtures of materials; reference to "a display" may include multiple displays, and the like. References cited herein are hereby incorporated by reference in their entirety, except to the extent that they conflict with teachings explicitly set forth in this specification.

In the following description applicant makes use of the term "write pointer." The term "virtual write pointers" is also used for a pattern of row write actions accomplished in a time ordered sequence. Each member of the pattern of "virtual write pointers" is serviced by a "physical write pointer" in turn according to the predetermined order of execution. Because the pattern is always repeated precisely in both spacing and in the order of execution of the row write actions the spacings may be considered a template or pattern. The total pattern of row write pointers may be termed a "modulation sequence."

A "modulation sequence" comprises at least one of a major modulation segment or a minor modulation segment or of both. It represents the totality of the modulation intended for a color of a display for a single frame of data. A "terminated write pointer" is a special class of write pointer that is writes a single image data value to the pixels of a specific row in conjunction with the writing of image modulation data to a different row. A terminated row is normally set to the dark state. In some instance "terminated write pointer" may be understood from context to mean "row write action by a terminated write pointer." The concept is fully described in U.S. Pat. No. 7,852,307, the contents whereof are incorporated into the present application by reference. In summary, a terminated write pointer is generated by an instruction transferred from the microdisplay controller to the microdisplay in a single cycle of a larger collection of cycles to write image modulation data to a different row. A terminated write pointer writes a single data value, normally dark state, to all pixels on the row to be terminated. In this application a terminated write pointer may write either dark state to all pixels of a row or bright state to all pixels of a row. This provides an ability to reduce the duration of a pulse width modulation for a lesser bit to a duration shorter than the time required to write the entire display once from top to bottom.

In this application "dark state" data corresponds to a pixel data state that induces a lower retardance state on the liquid crystal cell and "bright state" data corresponds to a pixel data state that induces a higher retardance state on the liquid crystal cell. The convention is arbitrary.

A "row write action" in this application takes place when a (virtual) write pointer points or directs image modulation data for a row to that row. The physical write pointer is implemented through a row decoder circuit as is explained in this application. "Data" refers to "image modulation data" unless otherwise stated. Input image data and output image data will be differentiated when necessary.

Writing to a row shall mean writing image modulation data to each of the pixels of that row. Writing data to a pixel shall mean writing image modulation data to a memory storage cell corresponding to or located at that pixel. Image modulation data normally mean the modulation value stored in the memory cell, specifically "on" (active or bright state) or "off" (dark state).

The use of the term "time slot" or "time segment" in discussions of this application is a convention well known in the art. The time slots may be of substantially equal duration and may be determined by the time required to writing a plane of data to all rows of the display device. The time required may be determined by the limiting bandwidth between the display controller at its interface to external memory, between the display controller and its display, or within the controller based on computational requirements. Time slots in a sequence may be designated as "tsi" where i is an integer denoting the time ordered position in a sequence.

The duration of a time slot in the present application is determined by the time to write image data all pixels of each active row of the display, or, in other words, the time required to write a plane of data. Applicant has developed digital microdisplay products and controller system wherein the time required to write all pixels on active rows in a full high definition resolution (1920 by 1080) display is approximately 75 microseconds (μsec). This is equivalent to 222 bit planes during one input data frame at 60 FPS (16.667 milliseconds).

The writing of modulation data means just that. Each pixel may be in a different gray scale state to other pixels surrounding it which means that the combination of one and off thermometer bits, lesser significant bits and subtherms used to create that gray level will be different. The term "subtherm" would be described later.

In some instances the time slots may not be of substantially equal duration but rather may be of varying duration. Such variations may be used to perform such functions as gamma correction or to compensate for non-linearity in the performance of the liquid crystal device.

"Modulation segment" means a pulse width modulation segment of a fixed duration. "Bit plane" may be used in place of "modulation segment". "Modulation segments" begin when a write pointer directs image modulation data to a row and end when a next write pointer directs image modulation data to that row. The minimum duration of a modulation segment is the time required to write the entire display from top to bottom and then return to write it again. The pulse width modulation value represented within a time slot may be shorter than the duration of the time slot through the application of a terminated write pointer as previously described. The term "image modulation segment" may be used for clarity.

A "major modulation segment" means a plurality of modulation segments adjacent or nearly adjacent in time. A major modulation segment is normally associated with a single color subframe. The major modulation segment may comprise less than the full range of modulation segments available to create gray scale for a given color, in which case a plurality of major modulation segments, and therefore a plurality of color subframes for that given color, is required to generate the full range of gray scale. In the case of a monochrome phase aligned or amplitude aligned display the terminology may remain the same. The phrase "major modulation sequence" has the same meaning as major modulation segment unless otherwise indicated.

A "minor modulation segment" is similar to a major modulation segment in that it is comprised of a plurality of modulation segments adjacent or nearly adjacent in time. In the present application minor modulation segment comprises a small number of modulation segments, typically four or less, although this is not a fundamental limit.

An "always on segment" is a segment within a minor modulation segment wherein said segment is deployed such that it is always in an on state and is not turned on or off in response to image data. An always on segment may be approximate in value to a thermometer bit.

An "lsb segment" is a segment containing one of the lesser binary weighted bits. "Binary weighted" is a nominal term and the actual weighting can be adjusted to accommodate liquid crystal response characteristics.

A "thermometer bit" is a non-binary weighted bit which is, in one embodiment, approximate in value to the sum of the binary weighted lsb segments. A major modulation segment comprises a plurality of thermometer bits. "Value" in this case may represent a sum of the "on" times for the lsb segments or it may represent the sum of the intensities of the lsb segments. Either or a mix of the two is possible. The term "thermometer bit" is a term of art in the field of digital-to-analog converters (DACs). It is used to describe a DAC which accepts a digital input and yields a voltage out wherein the voltage out is related to the input digital input. The analogy is to a common mercury thermometer where the column of mercury increases in height as temperature increases, segment at a time. One specific type of DAC is the segmented DAC which uses thermometer bits for higher order bits and binary weighted bits for the lesser bits, a feature analogous to the application of that concept to pulse width modulation. The term carries over into the present application in reference to non-binary weighted modulation segments wherein a first thermometer bit at a designated location is "turned on" or "active" to achieve a first luminance level. When a second thermometer bit is turned on the first thermometer bit remains on and a second luminance level is reached. This continues until all thermometer bits are turned on. Said first thermometer bit may be considered to have a lowest value and said last thermometer bit may be considered to have a highest value.

The highest value results from the condition that all other thermometer bits are also on. In the present application when a thermometer bit is stated to be a higher value or a higher luminance value it is because all previously turned on thermometer bits remain on and the luminance of said thermometer bit is added to the luminance of said previously turned on thermometer bits.

A "subtherm" segment (abbreviated sth in this application) is a modulation segment that occupies a time slot allocated to a thermometer bit that is not in an active or on state. The "subtherm" may occupy the entire time slot or may be terminated by a terminated write pointer as previous mentioned. The purpose of the subtherm segments is to increase the number of gray scale steps available at lower modulation values. The subtherm segments are not fixed like the thermometer segments are, but rather precede the thermometer bits by a specific pattern of time slots. In one embodiment the subtherm pattern may be different at different points on the modulation curve. The term subtherm is derived from "sub thermometer" because it fits into a time slot that may be occupied by a thermometer bit but which does not have the same impact on gray scale because of its positioning.

In the present application the term "populated by" is used to explain in which time slot a particular modulation segment is located in. In the case of the lesser bit segments and thermometer bits the assigned time slots never change. Certainly time slots normally assigned to particular thermometer bits may be populated instead by subtherms. The phrase "occupied by" is of identical meaning. The active verbs "populate" and "occupy" have the same meaning.

An "image code" is a positive integer uniquely associated with a particular set of modulation segments. Use of an image code in place of a longer description of the modulation is desirable to keep notations short and succinct. In the case of a classic pulse width modulated display such as a plasma display panel (PDP) the image code can be configured to represent a gray scale level. In the present invention the image code is an integer that describes a particular state of a set of thermometer bits, subtherms, and lsbs. Image code is distinct from "image data" in that image data represents the desired output while image code refers to a particular modulation configuration of on and off states in a modulation sequence (comprising one or more modulation segments) that realizes a particular luminance level.

In summary, a set of rules to guide the distributing of thermometer bits and binary weighted lesser significant bits among the major modulation segments must take into account the need to minimize visual artifacts such as flicker and lateral field effects. Although the rules and related guidance address major modulation segments the same procedures may be applied to minor modulation segments. Following this set of rules will establish a set of modulation segment that can be tested. Ultimately a visual test of reference material of known qualities is required but these steps have been tested and found to yield good results.

First, determine the number of major modulation segments required for each color for those embodiments involving a plurality of colors and set a time order for the major modulation segments in an overall modulation scheme. In most phase applications only one color or range of colors is used, such as is the case for telecommunications applications. In those embodiments the same considerations apply as would be the case for a monochrome display.

Second, allocate the binary weighted lesser significant bits for a color to the major modulation segments for that color. Guiding principles include dividing the lesser significant bits such that the overall temporal duration of lesser significant bits is as equal as possible and allocating as few as possible to each major modulation segment.

Third, allocate the thermometer bits to the major modulation segments according to the following principles. A first step is to place the thermometer bits in the major modulation segments such that a first thermometer bit is located in a first major modulation segments and a second thermometer bit is located in a second major modulation segments.

If there are only two major modulation segments then clearly the third thermometer bit may be placed in either segment provided the fourth thermometer bit is placed in the remaining major modulation segment. This insures that the on state times in the major modulation segments will grow evenly, thus minimizing the possibility of flicker.

If there are three major modulation segments, then the first thermometer bit can be placed in the first major modulation segment, the second thermometer bit can be placed in the third major modulation segment, and the third thermometer bit can be placed in the second major modulation segment. It is also possible to allocate the thermometer bits as first thermometer bit to first major modulation segment, second to second and third to third. This is approach may generate a transitory flicker phenomena depending on major changes to gray scale levers between data frames.

If there are four major modulation segments, then the first thermometer bit can be placed in the first major modulation segment, the second thermometer bit can be placed in the third major modulation segment, the third thermometer bit can be place in the second major modulation segment, and the fourth thermometer bit can be place in the fourth major modulation segment. Alternative the third thermometer bit can be placed in the fourth major modulation segment and the fourth thermometer bit can be placed in the second major modulation segment.

If there are five major modulation segments, then the first thermometer bit can be placed in the first major modulation segment, the second thermometer bit can be placed in the third major modulation segment, the third thermometer bit can be placed in the fifth major modulation segment, the fourth thermometer bit can be placed in either the fourth or the second major modulation segment and the fifth thermometer bit can be placed in the remaining major modulation segment.

The guiding principle is that the thermometer bits are to be distributed so that two general conditions are satisfied. First, as the number of thermometer bits set to an on state increases the on state time duration of any one of the major modulation segments does not differ by more than one thermometer bit time slot possibly combined with one lesser bit segment from the on state time duration of any of the other major modulation segments. Second, the thermometer bits should be placed in temporally non-adjacent major modulation segments to the extent temporally non-adjacent major modulation segments are available provided that the first generation condition of this paragraph takes precedence. Since the on state or off state status of the binary weighted lesser significant bits is unpredictable those bit are ignored in the application of the guiding principle.

Figure 9A:
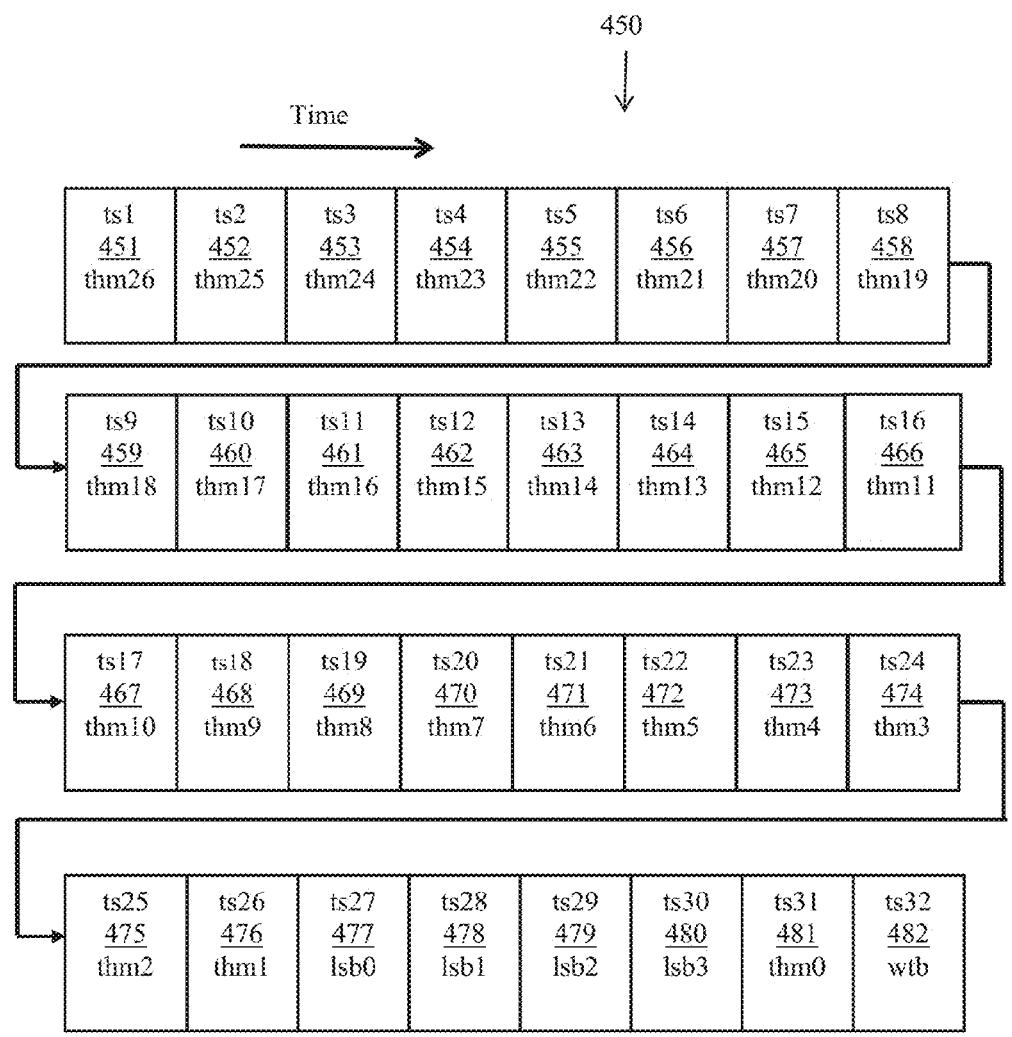
FIG. 9A depicts a major modulation segment according to the present invention.

FIG. 9A presents an overview of a first embodiment of a major modulation segment incorporating one element of the present invention. Major modulation segment 450 comprises an ordered series of time slots 1 (ts1) 451 through ts32 482 with ts1 451 occurring first, ts2 452 occurring second, and so forth until ts32 482 occurs last for a total of 32 time slots. Thm0 through thm26 are thermometer bits assigned to specific time slots in the modulation segment. Ts1 451 through ts26 476 with thm1 through thm26 ordered in reverse order such that thm1 occurs last and thm26 occurs first. Lesser significant bits lsb0 through lsb3 are assigned to ts27 477 through ts30 480, with lsb0 assigned to ts27 477 with lsb1, lsb2 and lsb3 following consecutively in time slots ts28 478, ts29 479 and ts30 480. Those skilled in the art will recognize that the order in which the lesser bits are displayed may be altered based on pragmatic decisions. Thm0 at ts31 481 follows lsb30 at ts30 480. A "write to black" (wtb) action is position in the last time slot ts32 482 wherein all pixels of the array are set to a dark state.

The positioning of thm0 at ts31 481 and the positioning of the wtb segment at ts32 482 insures that the state of the liquid crystal cell at the beginning of the next modulation segment is uniform, which experimentally has been shown to result in an improved image state by reducing image data cross coupling between color subframes. Data cross coupling occurs when image modulation data for one color is still present on the display when the next color is shown.

One important consideration is the order in which the thermometer bits are turned on with increasing gray scale. In this application the convention is that each thermometer bit is turned on in numerical order. That means that thm0 is turned on first, thm1 is turned on second and so forth until thm26 is turned on last. As previously noted once a thermometer bit is turned on it is never turned off as gray scale increases further. The second convention is that the lsb segments are turned on according to the modulation value they are intended to represent. The relative values for lsb0, lsb1, lsb2 and lsb3 are 1, 2, 4, and 8 respectively, as is the common practice in the field of pulse width modulated displays.

Figure 9B:
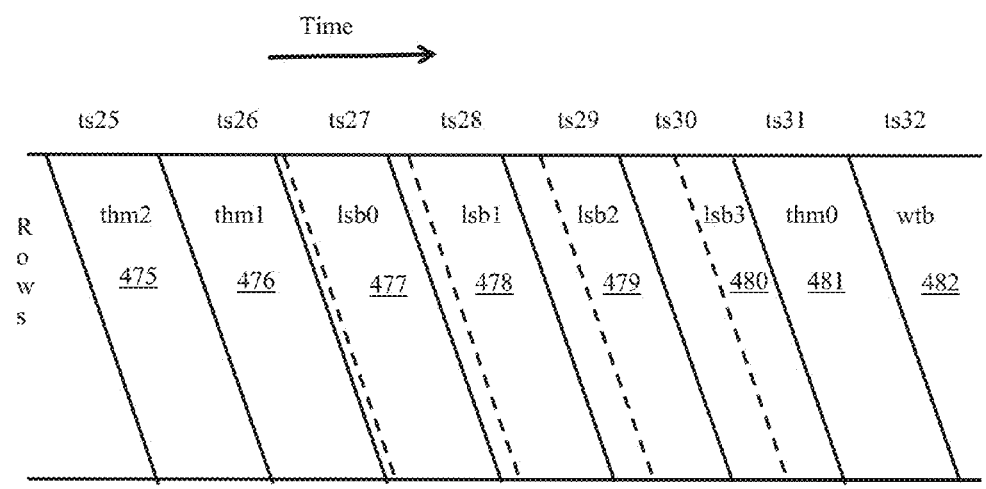
FIG. 9B presents an expanded view of a portion of the major modulation segment of FIG. 9A.

FIG. 9B presents an expanded view of time slots ts25 477 to ts32 482 of major modulation segment 450 of FIG. 9A. The horizontal axis represents time increasing from left to right. The vertical axis represents the rows of the display with the top of the display at the top of FIG. 9B and the bottom of the display at the bottom of FIG. 9B. The lines between the depicted time segments are sloped because of the time it takes to write each row of the display. The dashed lines within ts27 477, ts28 478, ts29 479 and ts30 480 represent terminated write pointers used to create modulations of shorter duration than the time required to write the display with a first set of image modulation data and then to write the display with a next (second) set of image modulation data.

Figure 9C:
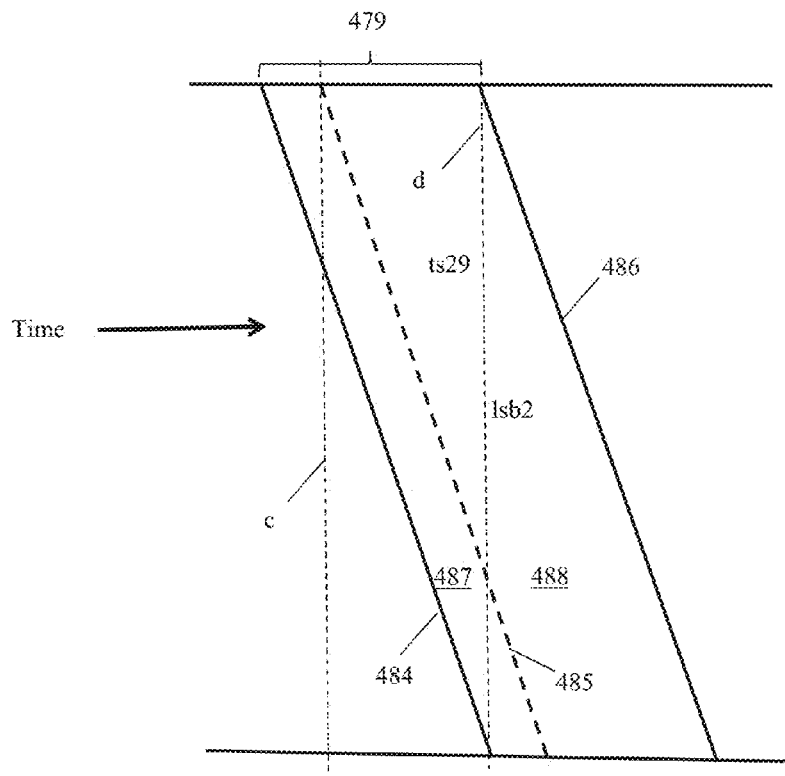
FIG. 9C presents an expanded view of one time slot of the major modulation segment of FIG. 9A wherein a terminated write pointer is presented.

FIG. 9C presents a more detailed depiction of the application of terminated write pointers. Time slot ts29 479 is occupied by lsb2. Time slot ts29 479 is initiated when a first write pointer 484 writes the entire display from top to bottom and ends when a second write pointer 486 writes new data to the entire display from top to bottom. Terminated write pointer (twp) 485 writes dark state data to every row of the display during ts29 479. Vertical marker c is provided to demonstrate that twp 485 is written using the previously described method of U.S. Pat. No. 7,852,307. Vertical marker c intercepts first write pointer 484 at point approximately ¼ of the way down the display. At that point the data transferred from the microdisplay controller to the microdisplay includes a twp instruction (not shown) that initiates twp 485. Time slot ts29 479 may be considered to be divided into interval 487 representing the section before twp 485 is applied and interval 488 representing the section after twp 485 is applied. Thus the first part of ts29 479 has active image modulation data present during interval 487 and dark state data during interval 488. In this instance the lesser bit represents a modulation value of 4 in the full lesser bit range of 0 to 15 as previously explained. Vertical marker d intercept marks the initiation of the writing of write pointer 486 and intercepts twp 485, illustrating that a terminated write pointer starts within one write pointer and ends during the succeeding write pointer.

One consideration in the use of terminated write pointers is the need to consider whether a terminated write pointer is available at the time required. Although it is conceptually possible to be able to have more than one terminated write pointer to be associated with a given row write action, current hardware implementations do not allow for more than one twp action for each row write action. In the example of FIG. 9B there is clearly no temporal overlap between any of the terminated write pointer is lesser bit segments lsb0, lsb1, lsb2 and lsb3 it is also clear that if the order were reversed as lsb3, lsb2, lsb1 and lsb0 there would be some overlap where the last twp actions would overlap with the start of the next twp action.

FIG. 9D presents a partial mapping from a combination of thermometer bits and lsb modulation segments according to FIG. 9A. In a pulse width modulated display using both thermometer bits for higher order modulation segments and binary weighted lsb modulation segments the normal convention is for the image code to start at 0 for both higher order modulation segments and binary weighted lsb modulation segments and to step through the lsb modulation segments in order from 0 to 15 (in this case), after which the first thermometer bit segment is turned on and the process of stepping through the lsb modulation segments is repeated. This continues until the entire set of thermometer bits and lsb modulation segments have been stepped through. FIG. 9D presents the results of using this approach for the first 39 image codes (0 through 38). Segments that are active are marked with an x. Starting with image code 0, no segments of any type are active. For images 1 through 15, the various lsb modulation segments are active. At image code 16 the first thermometer bit thm0 is turned on and all lsb modulation segments are off. For image 17 through 31 thm0 remains on and the lsb modulation segments are stepped though as before. For image code 32 the second thermometer bit thm2 is turned on and them 1 remains on. The lsb modulation segments are operated as before. The process continues beyond the limits of the table of FIG. 9D until all thermometer bit segments have been operated and the lsb segments have been operated for each thermometer bit. This creates a total of 448 image codes, each corresponding uniquely to a combination of thermometer bits and lsb modulation segments. 27 thermometer bits represent 28 combinations (0 to 27) and the 4 lesser bit segments correspond to 16 modulation values (0 to 15).

FIGS. 9E and 9F present an abbreviated mapping of thermometer bits and lsbs to image codes. In this example the image code may correspond to a gray level desired. A mapping may be derived through a calibration process in which a table of measured gray levels is developed for each image code. In a later process a reverse mapping may be made to select an image code from the mapping that corresponds to a desired luminance level. An example of a calibration process is provided in this application.

Figures 10A, 10B:
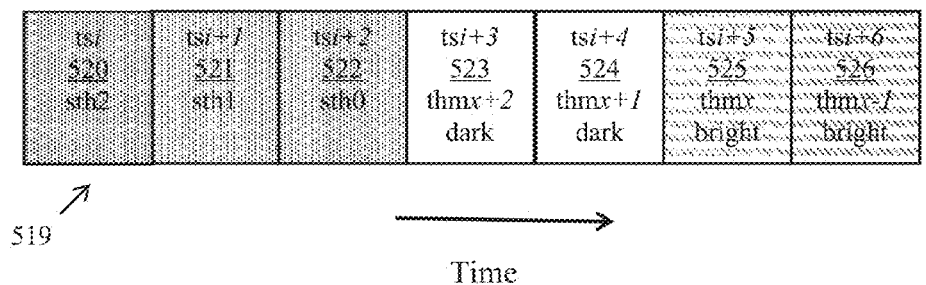

FIG. 10A depicts a template 519 for time slots of a major modulation segment in accordance with the present invention. The modulation segment 519 comprises three different types of modulation elements. Thermometer bits (thmx) represent thermometer bits wherein order in which the thermometer bits are presented in the time ordered sequence are in reverse temporal order. That is, the thermometer bits representing lower modulation values are depicted later in the sequence. Additionally the thermometer bits are operated such that when a thermometer bit for a modulation value is turned on all lower thermometer bits remain on. Thus if thermometer bit thmx is on then thermometer bits thmx−1 down to thm0 are all also on. In the present application the lowest modulation value thermometer bit is represented as thm0. Thm0 may be on or off. If thm0 is off then all other thermometer bits are off. Thermometer bit thm0 is separated from the other thermometer bits by the lesser bit segments and is placed as the last active segment in the major modulation segment for the reasons stated in the text regarding FIG. 9A.

The second type of modulation element is the subtherm (sub-thermometer). As previously noted, a subtherm occupies a time slot for a given gray level that would be occupied by a thermometer bit if the gray level were higher. Subtherms are operated in a manner similar to thermometer bits. When a first subtherm (sth0) is turned on, it is the last subtherm in temporal order. When a second subtherm (sth1) is turned on, that subtherm is next to last in order and the first subtherm (sth0) remains on. When a third subtherm (sth2) is turned on, that subtherm is third to last and the first and second subtherms (sth0 and sth1) remain on.

There is a strict temporal relationship between the position of the subtherm modulation elements and the highest modulation value thermometer bit that is on, for all subtherms other than sth0. There will be at least one off state time slot between the first subtherm (sth0, last in temporal order) and the time slot for the higher modulation value on state thermometer bit. In the present example shown in FIG. 10A, there are two blank time slots tsi+3 523 and tsi+4 524 between the time slot tsi+2 522 for the first subtherm sth0 and the time slot tsi+5 525 for the highest thermometer bit thmx.

If thermometer bit thm1 is not on then the subtherm sequence is placed such that time slot tsi+5 525 is occupied by the element of the lsb sequence earliest in time.

The third type of modulation element is a lesser significant bit (lsb), indicated by lsbx where the range of values for x in the present example is 0 to 3. Because the lsb segments are binary weighting the four segments can generate are range of modulation values from 0 to 15. The lsb segments may be generated by using the terminated write pointer methodology described in FIG. 9C above since the time required to write the array normally exceed the desire duration of lesser bits in most modulation segments.

FIG. 10A presents template 519 for application of subtherms in a major modulation segment comprising seven succeeding time slots, depicted from left to right as tsi 520 to tsi+6 526. Time slot tsi 520 through tsi+2 522 are populated by subtherms sth2, sth1, and sth0 in that order. A condition of template 519 in the present example is that the first time slot holding an active thermometer bit following sth0 be exactly the third following time slot. Thus the time slot holding the highest on state thermometer bit thmx is tsi+5 525. If the highest on state thermometer bit was thmx−1 at tsi+6 526 then subtherms sth2 through sth0 would be placed in time slots tsi+1 521 through tsi+3 523.

The logic behind the placement of the subtherms according to the template 519 is that it establishes a consistent temporal relationship between the time slot for the last subtherm in time order (i.e., the first subtherm sth0) and the time slot for the first thermometer bit in time order. The liquid crystal cell responds slowly to the subtherms that are on but the resets quickly to off state during the two time slots that are off before responding to the on state thermometer bits. The fixed temporal relationships make the liquid crystal cell response more consistent and can ease the task of developing an effective modulation scheme for a particular liquid crystal cell configuration.

Those of skill in the art will appreciate that the present invention is not limited to normally white materials and can in fact be applied to normally black liquid crystal materials by an adjustment of the time considerations.

The benefit of placing the subtherms in the manner described is that the subtherms have a small effect on the brightness associated with the thermometer bits and lsbs but not a great effect because of the relatively slow rise time. The inventors of the present invention have verified experimentally that this small effect can be used to create a large number of small perturbations in the liquid crystal response along the entire modulation response curve that can be used to improve on gray scale accuracy when calibrated using an appropriate calibration system, as is explained elsewhere in the present application. A second added benefit is that it does not require an increase in the data bandwidth between the microdisplay controller and the microdisplay to achieve this improvement. Information regarding calibration is presented in the present application.

FIG. 10B presents the order in which subtherms sth0, sth1 and sth2 are turned on. This can be considered to ascending gray scale terms since turning on sth0 and sth1 together clearly represents an increase in modulation time for the subtherm set is modulating light with the same conclusion for the case where st0, sth1 and sth2 are all on. The x in the box indicates that the subtherm in question is on.

Figure 10C:
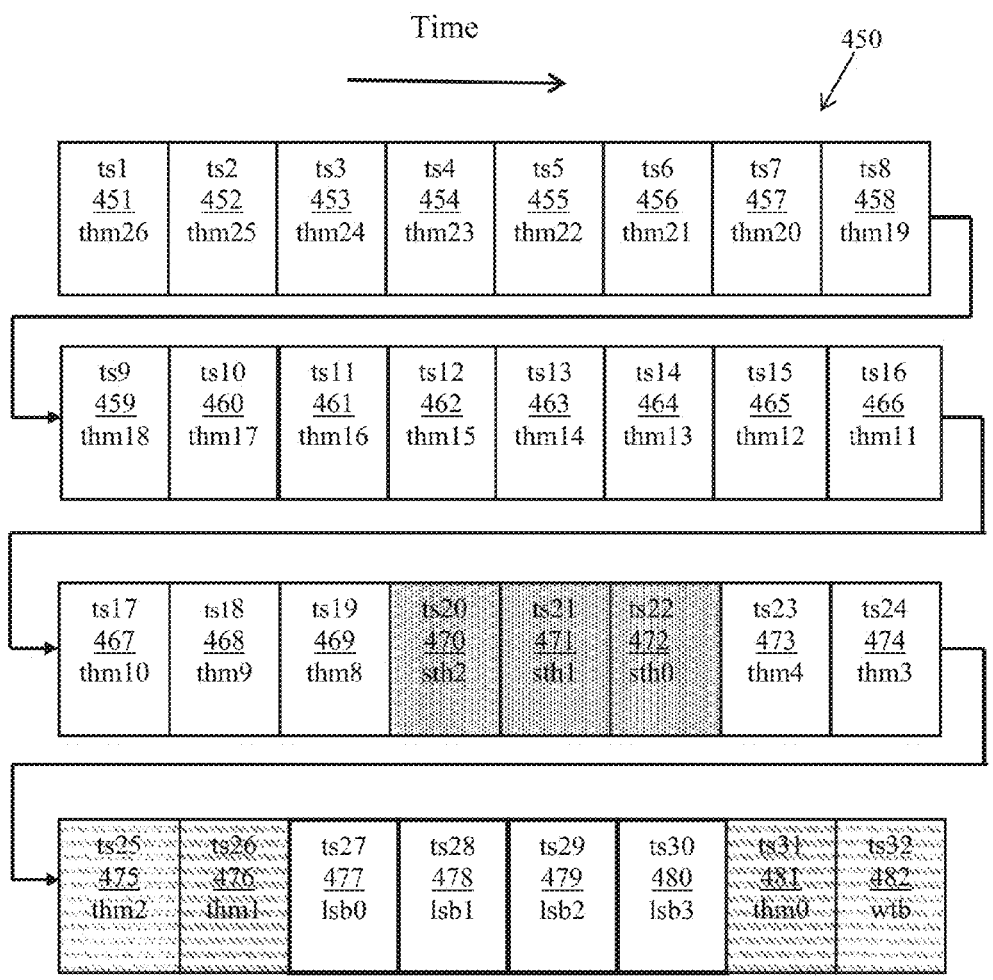
FIG. 10C depicts an example of the application of the subtherm template of FIG. 10A to the major modulation segment of FIG. 9A.

FIG. 10C presents a first example for application of the template 519 to major modulation segment 450 from FIG. 9A. The highest modulation value thermometer bit in an on state is thm2 in time slot ts25 475. (On state thermometer bits are indicated by the diagonal hash fill. Thermometer bit time slots not hash filled are considered to be off.) Time slot ts25 475 also occurs earliest in the sequence of on state thermometer bits. Thermometer bits thm4 and thm3 in time slots ts23 473 and ts34 474 are in an off state as required by template 519 of FIG. 10A. Subtherms stm2, stm1 and stm0 are positioned in time slots ts20 470, ts21 471 and ts22 472 respectively. (The dotted fill of the subtherm time slots is to call attention to the position of the subtherms and does not signify that the subtherms are in either an on state or an off state. The lsb segments are operated as described for FIG. 9B and FIG. 9C.) The subtherms may be operated in any one of the four states previously presented in FIG. 10B. The first thermometer bit thm0 is positioned at the end of major modulation segment 450 and is in an on state. A write to black wtb action follows thm0 in time slot ts482. Lesser bits lsb0, lsb1, lsb2 and lsb3 are positions in ts27 477, ts28 478, ts29 479 and ts30 480 respectively. The lesser bits may be either on or off depending on the modulation value (0 to 15 in this case.)

In the discussion of FIG. 9D a previous approach to the creation of image codes for thermometer bits is presented. The addition of subtherms requires extension of that methodology. In the present application the technique to be used is to place the subtherms between the thermometer bits between the thermometer bits and the lsb segments in the order in which the various elements are turned on. A method of accomplishing this is partially illustrated in FIGS. 10D, 10E, 10F and 10G.

FIGS. 10D through 10G present definition tables for image codes 0 through 155 for major modulation segment 450 of FIG. 9A with the subtherm template of FIG. 10A applied. The tables are limited to thermometer bits thm0 and thm1 for the sake of brevity with the understanding that the table could be expanded to cover all thermometer bits. At image code 0 all lsbs, subtherms and thermometer bits are off. For image codes 0 through 15 the lsbs are turned on and off in a manner well known in the art to create a 4-bit modulation. At image code 16 subtherm sth0 is turned on and the lsb pattern is repeated for image codes 16 through 31. Beginning at image code 32 subtherm sth1 is activated, subtherm sth0 remains active and the lsb pattern is repeated for image codes 32 through 47. At modulation code 48 subtherm sth2 is activated and subtherms sth0 and sth1 remain active, and the lsb pattern is repeated for image codes 48 through 63. At image code 64 all lsb segments and subtherm segments are turned off and thm0 is turned on. The entire sequence during which the subtherms are operated according to the table presented in FIG. 10B and the lsbs are operated according to image codes 0 through 15 is then repeated for image codes 64 through 127. At image code 128 all lsbs and subtherms are turned to off, thermometer bit thm1 is turned on and thermometer bit thm0 remains on. The process is then repeated as before.

Figures 11A, 11B:
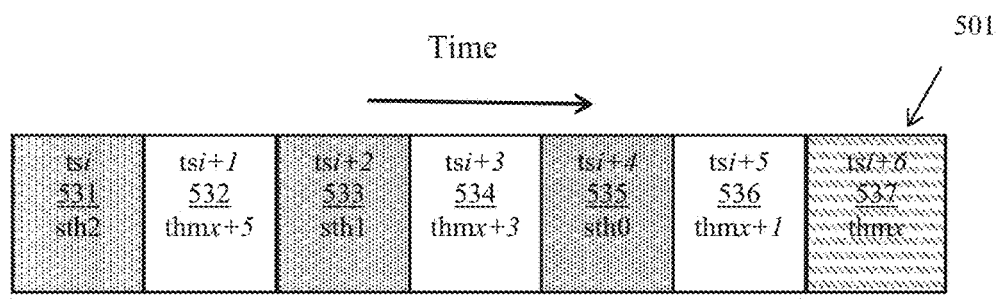

FIG. 11A represents an alternative subtherm template 501 that can be applied to major modulation segment 450 of FIG. 9A. In this template the three subtherms sth2, sth1 and sth0 are positions in time segments tsi+1 531, tsi+2 533 and tsi+5 535 which are separated by intervening off state thermometer bit thmx+5 and thmx+3 positioned in time slots tsi+1 532 and tsi+3 534 respectively. Subtherm sth0 is separated from thermometer bit thmx positioned at time slot tsi+6 537 by off state thermometer bit thmx+1 at time slot tsi+5 536.

In this case the introduction of separation between subtherms in the sequence is useful to reduce the impact of the subtherms on the range of luminance values created by the subtherms. The logic behind this ordering is that a normally white liquid crystal that tends to drive to black faster than it drives to white can be induced to add small perturbations to the basic modulation curve that are smaller in luminance value than those created by the subtherm pattern of FIG. 10A because of the discontinuity in the pattern. It is obvious that a mix of these two techniques is also possible. The reduction in the duration of the off state gap between subtherm sth0 and the first on state thermometer bit thmx from two time slots to one time slot is a consequence of the reduced influence of the subtherms when positioned according to template 501 on the liquid crystal cell.

FIG. 11B presents the order in which subtherms sth0, sth1 and sth2 are turned on. This can be considered to ascending gray scale terms since turning on sth0 and sth1 together clearly represents an increase in modulation time for the subtherm set is modulating light with the same conclusion for the case where st0, sth1 and sth2 are all on. The x in the box indicates that the subtherm in question is on.

Figure 11C:
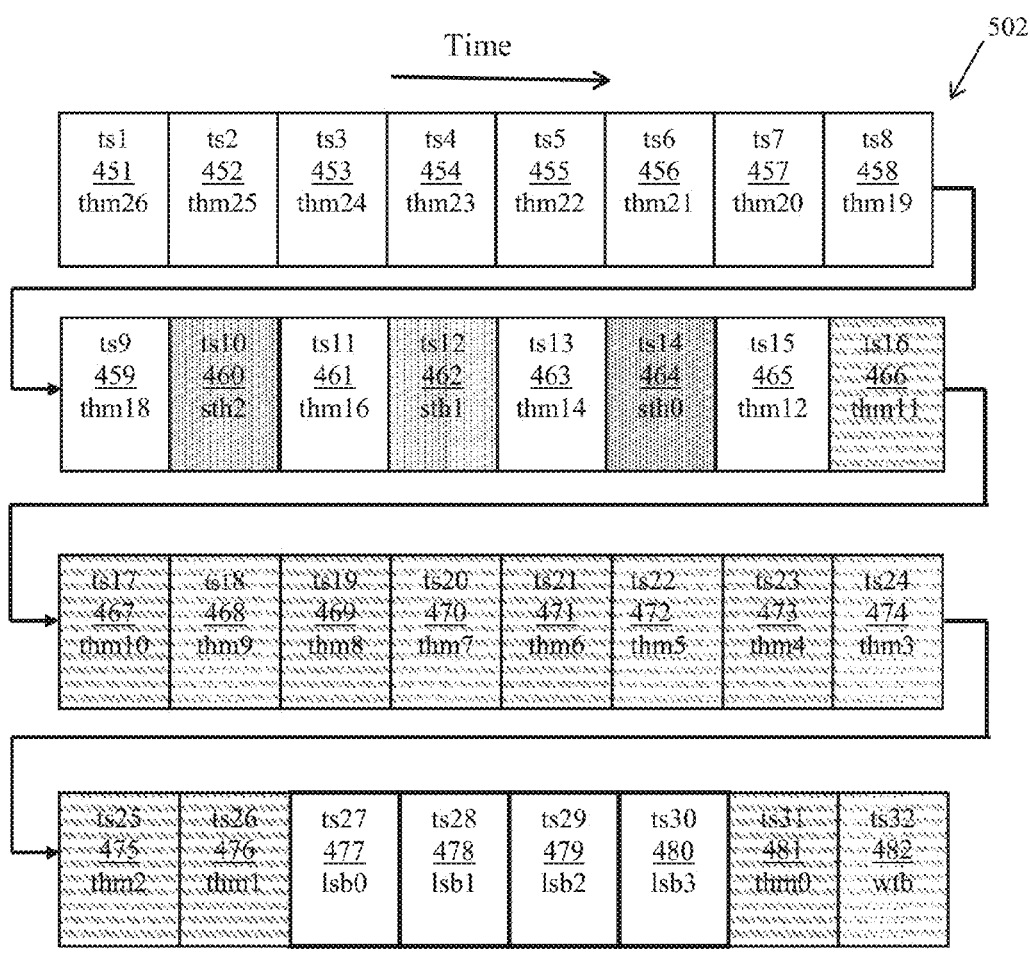
FIG. 11C depicts an example of the application of the subtherm template of FIG. 11A to the major modulation segment of FIG. 9A.

FIG. 11C presents a first example 502 for application of the template 501 to major modulation segment 450 from FIG. 9A. The highest modulation value thermometer bit in an on state is thm11 at time slot ts16 466. (On state thermometer bits are indicated by the diagonal hash fill. Thermometer bit time slots not hash filled are considered to be off.) Time slot ts16 466 also occurs earliest in the sequence of on state thermometer bits. Subtherms sth2, sth1 and sth0 are positioned in time slots ts10 460, ts12 462 and ts14 464 respectively. (The dot fill of the subtherm time slots is to call attention to the position of the subtherms and does not indicate on state or off state. The lsb segments are operated as described for FIG. 9B and FIG. 9C.) Thermometer bits thm16 and thm14 in time slots ts11 461 and ts13 463 are in an off state as required by template 501 of FIG. 11A. Subtherm sth0 is separated from the highest on state thermometer bit thm11 at time slot ts16 466 by a single off state thermometer bit thm12 positioned at time slot ts15 465. The subtherms may be operated in any one of the four states previously presented in FIG. 11B. As indicated, thermometer bits thm0 to thm11 are all in an on state. A write to black wtb action follows thm0 in time slot ts482. Lesser bits lsb0, lsb1, lsb2 and lsb3 are positioned in ts27 477, ts28 478, ts29 479 and ts30 480 respectively. The lesser bits may be either on or off depending on the modulation value (0 to 15 in this case.)

Figure 12A:
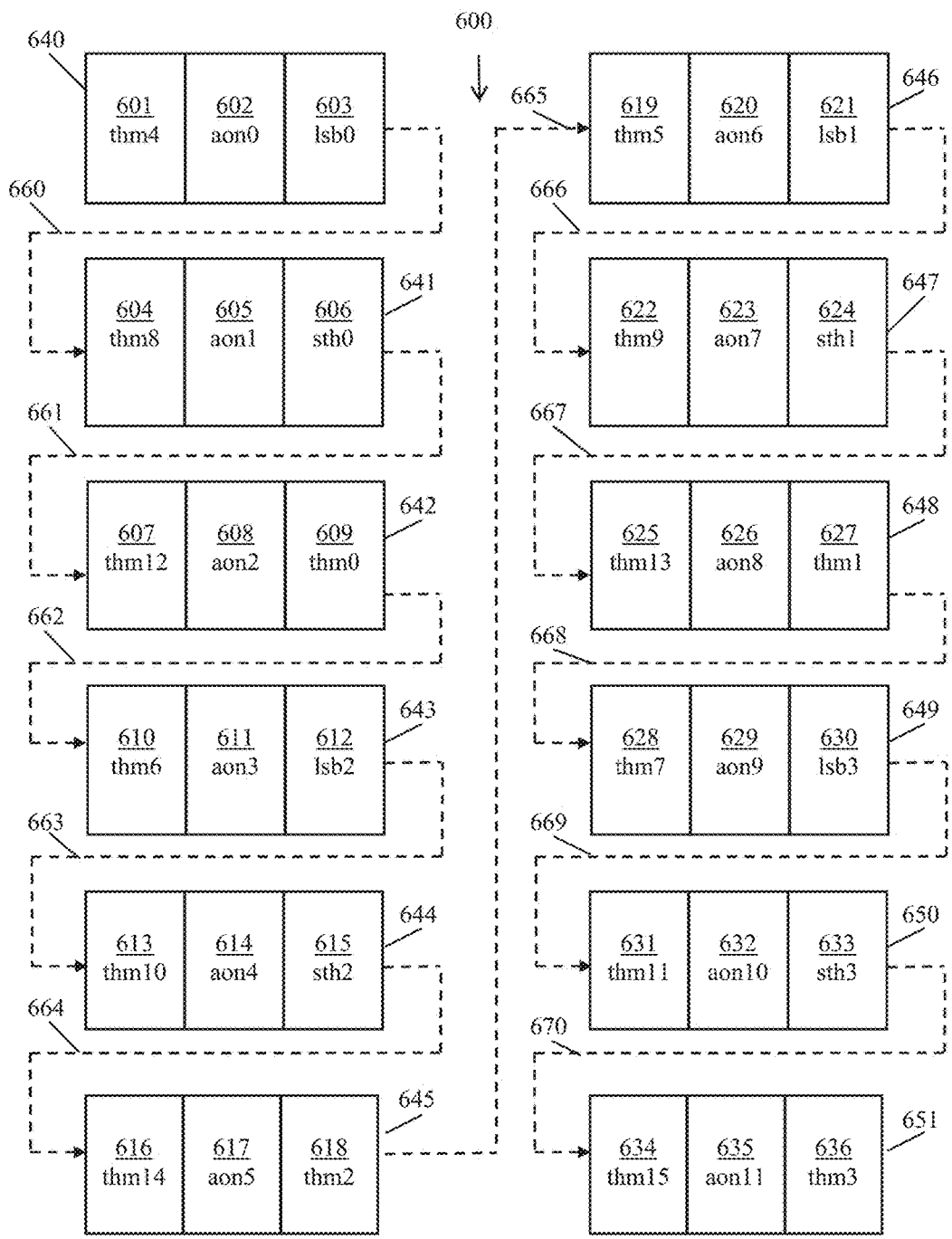
FIG. 12A depicts a chart of the order in which a first phase modulation sequence is applied to a row of a phase modulation display.

FIG. 12A presents a time ordered view of modulation sequence 600 comprised of minor modulation segments 640-651. Each minor modulation segment is comprised of three modulation segments—a first thermometer segment (thm or therm), an "always on" segment and a third segment which comprises one of an lsb segment (lsb), a subtherm segment (sth or subtherm) or a thermometer segment (thm or therm). The therms, subtherms and lsbs are operated in a manner similar to that disclosed in FIGS. 11A-11C. The subtherms, however, operate in a dedicated position in the minor modulation segments and therefore never run out of a position as the image code value increases as described in FIGS. 11A-11C and associated text. Specifically, the image code steps through all lsb values in order before incrementing the subtherm by 1, and then steps through all the lsb values again. Once the image code includes all subtherms and all lsbs have been stepped through again the lsbs and subtherms are reset to the beginning and the next therm is activated.

Minor modulation segment 640 comprises modulation segments thm4 601, aon0 602, and lsb0 603. Off state interval 660 follows segment lsb0 603. All off state intervals are represented by a dashed line connecting each minor modulation segment to the succeeding minor modulation segment. Minor modulation segment 641 comprises modulation segments thm8 604, aon1 605 and sth0 606, which is followed by off state interval 661. Minor modulation segment 642 comprised modulation segments thm12 607, aon2 608 and thm0, which is followed by off state interval 662. Minor modulation segments 643, 644 and 645 operate in a similar manner with the last segment comprising an lsb, and sth and a thm in that order. The following table summarizes the full sequence.

| Group | Reference | 1$^{st}$ segment | 2$^{nd}$ segment | 3$^{rd}$ segment | Off-state interval |
|---|---|---|---|---|---|
| 1 | 640 | Thm4 601 | Aon0 602 | Lsb0 603 | 660 |
|   | 641 | Thm8 604 | Aon1 605 | Sth0 606 | 661 |
|   | 642 | Thm12 607 | Aon2 608 | Thm0 609 | 662 |
| 2 | 643 | Thm6 610 | Aon3 611 | Lsb2 612 | 663 |
|   | 644 | Thm10 613 | Aon4 614 | Sth2 615 | 664 |
|   | 645 | Thm14 616 | Aon5 617 | Thm2 618 | 665 |
| 3 | 646 | Thm5 619 | Aon6 620 | Lsb1 621 | 666 |
|   | 647 | Thm9 622 | Aon7 623 | Sth1 624 | 667 |
|   | 648 | Thm13 625 | Aon8 626 | Thm1 627 | 668 |
| 4 | 649 | Thm7 628 | Aon9 629 | Lsb3 630 | 669 |
|   | 650 | Thm11 631 | Aon10 632 | Sth3 633 | 670 |
|   | 651 | Thm15 634 | Aon11 635 | Thm3 636 | Not shown |

Referring to FIG. 12A, modulation sequence 600 is portrayed in a left half and a right half which comprise the even number (individual) segments and the odd number (individual) segments respectively. In the above table the data are presented in four groups of three. Groups 1 and 2 represent the left half and Groups 3 and 4 represent the right half. The temporal order in which thermometer segments and subtherm segments are populated is consistent with the practice disclosed in FIGS. 11A-11C. The temporal distribution of the thermometer segments and subtherm segments is based on several principles. A first principle that the number of thermometer bits in a given minor modulation segment differs from the number in another minor modulation segments by no more than one. A second guiding principle is that all segments of a specific type appear in a regular pattern. Lsb segments appear in minor modulation segments 640, 643, 645 and 649 which are at the end of the first minor modulation segments of Groups 1, 2, 3 and 4 respectively. Subtherm segments appear in the last segment of minor modulation segments 641, 644, 647 and 650 which are the second minor modulation segments in Groups 1, 2, 3 and 4. Thermometer segments appear in the last segment of minor modulation segments 642, 645, 648, and 651, which are the third minor modulation segments in Groups 1, 2, 3 and 4. The use of Groups in this example is for convenience of description only.

The general order of distribution for the thermometer bits is to place the thermometer bits in ascending order in different Groups according to a predetermined pattern. Thm0 609 appears in Group 1, thm1 627 appears in Group 3, thm2 618 appears in Group 2 and thm3 636 appears in Group 4. Thermometer segments thm4 601, thm5 619, thm6 610 and thm7 628 follow a similar pattern as do thermometer segments thm8 604, thm9 622, thm10 613 and thm11 631 and as do thermometer segments thm12 607, thm13 625, thm14 616 and thm15 634.

This distribution insures that the intensity of modulation in each of the groups of three minor modulation segments grows in a relatively uniform manner.

FIG. 12B depicts the duration of each modulation segment in each of the minor modulation segments as well as the duration of each minor modulation segment and the cumulative time interval count. The unit of time is "unit-time" which is defined as the time required to write the 24 rows that are written when the 24 write pointers direct image data to those rows. This convention is used because the actual time will vary based on the number of write pointers and the effective clock frequency of the interface between the microdisplay and the microdisplay controller as previously described in conjunction with FIGS. 6A-6C and associated text.

Figure 6A:
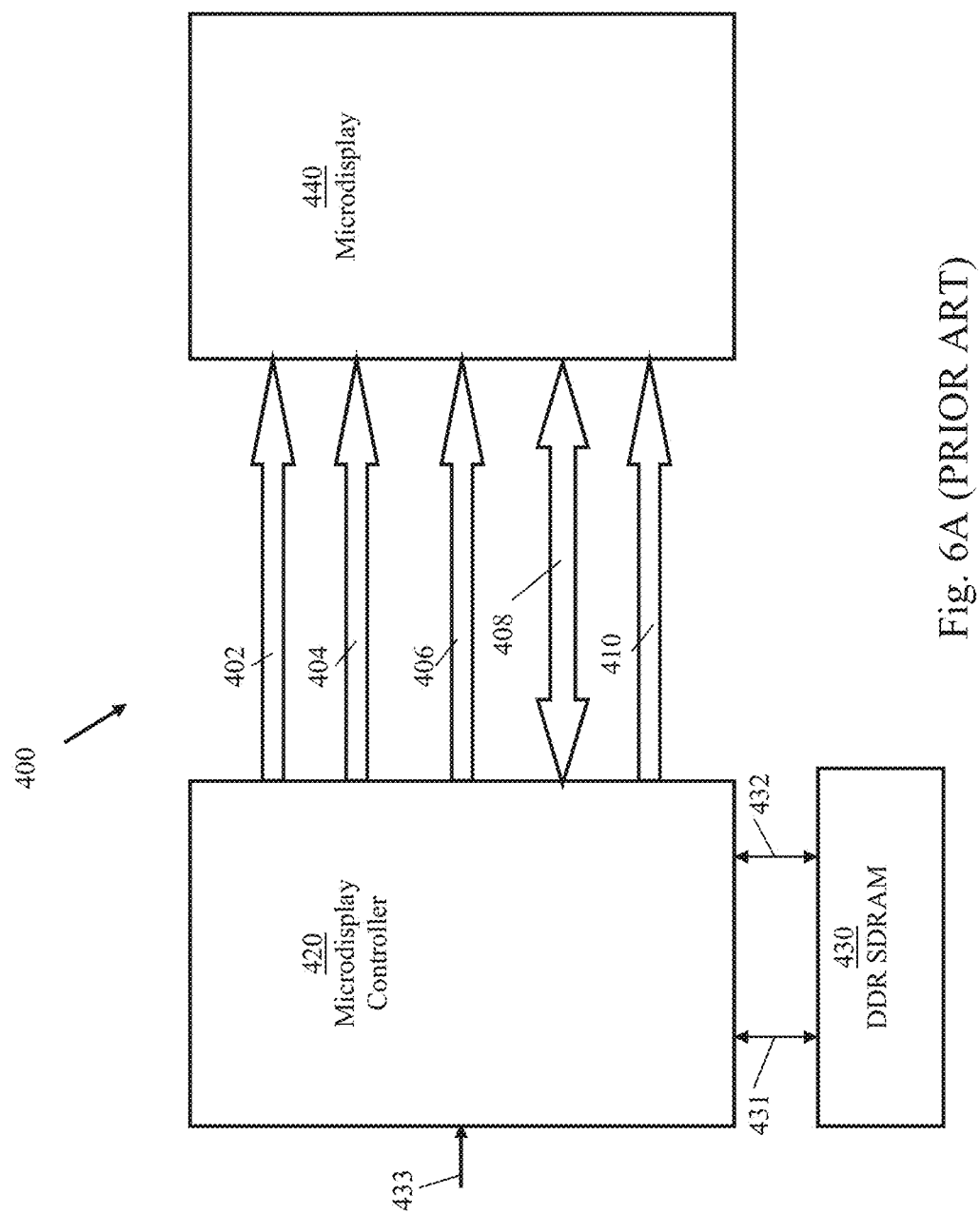
FIG. 6A is a data and logic diagram of a multi pixel liquid crystal display in accordance with the present invention.
Figure 6B:
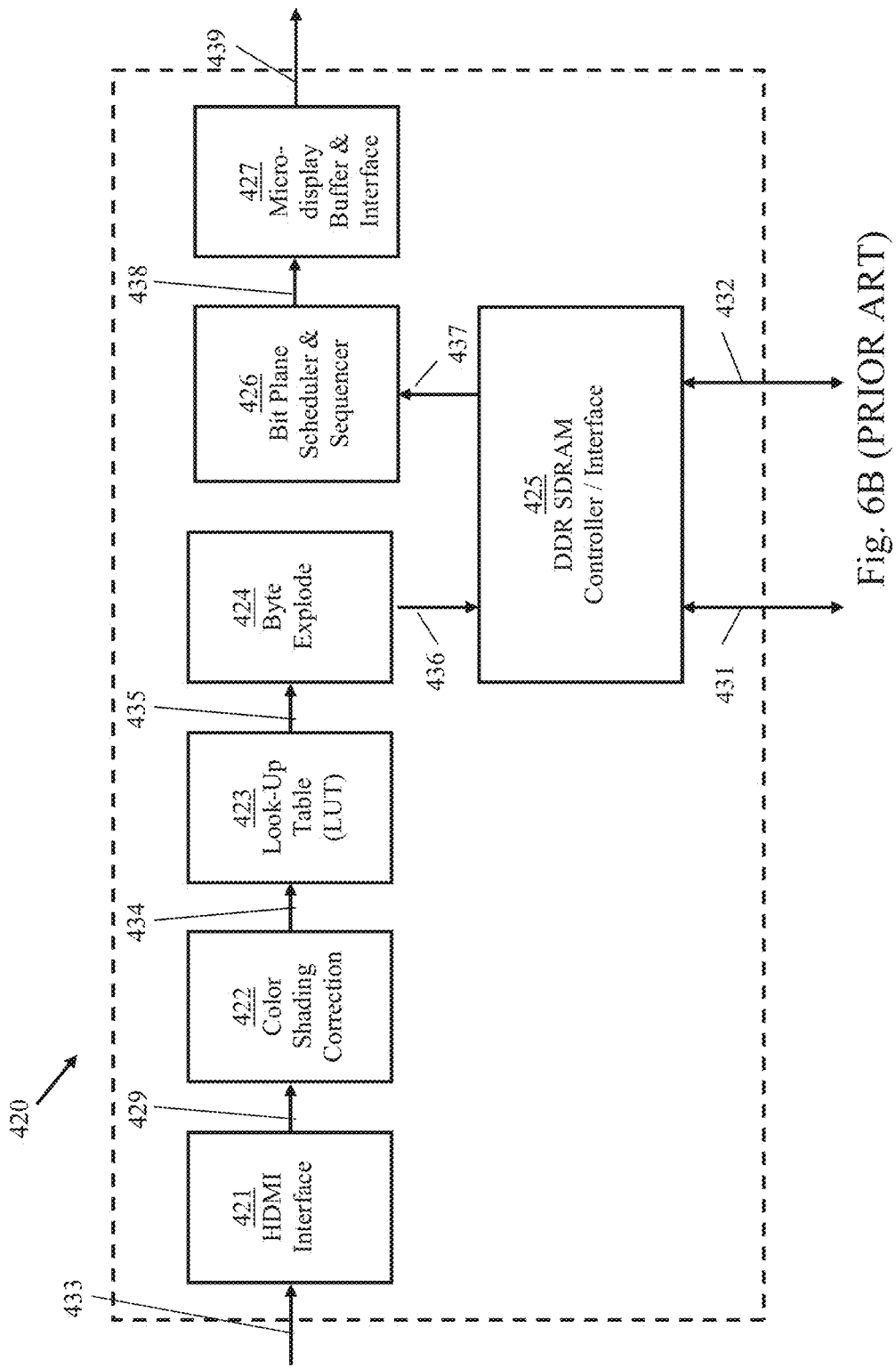
FIG. 6B is a block diagram of a microdisplay logic and data controller for a multi pixel liquid crystal display in accordance with the present invention.

As an example, a digital display system (not shown) similar to that of FIGS. 6A-6C comprises a data path that is 64 bits wide, a display controller operative to deliver image data to a digital display on both leading and falling edges of a data transfer clock, and a digital display system with a resolution of 1920 columns by 1080 rows operative to receive image data and deliver it to specific rows based on address information included in said image data. Data is transferred from the digital display controller to the digital display system at a clock rate of 302 MHz. A row write action corresponding to a single write pointer takes 30 (1920/64) transfer events to transfer the image data from the digital display controller to the digital display, which is 15 full clock cycles. The modulation sequence of FIGS. 12A and 12B comprises 24 write pointers and extends over 1170 rows, which is the last cumulative modulation intervals shown in FIG. 12B. Writing 24 write pointers in a time-sharing manner requires 24 row write actions at 302 MHz which is 24*15/302,000,000 or 2.384 μsec. It is an example of the "unittime." Multiplying this "unittime" by the 1170 rows in the modulation sequence (each write pointer must visit every row to be modulated) yields 2.789 milliseconds to write all data to all rows. An explanation of the implications of a modulation sequence containing more steps than there are rows on the display is explained below.

Figure 12C:
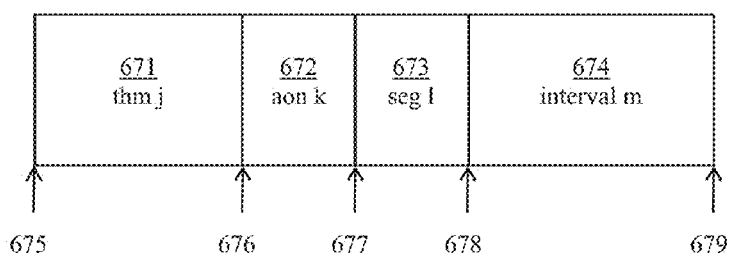
FIGS. 12C and 12D depict a method of implementing the minor modulation segments of the phase modulation sequence of FIG. 12A.
Figure 12D:
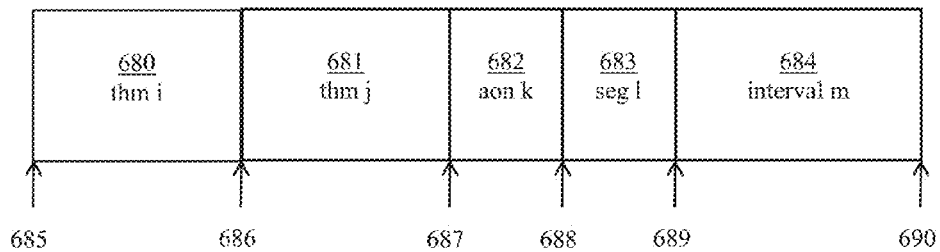

FIGS. 12C and 12D present apparatus and method for implementing the minor modulation segments of FIG. 12A with a limited number of write pointers. In FIG. 12C minor modulation segment 691 comprises thermometer segment thm j 671, always on segment aon k 672, and modulation segment seg 1 673 followed by off state interval m 674. Modulation segment seg 1 673 is one of a thermometer segment, an lsb segment or a subtherm segment. Thermometer segment thm j 671 is initiated by write pointer 675 which directs image data to the pixels of the row to which write pointer 675 directs the data. Thermometer segment thm j 671 ends when terminated write pointer 676 directs on state data (write to white, or wtw) image data to the pixels of that same row to start always on segment aon k 672. This sets all pixels of that row to an on state which normally corresponds to maximum retardance for a parallel aligned phase modulator. Always on segment aon k is terminated when write pointer 677 writes image data to the pixels of that row to start modulation segment seg 1 673. Modulation segment seg 1 is terminated by terminated write pointer 678 which sets all pixel of that row to an off state (write to black or wtb), thereby starting off state interval m 674. An off state normally corresponds to minimum retardance for a parallel aligned phase modulator. Off state interval m 674 is terminated by write pointer 679 which initiates a thermometer segment (not shown) of the next minor modulation segment. (Not shown). This is a very efficient method of writing a minor modulation segment comprising three segments followed by an off state interval while requiring only two write pointers and using two terminated write pointers.

FIG. 12D presents a second minor modulation segment 692 comprising thermometer segment thm i 680, thermometer segment thm j 681, always on segment aon k 682, and modulation segment 1 683 followed by and off state interval m 684. Thermometer segment thm i 680 is initiated by write pointer 685 which directs image data to the pixels of a given row. Thermometer segment thm i 680 is terminated when write pointer 686 directs image data to thermometer segment thm j 681. Thermometer segment thm j 681 is terminated when terminated write pointer 687 directs on state data (write to white, or wtw) to the pixels of that same row to start always on segment aon k 682. This sets all pixels of that row to an on state which normally corresponds to maximum retardance for a parallel aligned phase modulator. Always on segment aon k is terminated when write pointer 688 writes image data to the pixels of that row to start modulation segment seg 1 683. Modulation segment seg 1 683 is terminated by terminated write pointer 798 which sets all pixel of that row to an off state (write to black or wtb), thereby starting interval m 684. An off start normally corresponds to minimum retardance for a parallel aligned phase modulator. Off state interval m 684 is terminated by write pointer 690 which initiates a thermometer segment (not shown) of the next minor modulation segment. (Not shown).

FIGS. 12E-12H depict the row position for a set of write pointers during the first 11 unit-time time segments of a major modulation sequence after FIG. 12A marked as 0 through 10 across the top of the table. The left hand column indicates the row at which the write pointer located in the column for unittime 0 is positioned. Subsequent write pointers are positioned one row lower than the same write pointer in the previous column. Only the write pointers are shown and no terminated write pointers are included for clarity. Write pointer 0 is written first, and then write point 1. The writing of write pointers continues until write pointer 23 is written and then the writing proceeds to the next unittime column.

The temporal weighting of the lsb segments, subtherms and thermometer bits is described hereafter. Modulation sequence 600 comprises three types of modulation segments, each with a different temporal weighting. The four lsb segments operate in a classic binary weighted fashion. As is well known in the art four binary weighted lsb segments represent a value of 16 (0 to 15). In the example shown in FIG. 12B, the four lsb segments occupy a total of 1.875 unittime time segments when all are on. The four subtherms each are of a time weighting of 2 unittime time units and operate as thermometer bits in that once a subtherm segment is turned on it stays on when the next subtherm segment is turned on as shown in FIG. 11B. When all four subtherm segments are on and all four lsb segments are on the total time weighting of the subtherm segments and the lsb segments is approximately 10 unittime time units. Since the time weighting of the subtherm segments is also 2 unittime time units, each represents an equivalent weighting of 16 least significant bit segments. The 18 thermometer bits (thm0 through thm17) are each weighted approximately 10 unittime time units. Because the sum of the subtherm segments and lsb segments is approximately 10 unittime time units and each subtherm represents 16 least significant bit segment, the total number of lsbs in each thermometer segment is 80.

The range of image codes that can be represented is based the number of thermometer segment states, subtherm segment states and lsb states. Since there are four lsb segments, the number of states is 16 (0 to 15). The number of subtherm segment states for the four subtherms is 5, one for all off and one additional as each subtherm segment is turned on. The number of thermometer segment states is 17, one for all off and one additional as each of the 16 thermometer bits is turned on. The product of these numbers is 16*5*17=1360, which is the number of independent modulation states (image codes) available.

One consideration is what happens when the number of steps in the modulation is greater than the number of rows on the display. FIG. 12H depicts, by a dashed line, the limit of the 1080 rows. Since the write pointers extend beyond that point the controller must provide means for building in a dummy timing. This practice is well known in the art.

Figure 13A:
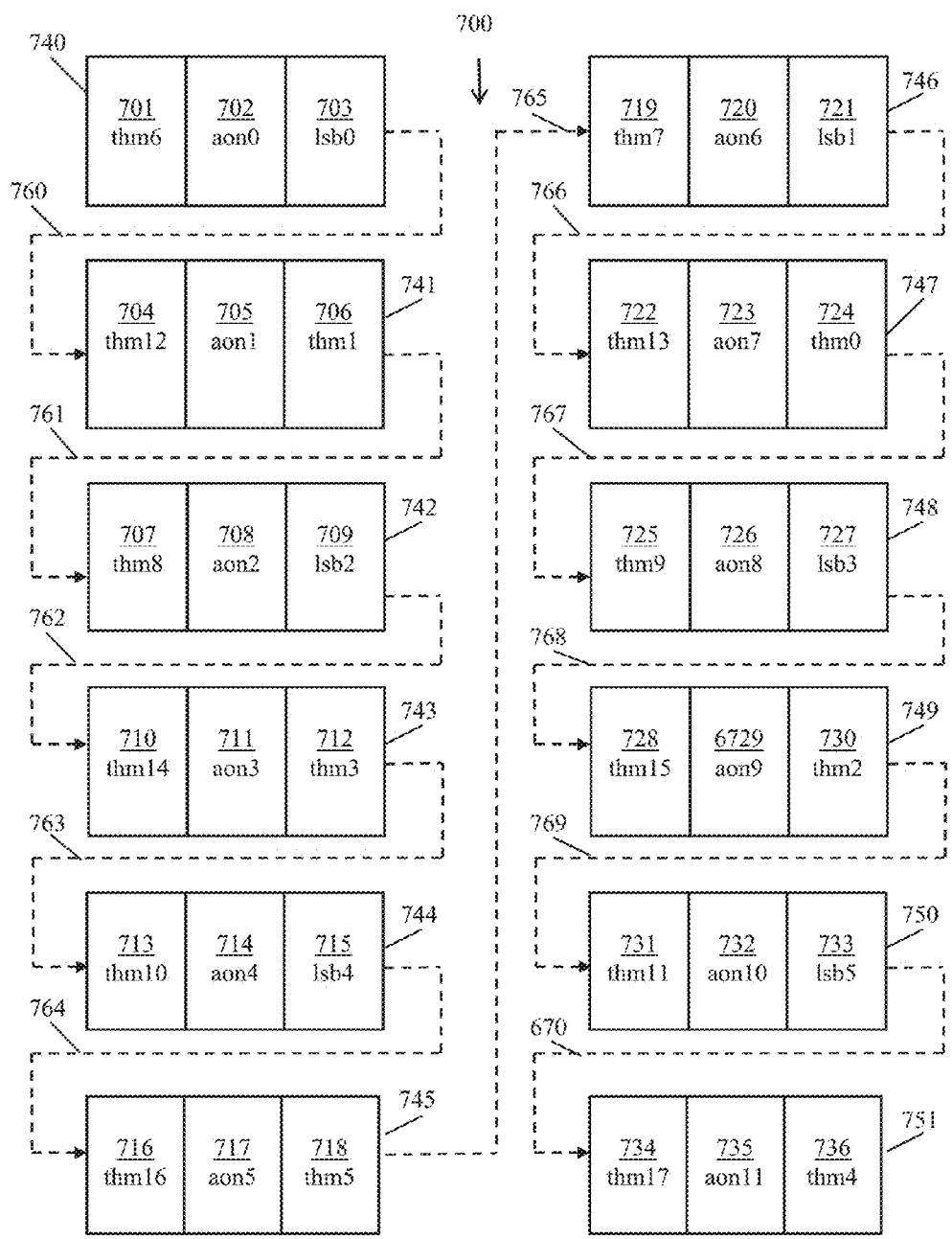
FIG. 13A depicts a chart of the order in which a second phase modulation sequence is applied to a row of a phase modulation display.

FIG. 13A presents a time ordered view of modulation sequence 700 comprised of minor modulation segments 740-751. Each minor modulation segment is comprised of three modulation segment—a first thermometer segment (thm or therm), an "always on" segment and a third segment which comprises one of an lsb segment (lsb) or a thermometer segment (thm or therm). The therms and lsbs are operated in a manner similar to that disclosed in FIGS. 9A-9F. Specifically, the image code steps through all lsb values in order before incrementing the thermometer segment by 1, and then steps through all the lsb values again. In this implementation the lsb segments alternate with the thermometer segments. A table summarizing this is presented below.

| Group | Reference | 1$^{st}$ segment | 2$^{nd}$ segment | 3$^{rd}$ segment | Off-state interval |
|---|---|---|---|---|---|
| 1 | 740 | Thm6 701 | Aon0 702 | Lsb0 703 | 760 |
|   | 741 | Thm12 704 | Aon1 705 | Thm1 706 | 761 |
|   | 742 | Thm8 707 | Aon2 708 | Lsb2 709 | 762 |
|   | 743 | Thm14 710 | Aon3 711 | Thm3 712 | 763 |
|   | 744 | Thm10 713 | Aon4 714 | Lsb4 715 | 764 |
|   | 745 | Thm16 716 | Aon5 717 | Thm5 718 | 765 |
| 2 | 746 | Thm7 719 | Aon6 720 | Lsb1 721 | 766 |
|   | 747 | Thm13 722 | Aon7 723 | Thm0 724 | 767 |
|   | 748 | Thm9 725 | Aon8 726 | Lsb3 727 | 768 |
|   | 749 | Thm15 728 | Aon9 729 | Thm2 730 | 769 |
|   | 750 | Thm11 731 | Aon10 732 | Lsb5 733 | 770 |
|   | 751 | Thm17 734 | Aon11 735 | Thm4 736 | Not shown |

Referring to FIG. 13A, modulation sequence 700 is portrayed in a left half and a right half which comprise the even number (individual) segments and the odd number (individual) segments respectively. In the above table the data are presented in two groups of six. Group 1 represents the left half and Group 2 represents the right half. The temporal order in which thermometer segments and subtherm segments are populated is consistent with the practice disclosed in FIGS. 11A-11C. The temporal distribution of the thermometer segments is based on several principles. A first principle that the number of thermometer bits in a given minor modulation segment differs from the number in another minor modulation segments by no more than one. A second guiding principle is that all segments of a specific type appear in a regular pattern. Lsb segments appear after an always on segment in even numbered minor modulation segments 740, 742, 744, 746, 748 and 750 and the six lowest number thermometer segments (thm0-thm5) appear in odd numbered minor modulation segments 741, 743, 745, 747, 749 and 751 after the always on segment. The higher number thermometer segments (thm6-thm17) appear in the modulation segments before the always on segment in each minor modulation segment. Even numbered thermometer segments appear in Group 1 and odd numbered thermometer bits appear in Group 2. Thm6 701 appears in the first minor modulation segment 740 of Group 1 and thm7 occupies the same position in Group 2. Thm8 707 occupies the third minor modulation segment 742 of Group 1 and thm9 725 occupies the same position in Group 2. Thm10 occupies the fifth minor modulation segment 744 in Group 1 and thm11 731 occupies the same position in Group 2. Thm12 704 occupies the second minor modulation segment 741 in Group 1 and thm13 722 occupies the same position in Group 2. Thm14 710 occupies the fourth minor modulation segment 743 in Group 1 and thm15 728 occupies the same position in Group 2. Thm16 716 occupies the sixth minor modulation segment 745 in Group 1 and thm17 734 occupies the same position in Group 2. The use of groups is for clarity of explanation. Groups do not form a necessary part of this present invention.

This distribution insures that the intensity of modulation in each of the groups of three minor modulation segments grows in a relatively uniform manner.

FIG. 13B depicts the duration of each modulation segment in each of the minor modulation segments as well as the duration of each minor modulation segment and the cumulative time interval count. The unit of time is "unittime" which is the time required to write the 24 rows that are written when the 24 write pointers direct image data to those rows. This convention is used because the actual time will vary based on the number of write pointers and the effective clock frequency of the interface between the microdisplay and the microdisplay controller as previously described in conjunction with FIGS. 6A-6C and associated text.

As an example, a digital display system (not shown) similar to that of FIGS. 6A-6C comprises a data path that is 64 bits wide, a display controller operative to deliver image data to a digital display on both leading and falling edges of a data transfer clock, and a digital display system with a resolution of 1920 columns by 1080 rows operative to receive image data and deliver it to specific rows based on address information included in said image data. Data is transferred from the digital display controller to the digital display system at a clock rate of 302 MHz. A row write action corresponding to a single write pointer takes 30 (1920/64) transfer events to transfer the image data from the digital display controller to the digital display, which is 15 full clock cycles. The modulation sequence of FIGS. 13A and 13B comprises 24 write pointers and extends over 1164 rows, which is the last cumulative modulation intervals shown in FIG. 13B. Writing 24 write pointers requires 24 row write actions at 302 MHz which is 24*15/302,000,000 or 2.384 μsec. Multiplying this by the 1164 rows in the modulation sequence (each write pointer must visit every row to be modulated) yields 2.775 milliseconds to write all data to all rows.

Apparatus and method for implementing the minor modulation segments for this example is presented in FIGS. 12C and 12D and associated text.

FIGS. 13C-13E depict the row position for a set of write pointers during the first 11 unittime time segments of a major modulation sequence after FIG. 13A marked as 0 through 10 across the top of the table. The left hand column indicates the row at which the write pointer located in the column for unittime 0 is positioned. Subsequent write pointers are positioned one row lower than the same write pointer in the previous column. Only the write pointers are shown and no terminated write pointers are included for clarity. Write pointer 0 is written first, and then write point 1. The writing of write pointers continues until write pointer 23 is written and then the writing proceeds to the next unittime column.

The temporal weighting of the lsb segments and thermometer bits is described hereafter. Modulation sequence 700 comprises two types of modulation segments. The six lsb segments operate in a classic binary weighted fashion with a total binary weighting when all segments are on of approximately 31.5 unittime time units. As is well known in the art six binary weighted lsb segments have 64 possible states (0 to 63). The least significant bit (lsb0) is represent by 0.5 unittime time units as shown in FIG. 13B. The 18 thermometer bits (thm0 through thm17) are each weighted approximately 32 unittime time units. The number of thermometer segment states is 19, one for all off and one additional as each of the 18 thermometer bits is turned on. The product of these numbers is 64*19=1216, which is the number of independent modulation states (image codes) available.

The cumulative number of modulation intervals from FIG. 13B is 1164, which exceeds the number of rows available on the display. FIG. 13E depicts, by a dashed line, the limit of the 1080 rows. Since the write pointers extend beyond that point the controller must provide means for building in dummy timing.

Figure 14A:
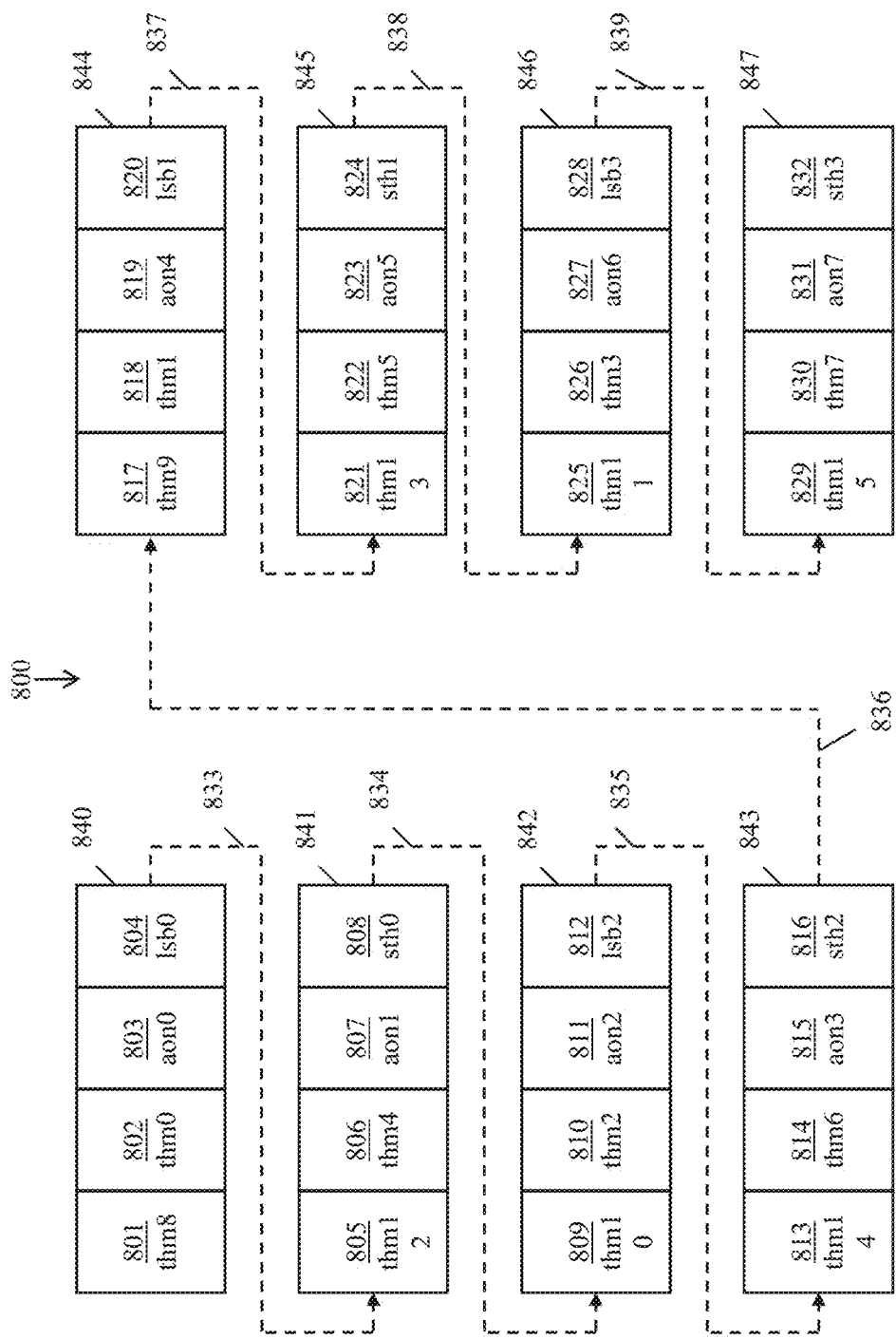
FIG. 14A depicts a chart of the order in which a third phase modulation sequence is applied to a row of a phase modulation display.

FIG. 14A presents a time ordered view of modulation sequence 800 comprised of minor modulation segments 840-847. Each minor modulation segment is comprised of four modulation segments—a first thermometer segment (thm or therm), a second thermometer segment, an "always on" segment and a fourth segment which comprises one of an lsb segment (lsb), or a subtherm segment (sth or subtherm) or a thermometer segment (thm or therm). The therms, subtherms and lsbs are operated in a manner similar to that disclosed in FIGS. 12A-12H. The subtherms operate in a dedicated position in the minor modulation segments and therefore never run out of a position as the image code value increases as described in FIGS. 11A-11C and associated text. Specifically, the image code steps through all lsb values in order before incrementing the subtherm by 1, and then steps through all the lsb values again. Once the image code includes all subtherms and all lsbs have been stepped through again the lsbs and subtherms are reset to the beginning and the next thermometer segment is activated.

Minor modulation segment 840 comprises modulation segments thm8 801, thm0 802, aon0 803, and lsb0 804. Off state interval 833 follows segment lsb0 804. Minor modulation segment 641 comprises modulation segments thm12 805, thm4 806, aon1 807 and sth0 808, which is followed by off state interval 834. Minor modulation segment 842 comprises modulation segments thm10 809, thm2 810, aon2 811 and lsb2 812, which is followed by off state interval 835. Minor modulation segments 843, 844 845, 846 and 847 operate in a similar manner with the last segment comprising an lsb and a subtherm sth in that order. The following table summarizes the full sequence.

| Group | Reference | 1st segment | 2nd segment | 3rd segment | 4th segment | Off-state interval |
|---|---|---|---|---|---|---|
| 1 | 840 | Thm8 801 | Thm0 802 | Aon0 803 | Lsb0 804 | 833 |
|   | 841 | Thm12 805 | Thm4 805 | Aon1 806 | Sth0 808 | 834 |
| 2 | 842 | Thm10 809 | Thm2 810 | Aon2 811 | Lsb2 812 | 835 |
|   | 843 | Thm14 813 | Thm6 814 | Aon3 815 | Sth2 816 | 836 |
| 3 | 844 | Thm9 817 | Thm1 818 | Aon4 819 | Lsb1 820 | 837 |
|   | 845 | Thm13 821 | Thm5 822 | Aon5 823 | Sth1 824 | 838 |
| 4 | 846 | Thm11 825 | Thm3 826 | Aon6 827 | Lsb3 828 | 839 |
|   | 847 | Thm15 829 | Thm7 830 | Aon7 831 | Sth3 832 | Not shown |

Referring to FIG. 14A, modulation sequence 800 is portrayed in a left half and a right half which comprise the even number (individual) segments and the odd number (individual) segments respectively. In the above table the data are presented in four groups of three. Groups 1 and 2 represent the left half and Groups 3 and 4 represent the right half. The temporal order in which thermometer segments and subtherm segments are populated is consistent with the practice disclosed in FIGS. 11A-11C. The temporal distribution of the thermometer segments and subtherm segments is based on several principles. A first principle that the number of thermometer bits in a given minor modulation segment differs from the number in another minor modulation segments by no more than one. A second guiding principle is that all segments of a specific type appear in a regular pattern. A third guiding principle is that the thermometer segments (2nd segment) closest in time to the always on segment are all turned on before any thermometer segments (1st segment) earlier in time from the always on segment are turned on. Lsb segments appear in minor modulation segments 840, 842, 844 and 846 at the end of said minor modulation segment of Groups 1, 2 3 and 4 respectively. Subtherm segments appear in the last segment of minor modulation segments 841, 843, 845 and 847 which are the second minor modulation segments in Groups 1, 2, 3 and 4 respectively.

The general order of distribution for the thermometer bits is to place the thermometer bits in ascending order in different groups of two according to a predetermined pattern. Thermometer segment thm0 802 appears in minor modulation segment 840 of Group 1 and thermometer segment thm1 818 appears in at the same position in Group 3. Thermometer segment thm2 810 appears in minor modulation segment 842 of Group 2 and thermometer segment thm3 826 appears at the same position in Group 4. Thermometer segments thm4 806, thm5 822, thm6 814 and thm7 830 follow a similar pattern as do thermometer segments thm8 801, thm9 817, thm10 809 and thm11 825 and as do thermometer segments thm12 805, thm13 821, thm14 813 and thm15 829.

The general order for subtherm segments is that described For FIG. 11B with associated text. Subtherm sth0 is turned on first, then subtherm segments sth1, sth2 and sth3 in that order. Subtherm segment sth3, for example, may be on only if subtherm segments sth0, sth1 and sth2 are on. All subtherm segments are positioned at the end of the second minor modulation segment of each group and alternate with the lsb segments in that position.

This distribution insures that the duration of modulation in each of the groups of two minor modulation segments grows in a relatively uniform manner.

FIG. 14B depicts the duration of each modulation segment in each of the minor modulation segments as well as the duration of each minor modulation segment and the cumulative time interval count. The unit of time is "unittime" which is the time required to write the 24 rows that are written when the 24 write pointers direct image data to those rows. This convention is used because the actual time will vary based on the number of write pointers and the effective clock frequency of the interface between the microdisplay and the microdisplay controller as previously described in conjunction with FIGS. 6A-6C and associated text.

As an example, a digital display system (not shown) similar to that of FIGS. 6A-6C comprises a data path that is 64 bits wide, a display controller operative to deliver image data to a digital display on both leading and falling edges of a data transfer clock, and a digital display system with a resolution of 1920 columns by 1080 rows operative to receive image data and deliver it to specific rows based on address information included in said image data. Data is transferred from the digital display controller to the digital display system at a clock rate of 302 MHz. A row write action corresponding to a single write pointer takes 30 (1920/64) transfer events to transfer the image data from the digital display controller to the digital display, which is 15 full clock cycles. The modulation sequence of FIGS. 14A and 14B comprises 24 write pointers and extends over 1132 rows, which is the last cumulative modulation intervals shown in FIG. 14B. Writing 24 write pointers requires 24 row write actions at 302 MHz which is 24*15/302,000,000 or 2.384 μsec. Multiplying this by the 1132 rows in the modulation sequence (each write pointer must visit every row to be modulated) yields 2.298 milliseconds to write all data to all rows.

FIGS. 14C-14E depict the row position for a set of write pointers during the first 11 unittime time segments of a major modulation sequence after FIG. 14A marked as 0 through 10 across the top of the table. The left hand column indicates the row at which the write pointer located in the column for unittime 0 is positioned. Subsequent write pointers are positioned one row lower than the same write pointer in the previous column. Only the write pointers are shown and no terminated write pointers are included for clarity. Write pointer 0 is written first, and then write point 1. The writing of write pointers continues until write pointer 23 is written and then the writing proceeds to the next unittime column.

The addition of a second thermometer bit in the sequence raises the number of write pointers required to write one minor modulation segment by one as shown in FIG. 12D. In the present example the total number of write pointers not including terminated write pointers is 24, therefore requiring the number of minor modulation segments to be reduced from 12 to 8. The limitation on the number of write pointers in the examples of this application is not a fundamental limitation, and higher or lower numbers of write pointers is envisioned within the scope of the present application.

The temporal weighting of the lsb segments and thermometer bits is described hereafter. Modulation sequence 900 comprises two types of modulation segments. The four lsb segments operate in a classic binary weighted fashion with a total binary weighting when all segments are on of approximately 2 unittime time units. As is well known in the art four binary weighted lsb segments have 16 possible states (0 to 15). The least significant bit (lsb0) is represent by 0.166 unittime time units as shown in FIG. 14B. The number of subtherm segment states for the four subtherms is 5, one for all off and one additional as each subtherm segment is turned on. The 16 thermometer bits (thm0 through thm15) are each weighted approximately 10 unittime time units. The number of thermometer segment states is 15, one for all off and one additional as each of the 18 thermometer bits is turned on. The product of these numbers is 16*5*15=1200, which is the number of independent modulation states (image codes) available.

The cumulative number of modulation intervals from FIG. 14B is 1132, which exceeds the number of rows available on the display. FIG. 14E depicts, by a dashed line, the limit of the 1080 rows. Since the write pointers extend beyond that point the controller must provide means for building in dummy timing.

The temporal weighting of the lsb segments, subtherms and thermometer bits is described hereafter. Modulation sequence 800 comprises three types of modulation segments, each with a different temporal weighting. The four lsb segments operate in a classic binary weighted fashion. As is well known in the art four binary weighted lsb segments represent a value of 16 (0 to 15). The four lsb segments occupy a total of 2 unittime time segments when all are on. The four subtherms each are of a time weighting of 2 unittime time units and operate as thermometer bits in that once a subtherm segment is turned on it stays on when the next subtherm segment is turned on as shown in FIG. 14B. When all four subtherm segments are on and all four lsb segments are on the total time weighting of the subtherm segments and the lsb segments is approximately 10 unittime time units. Since the time weighting of the subtherm segments is also 2 unittime time units, each represents an equivalent weighting of 16 least significant bit segments. The 16 thermometer bits (thm0 through thm15) are each weighted approximately 10 unittime time units. Because the sum of the subtherm segments and lsb segments is approximately 10 unittime time units and each subtherm represents 16 least significant bit segments the total number of lsbs in each thermometer segment is 80.

The range of image codes that can be represented is based the number of thermometer segment states, subtherm segment states and lsb states. Since there are four lsb segments the number of states is 16 (0 to 15). The number of subtherm segment states for the four subtherms is 5, one for all off and one additional as each subtherm segment is turned on. The number of thermometer segment states is 15, one for all off and one additional as each of the 14 thermometer bits is turned on. The product of these numbers is 16*5*15=1200, which is the number of independent modulation states (image codes) available.

Figure 15A:
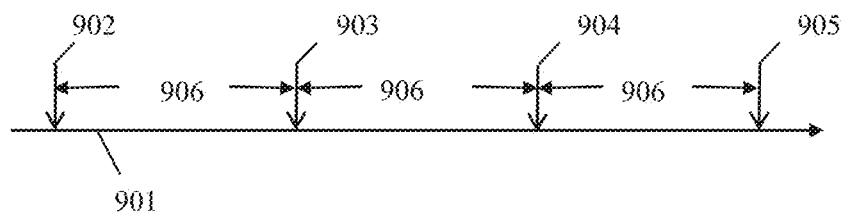
FIGS. 15A and 15B depict two implementations of an always on segment on a timeline.

FIG. 15A depicts timeline 901 wherein a series of always on segments 902, 903, 904 and 905, each associated with a series of minor modulation segments (not shown) are depicted. Each is separated from the next by a time interval 906. In the example of FIGS. 12A and 12B the time interval is approximately 97 unittime time units. From the text for FIG. 12B the data transfer clock rate is 302 MHz. The number of full clock cycles required to transfer data for 1920 pixels of a row is 15 so the time required to transfer one row write cycle is 15/302,000,000 seconds or 49.67 nanoseconds (nsec). This is equivalent to a frequency of 20.1333 MHz for row write actions. This frequency component is unlikely to be passed by passed by the liquid crystal cell to result in a high frequency component in a modulated waveform. The period between always on segments is 97 unittime time units which from the same example is 97*2.384 μsec or 231.25 μsec. The frequency associated with this period is about 4.324 kHz which is a frequency component that may be passed by the liquid crystal cell and result in a high frequency component in the modulated waveform.

Figure 15B:
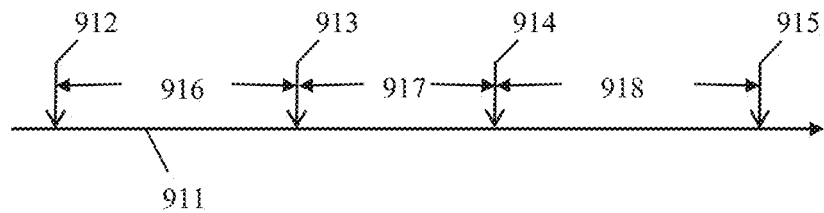

A method for mitigating this effect is depicted in FIG. 15B. Timeline 911 and always on segments 912, 913, 914 and 915 are presented. A first time interval 916 separates always on segments 912 and 913. A second time interval 917 separates always on segments 913 and 914. A third time interval 918 separate always on segments 914 and 915. Times segments 916, 917 and 918 are similar but not identical in duration. In one embodiment the sum of the durations of time intervals 917 and 918 are approximately equal to twice the duration of time interval 916.

In the following example adapted from FIGS. 12A and 12B and associated text, the duration of time interval 916 is 97 time units. The durations of time intervals 917 and 918 are 92 and 102 respectively. A quick calculation reveals that the underlying frequency components of intervals 916, 917 and 918 are 4.324 kHz, 4.559 kHz and 4.112 kHz respectively. Although these may still bleed through into the modulated waveform the frequencies are sufficiently dispersed that the peak of the bleed through is substantially lower. Many variations on this are recognized.

Figure 7A:
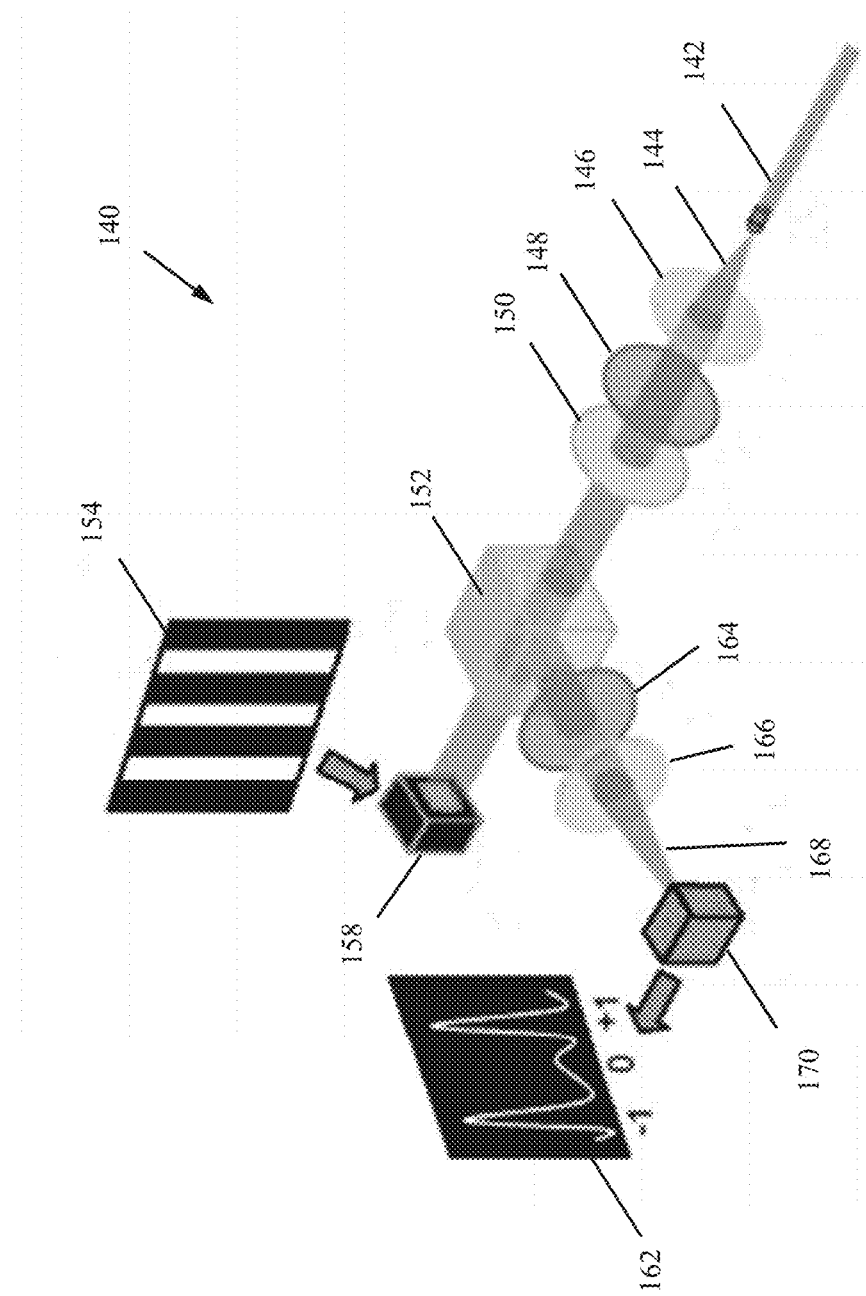
FIG. 7A depicts a Ronchi interferometer comprising a phase modulator.
Figure 7B:
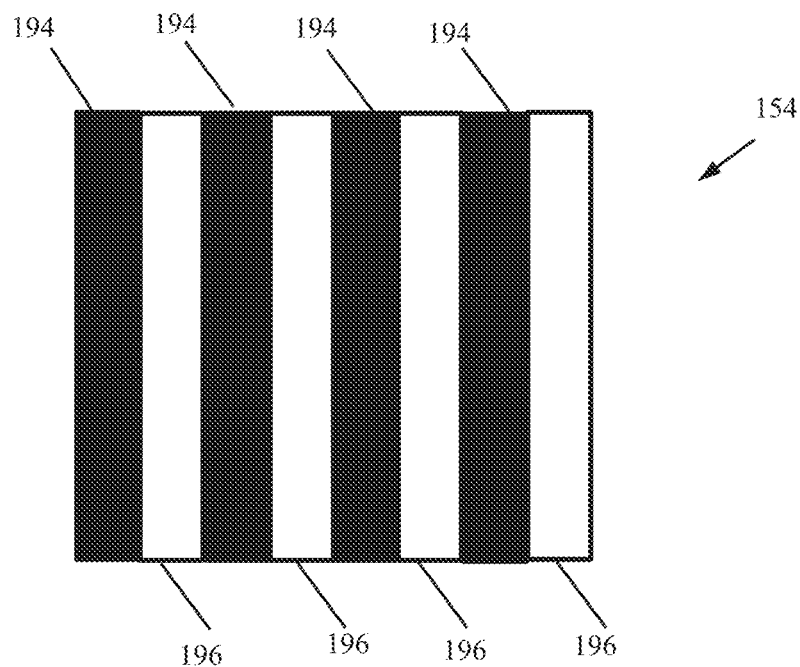
FIG. 7B depicts a Ronchi phase grating.
Figure 8A:
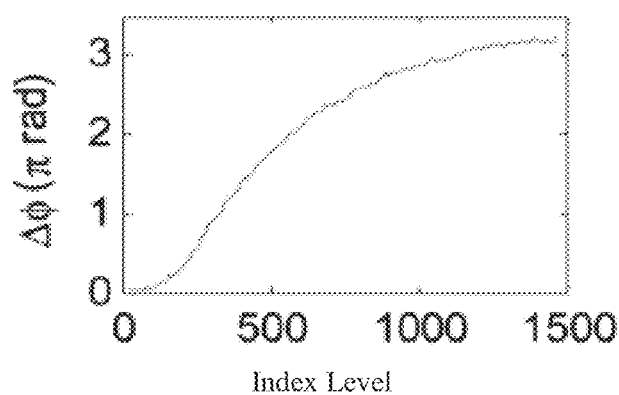
FIGS. 8A-8C depict the development of a lookup table to linearize the relationship between phase shift and gray scale levels.
Figure 8B:
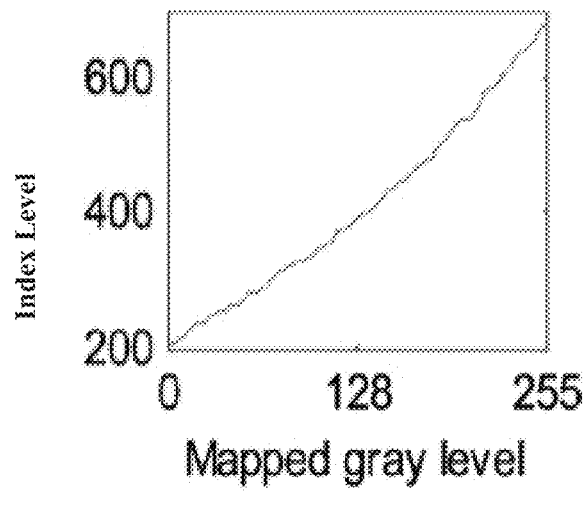
Figure 8C:
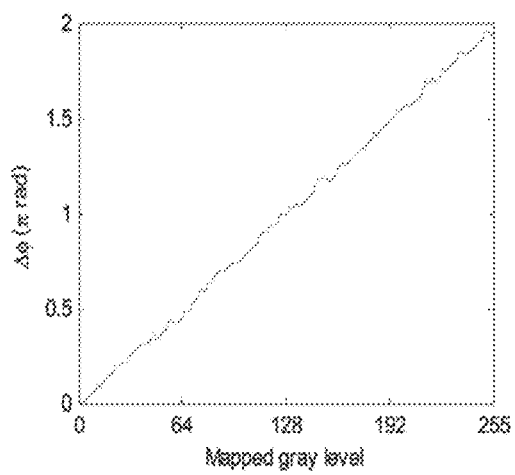
Figure 16:
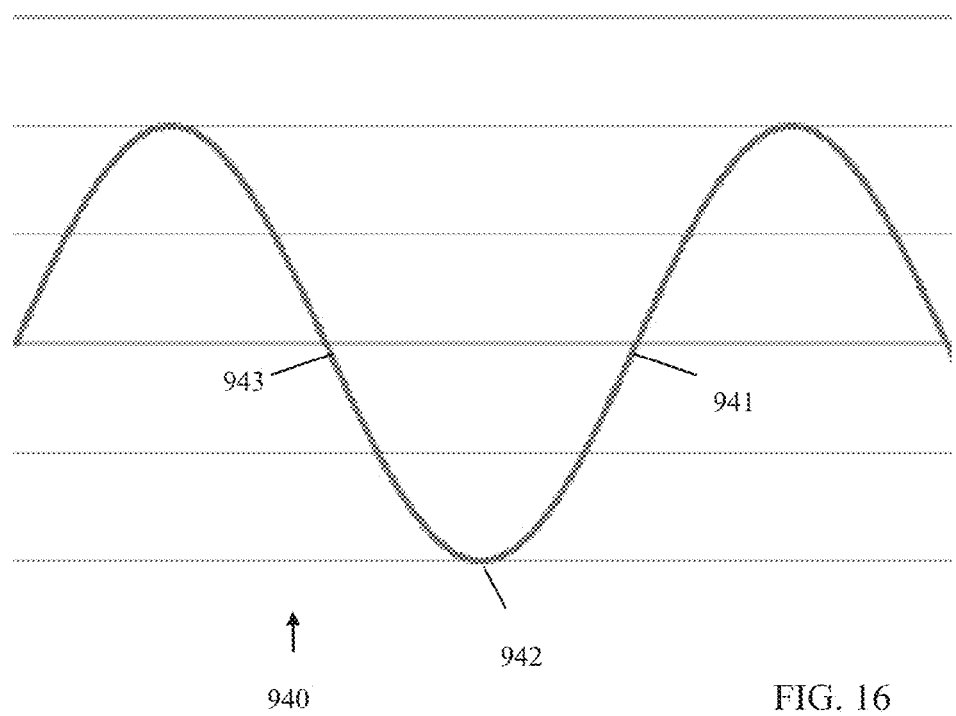
FIG. 16 depicts a relative phase curve illustrating the phase difference between the variable and reference gratings of a Ronchi phase mask.

FIG. 16 depicts a relative phase curve 940. In one example relative phase curve represents the phase difference between reference phase state $N_{ref}$ 194 and variable phase state $N_v$ 196 of Ronchi phase grating 154 of FIG. 7B. Point 942 on phase curve 940 represents the position of reference phase state $N_{ref}$ 194. One problem that arises in capturing data when stepping variable phase state $N_v$ 196 is that the performance of the test rig may lead to problems. First, when operating variable phase state $N_v$ 196 at a value similar to reference phase state $N_{ref}$ 194 it is possible that the detected phase state is on the wrong side of point 942. In the case of pulse width modulation this has been determined experimentally to be an issue. Second, when there is some noise in the sensor (e.g., photometer 170 of FIG. 7A) this ambiguity may be exacerbated. One method to remove this ambiguity is to change the phase value of $N_{ref}$ 194. A first method for doing this is to place reference phase state $N_{ref}$ 194 at point 942 and variable phase state $N_v$ 196 at point 941 so that the relative phase shift is $\pi$ radians. After this is verified to be correct then the positions of reference phase state $N_{ref}$ 194 and variable phase state $N_v$ 196 can be swapped so that reference phase state $N_{ref}$ 194 at point 941 and variable phase state $N_v$ 196 at point 942. This can be verified against the previous measurements. Then variable phase state $N_v$ 196 can be stepped through the area around point 942. An alternative would be to place reference phase state $N_{ref}$ 194 at point 943 and variable phase state $N_v$ 196 at point 942 which would also be a relative phase shift of $\pi$ radians. In this way data for variable phase state $N_v$ 196 can be explored about point 942 without the previously mentioned ambiguity.

Pulse width modulation as described herein does require consideration of the operating voltages of the liquid crystal cell. Experimental evidence has shown that one set of operating voltages may off advantages over a different set of operating voltages even though the same range of phase modulation is offered by both sets of voltages.

For the microdisplay system previously described in FIGS. 4 through 6C there has been empirically noted that when voltages $V_0$ 374 and $V_1$ 372 are closer together sometimes the response time of the liquid crystal material in the LC cell is slower. Therefore there is some response time advantage in operating with a wider voltage spread between $V_0$ 374 and $V_1$ 372. Note that the design of the pixel cell 305 shown in FIG. 4 requires that the lower of the voltages relative to ground be connected to $V_0$ 374 and the higher to $V_1$ 372. An adverse consequence of operating with a wider voltage spread between $V_0$ 374 and $V_1$ 372 is that a stronger lateral field between adjacent pixels 305 will develop than is the case when the voltage spread is narrower. The lateral field effect is somewhat mitigated by the magnitude of the voltage between the pixel mirror of either state and the voltage of the common plane (ITO) electrode. Lateral field effects are particularly important for phase modulation devices. It is most often referred to as cross-talk because the data states of adjacent pixels are affecting each other.

To analyze this in better detail, the inventors have established a figure of merit calculation wherein the difference between $V_0$ 374 and $V_1$ 372 is divided by the average of $V_0$ 374 and $V_1$ 372. This ratio can be used to compare different operating settings when lateral field effect is a concern provided the two settings are for identical or nearly identical liquid crystal cells. In general a lower lateral field figure of merit ($FOM_{LAT}$) is indicative of a lower level of cross-talk than a higher $FOM_{LAT}$.

The figure of merit equation is:

$$FOMLAT = (V1 - V0) \Big/ \left(\frac{V0 + V1}{2}\right).$$

Figure 17:
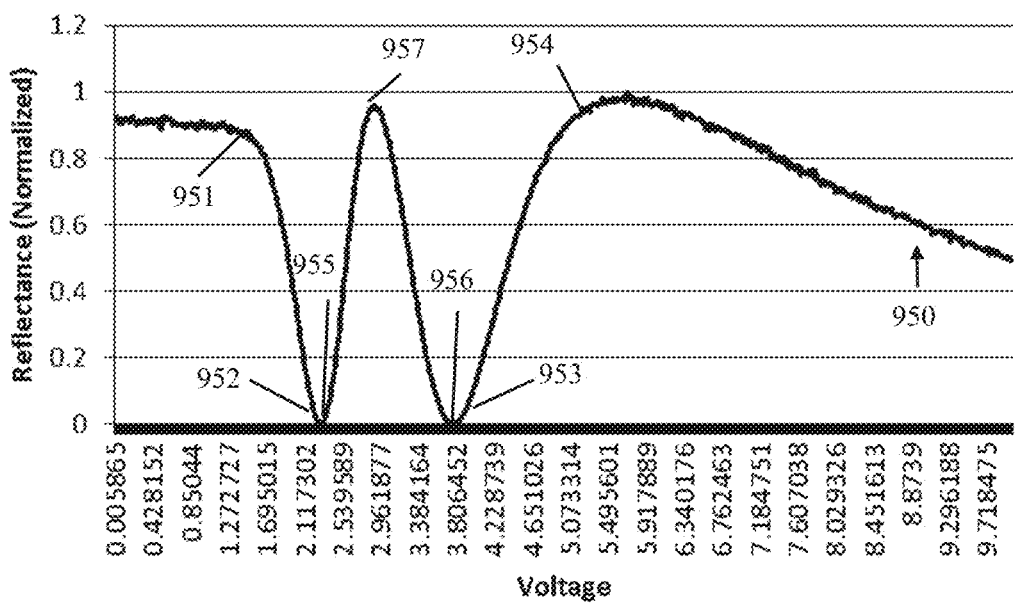
FIG. 17 depicts a phase versus voltage curve extending beyond the second minima for a liquid crystal parallel aligned spatial light modulator.

FIG. 17 depicts a modeled amplitude (annotated as "reflectance") versus voltage curve 950 for a parallel aligned phase only spatial light modulator with greater than 360° of phase modulation available wherein the polarization state of incoming light is at 45° to the alignment axis of the liquid crystal cell, as previously described. In measure phase modulation it is often convenient to rely upon amplitude measurements because of the difficulty in measuring phase angle differences directly. In contrast to the practice for displays for human usage, the preferred type of measurement is radiometric rather than photopic photometry. This technique is well understood in the art. Sources recognize that operating beyond first minima 955 is sometimes desirable although the context varies with some sources proposing to operate over a range of 4π. (See, for example, "Broadband suppression of the zero diffraction order of an SLM using its extended phase modulation range," Jesacher et al, Optics Express, Vol. 22, No. 14, pages 17590-17599.) In other contexts the modulation range may be 720° or greater.

Figure 19:
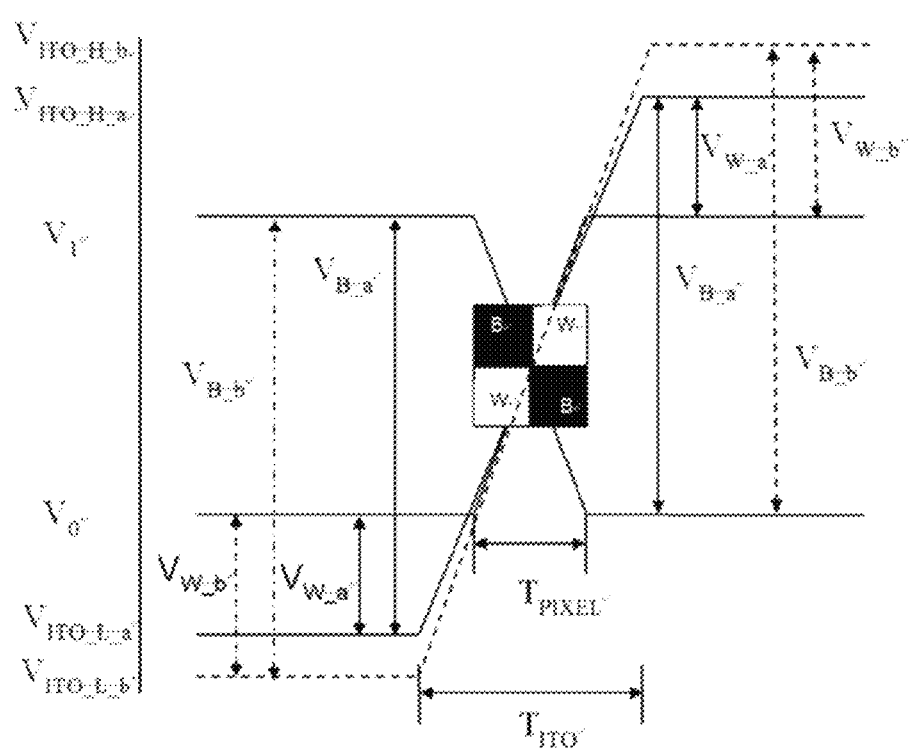
FIG. 19 depicts voltage relationships between the common plane and pixel mirrors for two orthogonal phase states at both DC balance states.

The region between point 951 (1.3 volts) and point 952 (2.1 volts) near first minima 955 is a typical operating range for an amplitude aligned spatial light modulator. A more typical phase operating range is the range between first maxima point 951 (1.3 volts) and second maxima point 957 (2.96 volts.) This provides a full 360° of phase modulation. A less typical operating range is for the region between second maxima 957 and third maxima 954. The disadvantage of choosing this range is that for many LCOS architectures this requires that the voltage operating range of the LCOS backplane be expanded to accommodate the need to encompass two voltage operating ranges arrayed symmetrically about the common plane voltage. As is shown in FIG. 19 the operating voltage range of the microdisplay backplane need only accommodate a range of voltages limited to the spread between the highest voltage and the lowest voltage in one of the two voltage DC balance states. The spread between the pixel voltages and the common plane voltage is a consequence of providing the common plane voltage independently of the silicon backplane. By inspection it is clear that the slope of phase change versus voltage is lower in that a given voltage range gives less change in phase, especially in the region between minima 956 and third maxima 954.

An additional effect of operating with a greater voltage difference between the common plane and the individuals is at least the opportunity for a faster response time. This phenomenon is well known although it is important to verify this experimentally in particular cases because of the individual properties of specific liquid crystal mixtures and cell configurations.

The results of calculation of a FOMLAT for each of the first and second operating ranges mentioned above are presented in the following table.

| Range | $V_0$ | $V_1$ | FOM |
| --- | --- | --- | --- |
| First | 1.3 | 2.96 | 0.779 |
| Second | 2.96 | 5.2 | 0.549 |

Comparison of the two results of the two Figures of Merit reveals that the second range has a lower value and therefore is the preferred range of the two.

Thus it appears in this case that operating solely between second maxima 957 and third maxima 954 results in a spatial light modulator with faster switching speed and less crosstalk than a spatial light modulator operating between first maxima 951 and second maxima 957.

Another consideration is the application of parallel aligned phase spatial light modulators to holographic data storage (HDS) systems. The goal of an HDS system is to store large amounts of binary data on a holographic medium in page format where important considerations include throughput, data reliability and cost efficiency. Such systems compete with archival data storage systems such as tape data systems manufactured by Storage Technology Corp., now a part of Oracle Corp, as well as other manufacturers.

There are a number of things within an HDS system that impact on the speed of operation. A summary of these is presented in Section 2 of "Holographic Data Storage: Science Fiction or Science Fact", Ken Anderson et al, Akonia Holographics LLC, presented at Optical Data Storage 2014. One factor noted in Section 2.1 Spatial Light Modulators is that the number of pixels per page is a critical parameter for transfer rate. All other things being equal, the write transfer rate is proportional to the number of pixels written in each page of data. The paper also states that the number of pixels on the spatial light modulator increases the number of pixels on each page of data.

A second consideration for an HDS system is the storage capacity of its holographic medium. Some aspects of this are controlled by the design of the medium itself. Other parts relate to the manner in which the holograph data is written to the holographic medium. One important method to increase data density is the use of multiplexing. There are various types of multiplexing that can all coexist in a single system writing data to a single holographic medium. One of these is referred to as Phase Quadrature Holographic Multiplexing (PQHM). (See paragraph 4.2 of said Akonia paper.) Two holograms can be written using the same reference beam at the same reference beam angle provided the two holograms are written with a 90° phase difference. This technique is reported to avoid cross-talk whether the hologram is created using a two phase state approach (0° and 180°) or a four phase state approach (0°, 90°, 180° and 270°). This embodiment discloses an apparatus of implementing the two phase state approach in quadrature utilizing the microdisplay system described in FIGS. 4 through 6C.

Figure 18:
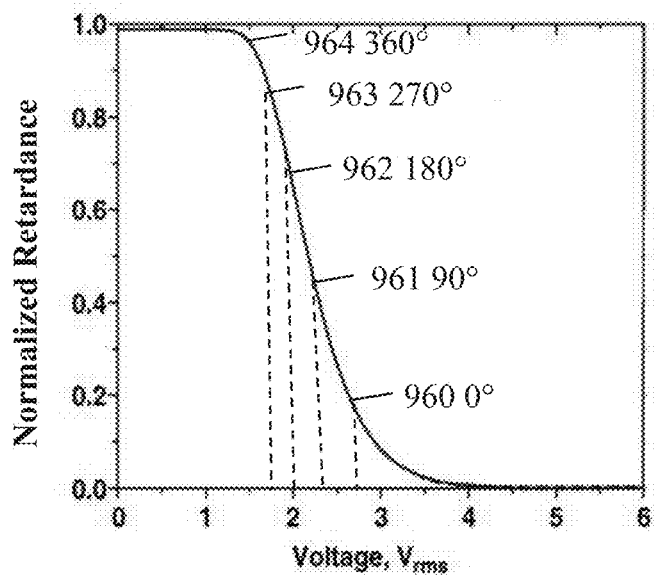
FIG. 18 depicts a phase versus voltage curve to the first minima.

FIG. 18 presents an electro-optic curve of the type associated with a reflective homogeneously aligned untwisted nematic liquid crystal cell as previously described. In a typical phase modulation configuration the pretilt angles of the liquid crystal cell are aligned to the angle of the polarized light upon which the liquid crystal cell is intended to act. Reviewing previously disclosed information, in a spatial light modulator configuration this type of cell is considered to be a normally white mode. This means that maximum retardance occurs when the cell is operated with a low voltage difference between the common plane voltage and the pixel voltage and that minimum retardance occurs when the cell is operated with a higher voltage difference between the common plane voltage and the pixel voltage. Devices configured in this manner are well known in the art and are available commercially from a number of sources.

A liquid crystal cell of this type may be configured to have sufficient operating range to modulate a full wave ($2\pi$ radians or 360°) of light at the designed wavelength. In an HDS system the typical design wavelength is around 405 nanometers (nm) with a range of ±5 nm. This relatively narrow range of wavelengths can be accommodated with a point design liquid crystal cell. This may permit the use of a liquid crystal material with lower rotational viscosity and therefore with faster response speed. Alternatively a higher rotational viscosity liquid crystal material may be used if the smoothing characteristic is needed to minimize phase fluctuations.

Phase retardation points 960 0°, 961 90°, 962 180°, 963 270° and 964 360° are indicated on FIG. 18. These correspond to a set of drive voltage differences between the common plane and the pixel voltage. While the retardance at points 960 0° and 964 360° technically have the same effect the two values are generated by different voltages, which may be of importance in the operation of the liquid crystal cell. By inspection it is clear that the voltage spacing between the different phase states is not linear. Those with experience in the art will recognize that the retardance of a thicker liquid crystal cell may be substantially linear over a significant range with respect to voltage. In this embodiment either situation may apply.

Reviewing of the phase states indicated on FIG. 18, it is obvious by inspection that a first pair of retardance states is 960 0° and 962 180° and a second pair of retardance states is 961 90° and 963 270°. These two pairs of states are in fact orthogonal as is required for PQHM storage to operate without crosstalk. It is also clear from inspection that the voltage differences required to generate 90° and 270° are greater than that required to generate 0° and 180° respectively.

FIG. 19 presents an overview of the required voltages in graphic form. The left half of FIG. 19 represents a first set of voltages in "field normal" format and the right half presents the inverse of the same voltages in "field invert" format. This naming convention is arbitrary. "Field normal"

and "field invert" together are the set of voltages required to operate the spatial light modulator in a DC balanced fashion as is well known in the art. The solid lines represent a first set of voltages (set a) with a first common plane offset while the dashed lines represent a second set of voltages (set b) with a second common plane offset wherein the second voltage offset state is greater than the first common plane offset. The voltages are analogous to the voltages in the electro-optic curve of FIG. 18. In the table the letters "L" and "H" refer to "low" and "high" respectively. The letters "a" and "b" distinguish between the two voltage sets. Although V0 and V1 are the same in both voltage sets it is obvious that Vo and V1 in a first set may be different to V0 and V1 in a second set due to non-linearity of the electro-optic curve or for some other reason. The table below explains the relationship to FIG. 18.

| | | Phase State and Drive Voltage Matrix | | | | | |
|---|---|---|---|---|---|---|---|
| | | | | DC Balance State | | | |
| | | | Field Normal | | | Field Invert | |
| Phase Angle | | Common Plane Voltage | Pixel Voltage | LC Drive Voltage | Common Plane Voltage | Pixel Voltage | LC Drive Voltage |
| 960 | 0° | $V_{ITO\_L\_b}$ | $V_1$ | $V_{B\_b}$ | $V_{ITO\_H\_b}$ | $V_0$ | $V_{B\_b}$ |
| 961 | 90° | $V_{ITO\_L\_a}$ | $V_1$ | $V_{B\_a}$ | $V_{ITO\_H\_a}$ | $V_0$ | $V_{B\_a}$ |
| 962 | 180° | $V_{ITO\_L\_b}$ | $V_0$ | $V_{W\_b}$ | $V_{ITO\_H\_b}$ | $V_1$ | $V_{W\_b}$ |
| 963 | 270° | $V_{ITO\_L\_a}$ | $V_0$ | $V_{W\_a}$ | $V_{ITO\_H\_a}$ | $V_1$ | $V_{W\_a}$ |

In a two phase state application switching between drive voltages as described above, the liquid crystal cell is not required to have a full wave of retardance to provide all the required retardance values. In fact only 270° ($3\pi/2$ radians) is mandatory although a thicker cell may offer advantages, such as greater linearity of phase angle with respect to voltage.

Figure 5:
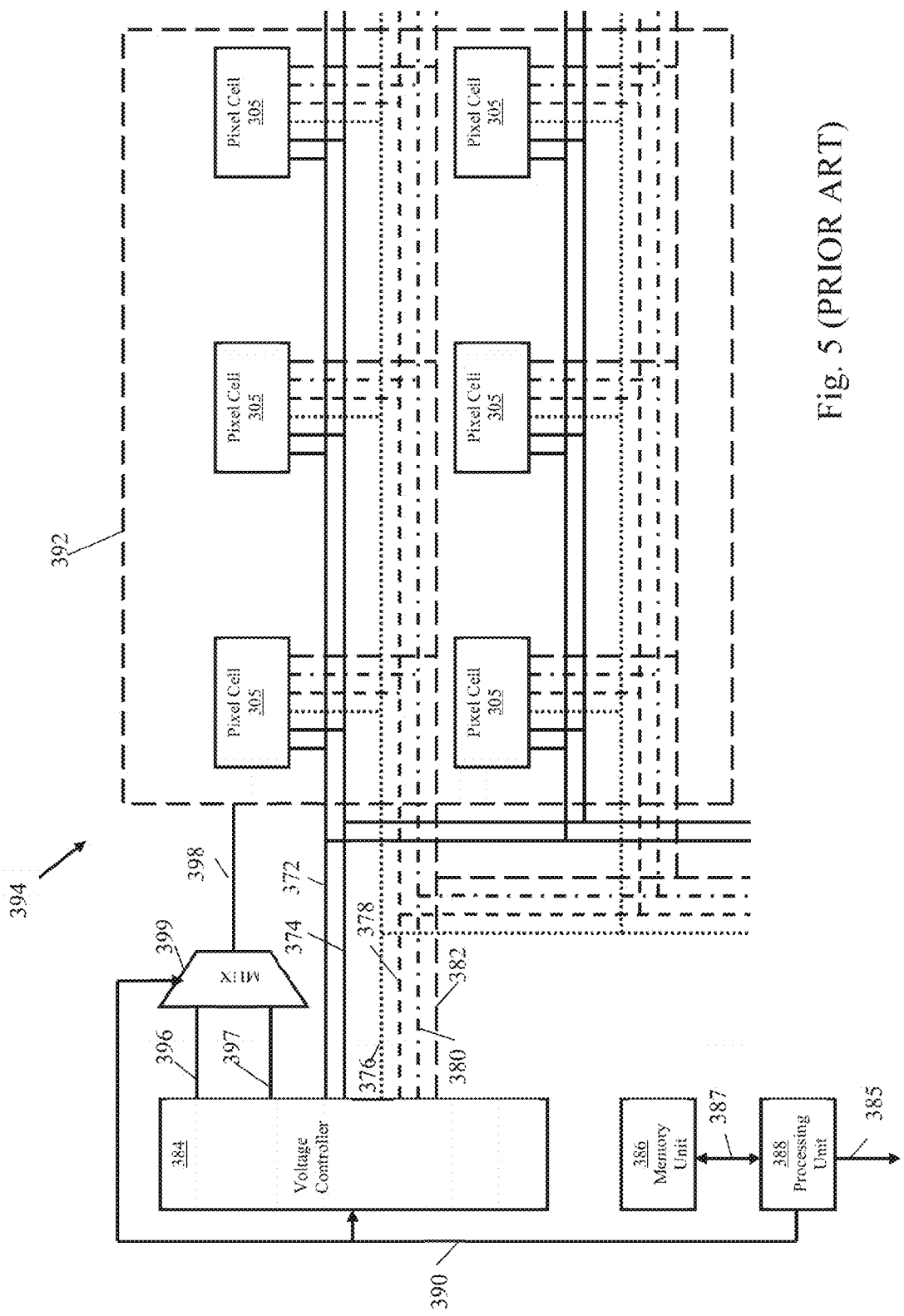
FIG. 5 is a voltage and control diagram of a multi pixel liquid crystal display in accordance with the present invention.

Another important consideration is the means for creating the sets of voltages required for this method of modulation. FIG. 5 depicts one embodiment for generating the required voltages. Voltage controller 384 and common plane (ITO) controller 399 are both directed by processing unit 388 over voltage control bus 390. In one embodiment voltage control signals set from processing unit 388 to voltage controller 384 over voltage control bus 390 may include voltage set commands to DACs (not shown) within voltage controller 384. Said DACs may include those used to generate VITO_L, VITO_H, V0 and V1, as may be required by the shape of the electro-optic curve.

Figure 3A:
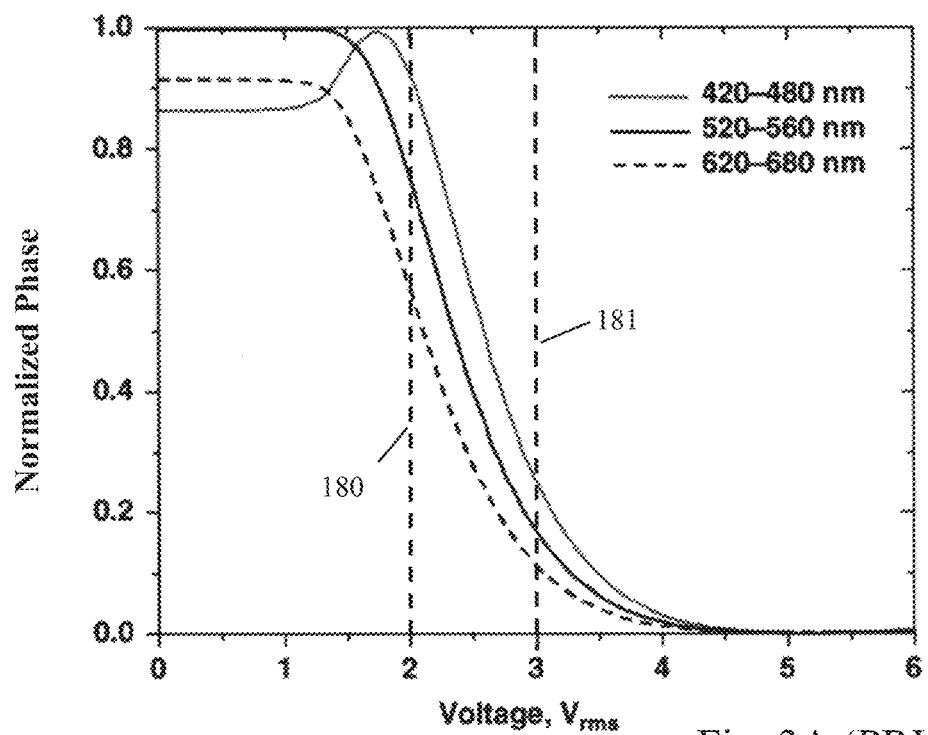
FIG. 3A is a drawing of the phase-voltage response of a parallel aligned phase modulated nematic liquid crystal cell.
Figure 3B:
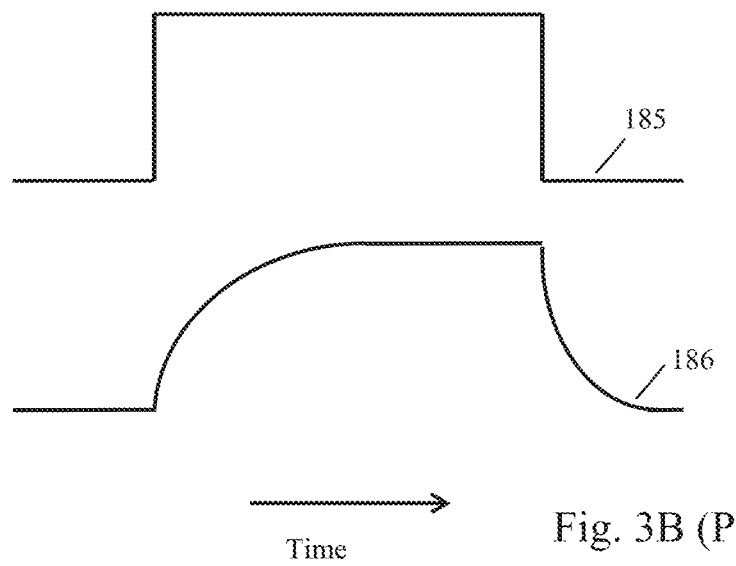
FIG. 3B is a drawing of the temporal response of a parallel aligned phase modulated nematic liquid crystal cell to a voltage square wave.
Figure 4:
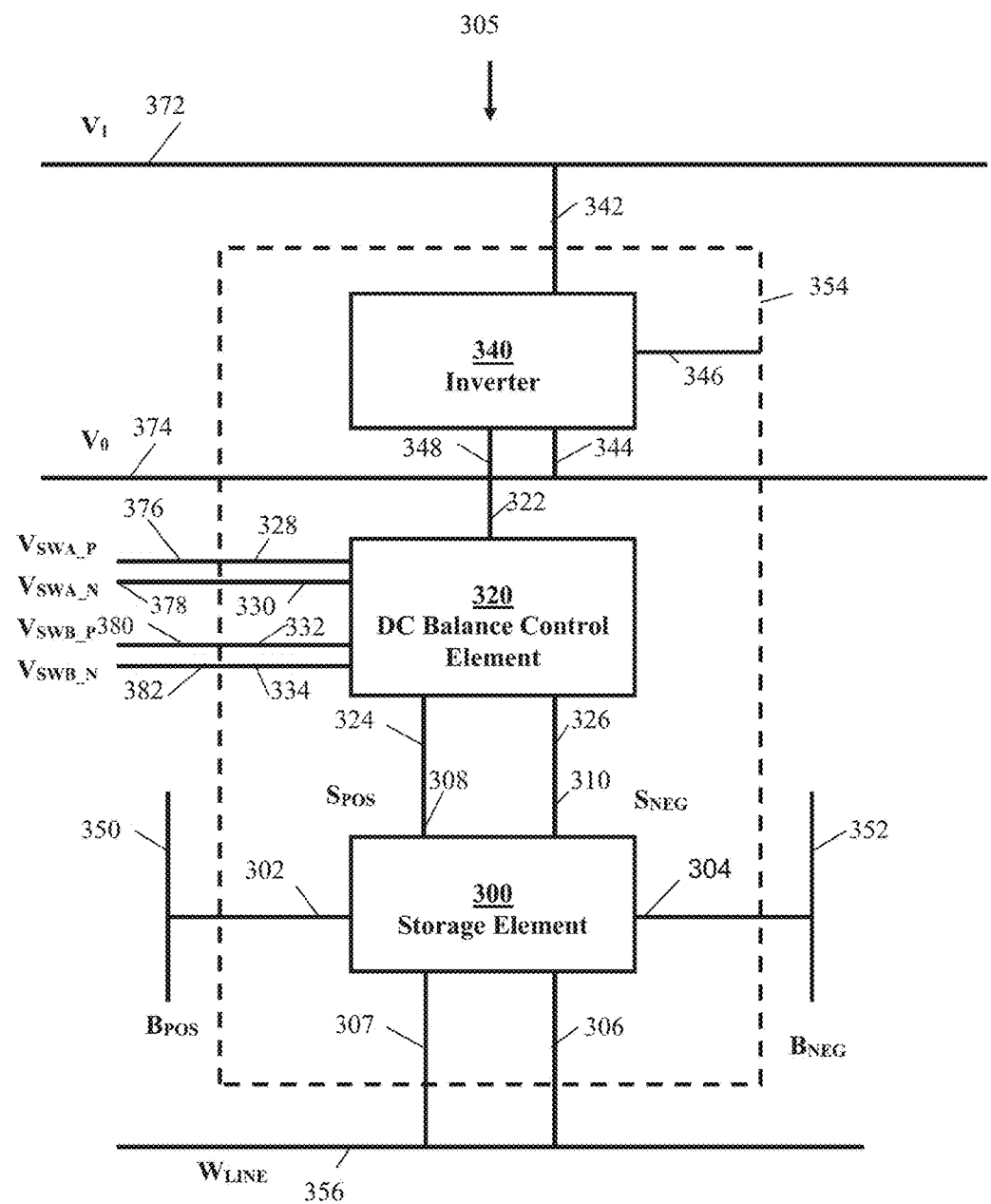
FIG. 4 is a block diagram of a pixel circuit for a liquid crystal on silicon display.
Figure 20:
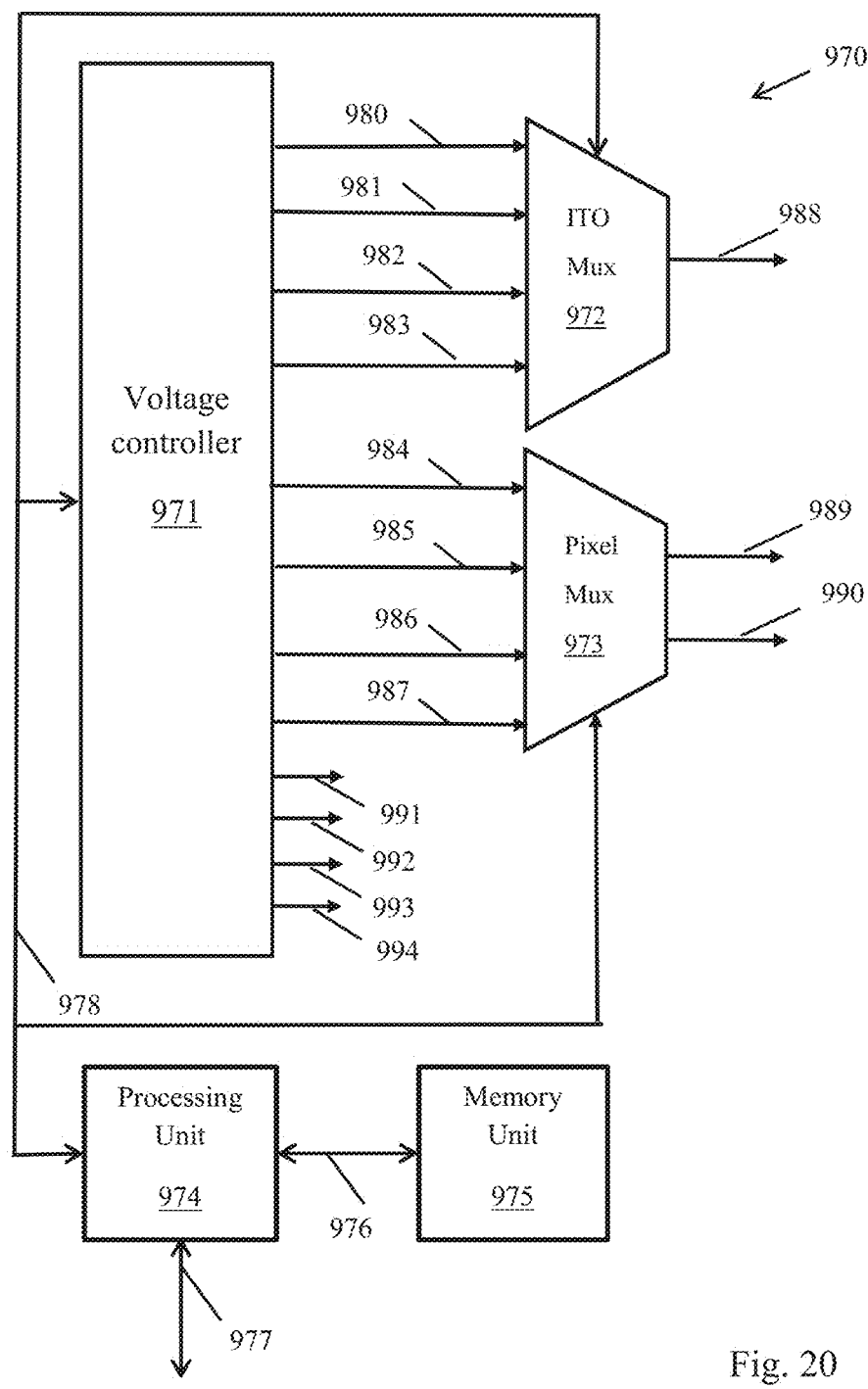
FIG. 20 depicts one apparatus for integrating a second set of DACs.

In some instances the configuration of the voltage controller may now permit the changing of the required voltages from the first set to the second set by use of voltage set commands to DACs in the voltage controller. In that case a second set of DACs is required. FIG. 20 depicts one apparatus for integrating a second set of DACs. Voltage and logic controller 970 comprises voltage controller 971, processing unit 974, memory unit 975, ITO (common plane) multiplexor 972 and pixel voltage multiplexor 973. From FIG. 5, transparent common electrode 392 overlays the entire array of pixel cells 305. In a preferred embodiment, pixel cells 305 are formed on a silicon substrate or base material, and are overlaid with an array of pixel mirrors 354 (from FIG. 4), each single pixel mirror 354 forming a part of one of the pixel cells 305. Each pixel cell 305 comprises the circuit elements disclosed in FIG. 4. A substantially uniform layer of liquid crystal material is located in between the array of pixel mirrors 354 and the transparent common electrode 392. Transparent common electrode 392 is preferably formed by a transparent conductive material such as Indium Tin-Oxide (ITO) coated onto a glass substrate (not shown) as previously disclosed in FIG. 3, items 240 and 242. Memory 975 is a computer readable medium including programmed data and commands. The memory is capable of directing processing unit 974 to implement various voltage modulation and other control schemes. Processing unit 974 receives data and commands from memory unit 975, via memory bus 976, provides internal voltage control signals, via voltage control bus 978, to voltage controller 971, and provides data signals (i.e. image data into the pixel array) via data control bus 977. Voltage controller 384, memory unit 975, processing unit 974, common plane (ITO) multiplexor 972 and pixel voltage multiplexor 973 may be separate units or alternative may form part of a larger circuit assembly in a larger integrated circuit or circuit board assembly. Memory unit 386 may comprise both operating RAM and nonvolatile memory such as an SPI (Serial Peripheral Interface) memory. (Not shown)

Voltage controller 971 generates voltages for an "a" group (not shown) comprising common plane (ITO) voltages $V_{ITO\_H\_a}$ 980 and $V_{ITO\_L\_a}$ 981 and pixel voltages $V_{1\_a}$ 984 and $V_{0\_a}$ 985 and voltages for a "b" group (not shown) comprising common plane voltages $V_{ITO\_H\_b}$ 982 and $V_{ITO\_L\_b}$ 983 and pixel voltages $V_{1\_b}$ 986 and $V_{0\_b}$ 987. Commands from processor unit 974 delivered over control bus 978 direct pixel multiplexor 973 and common plane multiplexor 972 to select either the voltages of the "a" group or the voltages of the "b" group for output 988 of common plane multiplexor 972 and outputs 989 and 990 of pixel voltage multiplexor 973. In the case of the "a" group either common plane voltage $V_{ITO\_H\_a}$ 982 or $V_{ITO\_L\_a}$ 983 is selected for common plane multiplexor output $V_{ITO}$ 988, according to DC balance control, and pixel voltages $V_{1\_a}$ 984 and $V_{0\_a}$ 985 are selected for pixel voltage multiplexor outputs $V_1$ 989 and $V_0$ 990 respectively. In the case of the "b" group either common plane voltage $V_{ITO\_H\_b}$ 982 or $V_{ITO\_L\_b}$ 983 is selected for common plane multiplexor output $V_{ITO}$ 988, according to DC balance control, and pixel voltages $V_{1\_b}$ 986 and $V_{0\_b}$ 987 are selected for pixel voltage multiplexor outputs $V_1$ 989 and $V_0$ 990 respectively.

DC balance control is implemented through a set of synchronized commands to common plane multiplexor 972 and to array of pixels cells 305 of FIG. 5. When the "a" group is selected, common plane voltage multiplexer 972 selects between $V_{ITO\_H\_a}$ 980 and $V_{ITO\_L\_a}$ 981 to be asserted on common plane multiplexor output $V_{ITO}$ 988 based on control signals received from processing unit 974. When the "b" group is selected, common plane voltage multiplexor 972 selects between $V_{ITO\_H\_b}$ 982 and $V_{ITO\_L\_b}$ 983 to be asserted on common plane multiplexor output $V_{ITO}$ 988 based on control signals received from processing unit 974. Processing unit 974 controls the logic state of (logic) voltage supply terminals $V_{SWA\_P}$ 991, $V_{SWA\_N}$ 992, $V_{SWB\_P}$ 993, and $V_{SWB\_N}$ 994 in synchronization with the switching of $V_{ITO}$ 988 as previously described. ITO voltage multiplexor 972 delivers $V_{ITO}$ to transparent common electrode 392 of FIG. 5, by voltage supply terminal ($V_{ITO}$) 988. Each of the voltage supply terminals $V_1$ 989, $V_0$ 990, $V_{SWA\_P}$ 991, $V_{SWA\_N}$ 992, $V_{SWB\_P}$ 993, and $V_{SWB\_N}$ 994 in FIG. 20 are global signals, wherein each global terminal supplies the same voltage to each pixel cell 305 from FIG. 305 throughout the entire pixel array in the operation of a display system comprising voltage and logic 970. $V_{ITO}$ 988 asserts a single voltage selected by common plane multiplexer 972 as previously described on transparent common electrode 392 of FIG. 5.

The above description of the disclosed embodiments is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings provided herein represent example implementations of the invention and are therefore representative of the subject matter which is broadly contemplated by the invention. It is further understood that the scope of the present invention fully encompasses other implementations and that the scope of the present invention is accordingly limited by nothing other than the appended claims.

What is claimed is:

1. A method of pulse width modulating a spatial light modulator, the method comprising; determining a modulation sequence, said modulation sequence comprising a plurality of minor modulation segments, wherein:
   each minor modulation segment comprises an always-on modulation segment in an always-on state,
   said plurality of minor modulation segments are temporally spaced such that said always-on modulation segments are spaced at predetermined intervals, and
   each minor modulation segment further comprises at least one thermometer bit; and
   applying said modulation sequence to said spatial light modulator in a time order method,
   wherein said always-on modulation segment of each minor modulation segment is preceded by one or more thermometer bit segments, and one thermometer bit segment is placed in an on state in each of said plurality of minor modulation segments before a second thermometer bit segment is placed in an on state in any minor modulation segment with a first thermometer bit already in an on state.

2. The modulation method of claim 1, wherein said one or more thermometer bit segments of each minor modulation segment are activated in reverse time order with thermometer bit segments representing lower bit values activated later in the minor modulation segment and thermometer bit segments representing higher bit values activated earlier in the minor modulation segment.

3. The modulation method of claim 2, wherein the order in which said one or more thermometer bit segments in each of said minor modulation segments form a pattern, said pattern comprising:
   a first minor modulation segment in a first half of the modulation sequence;
   a second minor modulation segment at a same relative temporal position in a second half of the modulation sequence;
   a third minor modulation segment in said first half of the modulation sequence located temporally substantially midway between the first and second minor modulation segments;
   a fourth minor modulation segment in said second half of the modulation sequence in the same relative temporal position as the third minor modulation segment; and
   optionally one or more additional minor modulation segments arranged in like manner until all minor modulation segments are formed into said pattern.

4. The modulation method of claim 1, wherein said always-on modulation segment of each minor modulation segment is followed by a lesser significant bit modulation segment.

5. The modulation method of claim 4, wherein an on state duration of said lesser significant bit modulation is determined by a write to black terminated write pointer.

6. The modulation method of claim 1, wherein durations of said predetermined intervals between said always-on modulation segments are substantially equal.

7. The modulation method of claim 1, wherein durations of said predetermined intervals between said always-on modulation segments comprise a plurality of time slots.

8. The modulation method of claim 1, wherein image input data defining a desired phase state for each pixel is mapped to a modulation sequence code identifying a modulation configuration required to achieve that desired phase state.

9. The modulation method of claim 8, wherein said determined modulation sequence maps a numeric image code to a unique combination of thermometer segments, subthermometer segments, and lesser bit segments.

10. A method of pulse width modulating a spatial light modulator, the method comprising; determining a modulation sequence, said modulation sequence comprising at least one major or minor modulation segment, wherein:
   said modulation sequence comprises time slots of thermometer bit segments or lesser significant bit segments to which thermometer bits or lesser significant bits are assigned respectively according to a predetermined temporal order, and
   one or more of the time slots assigned to be occupied by thermometer bits in an off state are respectively populated by segments of subthermometer bits according to a predetermined set of rules; and
   applying said modulation sequence to said spatial light modulator,
   wherein said modulation sequence comprises at least two major or minor modulation segments, and said subthermometer bits are allocated such that no major or minor modulation segment receives a second subthermometer bit in an on state until all major or minor modulation segments intended to have a subthermometer bit have received a subthermometer bit in an on state.

11. The modulation method of claim 10, wherein said thermometer bit segments are activated in reverse time order, with said thermometer bit segments representing lower bit values activated later in the modulation sequence.

12. The modulation method of claim 11, wherein said segments of subthermometer bits are separate from thermometer bits in an on state by at least one off state segment.

13. The modulation method of claim 12, wherein said segments of subthermometer bits precede said thermometer bits in an on state in time.

14. The modulation method of claim 10, wherein said subthermometer bits are activated such that when a first subthermometer bit is placed in an on state and then subsequently a second subthermometer bit is placed in an on state, said first thermometer bit remains in an on state, and wherein when a third subthermometer bit is placed in an on state said first and second subthermometer bits remain in an on state, continuing until all subthermometer bits are placed in on states.

15. The modulation method of claim 10, wherein said predetermined set of rules for placing a subthermometer bit in time slots for an off state thermometer bit comprises separating a first subthermometer bit from a first thermometer bit by at least one time slot, and then separating a second subthermometer bit from a second thermometer bit by at least one time slot.

16. The modulation method of claim 10, wherein said subthermometer bits are distributed such that a first subthermometer bit is placed in a first half of said modulation sequence and a second subthermometer bit is placed in a second half of said modulation sequence, continuing in alternation until all subthermometer bits have been placed.

* * * * *